US011231830B2

(12) United States Patent
Morris et al.

(10) Patent No.: US 11,231,830 B2
(45) Date of Patent: Jan. 25, 2022

(54) GRAPHICAL USER INTERFACE FOR SEARCHING ON A NETWORK PATTERN

(71) Applicant: SAS Institute Inc., Cary, NC (US)

(72) Inventors: James Byron Morris, London (GB); Nicholas Akbar Ablitt, Putney (GB); Manoj Keshavmurthi Chari, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/122,349

(22) Filed: Dec. 15, 2020

(65) Prior Publication Data

US 2021/0294481 A1  Sep. 23, 2021

Related U.S. Application Data

(60) Provisional application No. 63/048,435, filed on Jul. 6, 2020, provisional application No. 62/992,110, filed on Mar. 19, 2020.

(51) Int. Cl.
*G06F 3/0481* (2013.01)
*G06F 16/245* (2019.01)
(Continued)

(52) U.S. Cl.
CPC ........ *G06F 3/04817* (2013.01); *G06F 3/0482* (2013.01); *G06F 9/451* (2018.02); *G06F 16/245* (2019.01); *G06F 16/248* (2019.01); *G06F 16/2471* (2019.01); *G06F 16/288* (2019.01); *G06F 16/9024* (2019.01)

(58) Field of Classification Search
CPC .. G06F 3/0482; G06F 3/04817; G06F 16/282; G06F 16/287
See application file for complete search history.

(56) References Cited

U.S. PATENT DOCUMENTS 5,878,431 A * 3/1999 Potterveld ............... G06F 9/465
                                                       707/694
9,871,714 B2 * 1/2018 Brewer ............... G06F 16/9024
(Continued)

OTHER PUBLICATIONS

SAS Visual Investigator Fact Sheet, SAS Institute Inc. (2018).
"SAS Visual Data Mining and Machine Learning 8.4: The NETWORK Procedure", SAS Institute Inc. (May 10, 2019).

*Primary Examiner* — Ken Hoang
(74) *Attorney, Agent, or Firm* — Coats + Bennett, PLLC

(57) ABSTRACT

A computing system displays an initial graph with icons. Each icon graphically represents data associated with a respective entity. The first icon is connected in the initial graph to other icon(s). The system receives an indication of a graphical network pattern. The graphical network pattern is defined by a user selection of a second icon in the initial graph and: a user selection of a third icon in the initial graph; or a user selection of a graphical representation in the initial graph of a relationship between the second icon and the third icon. The system sends computer instructions indicating a network pattern query for searching an electronic database for electronic record(s) corresponding to a queried network pattern. The system receives a dataset indicating located electronic record(s) corresponding to the queried network pattern. The system generates output data indicating an output graph for a graphical representation of the located record(s).

30 Claims, 43 Drawing Sheets

(51) Int. Cl.
  *G06F 16/901* (2019.01)
  *G06F 16/248* (2019.01)
  *G06F 16/2458* (2019.01)
  *G06F 16/28* (2019.01)
  *G06F 9/451* (2018.01)
  *G06F 3/0482* (2013.01)

(56) References Cited

U.S. PATENT DOCUMENTS

| | | | |
|---|---|---|---|
| 10,469,304 B1* | 11/2019 | Kempe | H04L 63/0272 |
| 2007/0226248 A1* | 9/2007 | Darr | G06Q 10/10 |
| 2012/0311475 A1* | 12/2012 | Wong | G06F 11/3003 |
| | | | 715/772 |
| 2013/0159288 A1* | 6/2013 | Nikankin | G06Q 40/02 |
| | | | 707/722 |
| 2015/0019983 A1* | 1/2015 | White | G06F 16/26 |
| | | | 715/739 |
| 2018/0210927 A1* | 7/2018 | Karam | G06F 16/248 |
| 2018/0329958 A1* | 11/2018 | Choudhury | G06F 16/2343 |
| 2018/0330008 A1* | 11/2018 | Fan | G06F 16/90335 |
| 2020/0012741 A1* | 1/2020 | Bracholdt | G06F 16/288 |

\* cited by examiner

| Field 1810 | Input 1812 |
|---|---|
| Patient First Name | Danielle |
| Patient Last Name | David |
| Patient Race | Native Hawaiian |
| Patient Sex | Female |
| Patient Date of Birth | 12/02/1992 |
| City of Residence | Fort Belvoir |
| Military | ✓ |
| Civilan | |
| Reporting Health Dept. | RHC-Atlantic |
| Reporting Jurisdiction | Fort Belvoir |

FIG. 18A

Claim Details

Claim #
8325015

Type
Accident: vehicle other

Value
£3,660.00

Description
Tp reversed into client.

Incident Date
2017-06-13

Reported Date
2017-06-23

Status
Open

Name
Nathan Freeman

Email
NatFreemen@cuvoxcle

Telephone
077 8569 4563

Police Attended Scene
Yes

Police Reference Number
PR-3048569032

Fire Department Attended Scene
Yes

Ambulance Attended Scene
No

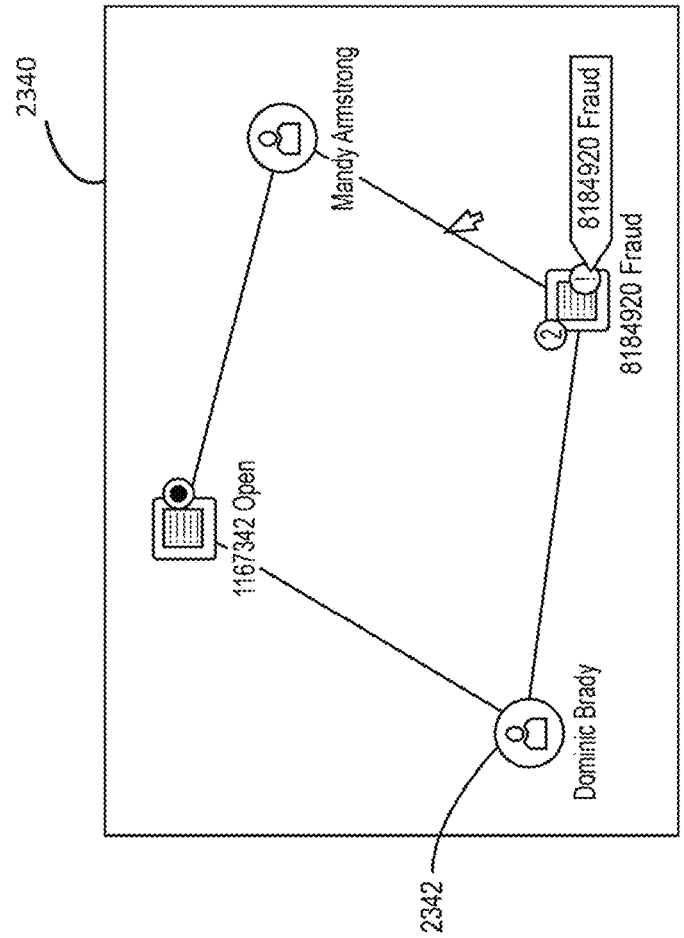

GRAPHICAL USER INTERFACE FOR SEARCHING ON A NETWORK PATTERN

CROSS-REFERENCE TO RELATED APPLICATIONS

This application claims the benefit of, and priority based on, 35 U.S.C. § 119 to U.S. Provisional Application No. 63,048,435, filed Jul. 6, 2020 and U.S. Provisional Application No. 62,992,110, filed Mar. 19, 2020, the disclosures of each of which are incorporated herein by reference in their entirety.

BACKGROUND

Network analytics plays an important part in a variety of areas including detecting and investigating criminal activity, tracking spread of contamination, and regulatory compliance issues. Analyzed networks often comprise a combination of relationships formed between entities. For example, there may be similar attributes in data associated with the entities indicating a relationship between the entities (e.g., similar names, similar location addresses, common events, etc.). As another example, external information from the data associated with the entities or other processes may draw entities together (e.g., an entity resolution). Network analytics may involve querying on a network pattern in these relationships for identifying complex organized activity (e.g., a criminal activity).

SUMMARY

In an example embodiment, a computer-program product tangibly embodied in a non-transitory machine-readable storage medium is provided. The computer-program product includes instructions to cause a computing system to display, in a graphical user interface, an initial graph with a plurality of icons. Each icon of the plurality of icons graphically represents respective data associated with a respective entity. The initial graph comprises a first icon of the plurality of icons graphically representing a first object of investigation. The first icon is connected in the initial graph to one or more other icons of the plurality of icons. The computer-program product includes instructions to cause a computing system to receive, from a user of the graphical user interface, an indication of a graphical network pattern. The graphical network pattern is defined by a user selection of a second icon of the plurality of icons in the initial graph and: a user selection of a third icon in the initial graph; or a user selection of a graphical representation in the initial graph of a relationship between the second icon and the third icon. The second icon and the third icon represent different data. The relationship is based on a relationship between a first entity associated with the third icon and a second entity associated with the second icon. The computer-program product includes instructions to cause a computing system to generate and send, based on the indication of the graphical network pattern, computer instructions indicating a network pattern query for searching an electronic database for one or more electronic records corresponding to a queried network pattern based on the graphical network pattern. The computer-program product includes instructions to cause a computing system to responsive to sending the computer instructions, receive a dataset indicating the one or more located electronic records corresponding to the queried network pattern. The computer-program product includes instructions to cause a computing system to generate output data indicating an output graph for a graphical representation of at least one located record of the one or more located electronic records. The output graph comprises a second object of investigation different than the first object of investigation.

In another example embodiment, a computing device is provided. The computing device includes, but is not limited to, a processor and memory. The memory contains instructions that when executed by the processor control the computing device to generate output data indicating an output graph for a graphical representation of at least one located record of the one or more located electronic records.

In another example embodiment, a method is provided of generating output data indicating an output graph for a graphical representation of at least one located record of the one or more located electronic records.

Other features and aspects of example embodiments are presented below in the Detailed Description when read in connection with the drawings presented with this application.

BRIEF DESCRIPTION OF THE DRAWINGS

FIGS. 18A-E illustrate an example network pattern query for contact tracing of people for various examples including an infectious viral disease in at least one embodiment of the present technology.

FIGS. 21A-D illustrate an example detection in a graphical user interface in an alert detection system in at least one embodiment of the present technology.

FIGS. 23A-D illustrate querying regarding a modified selected network pattern in a graphical user interface in at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
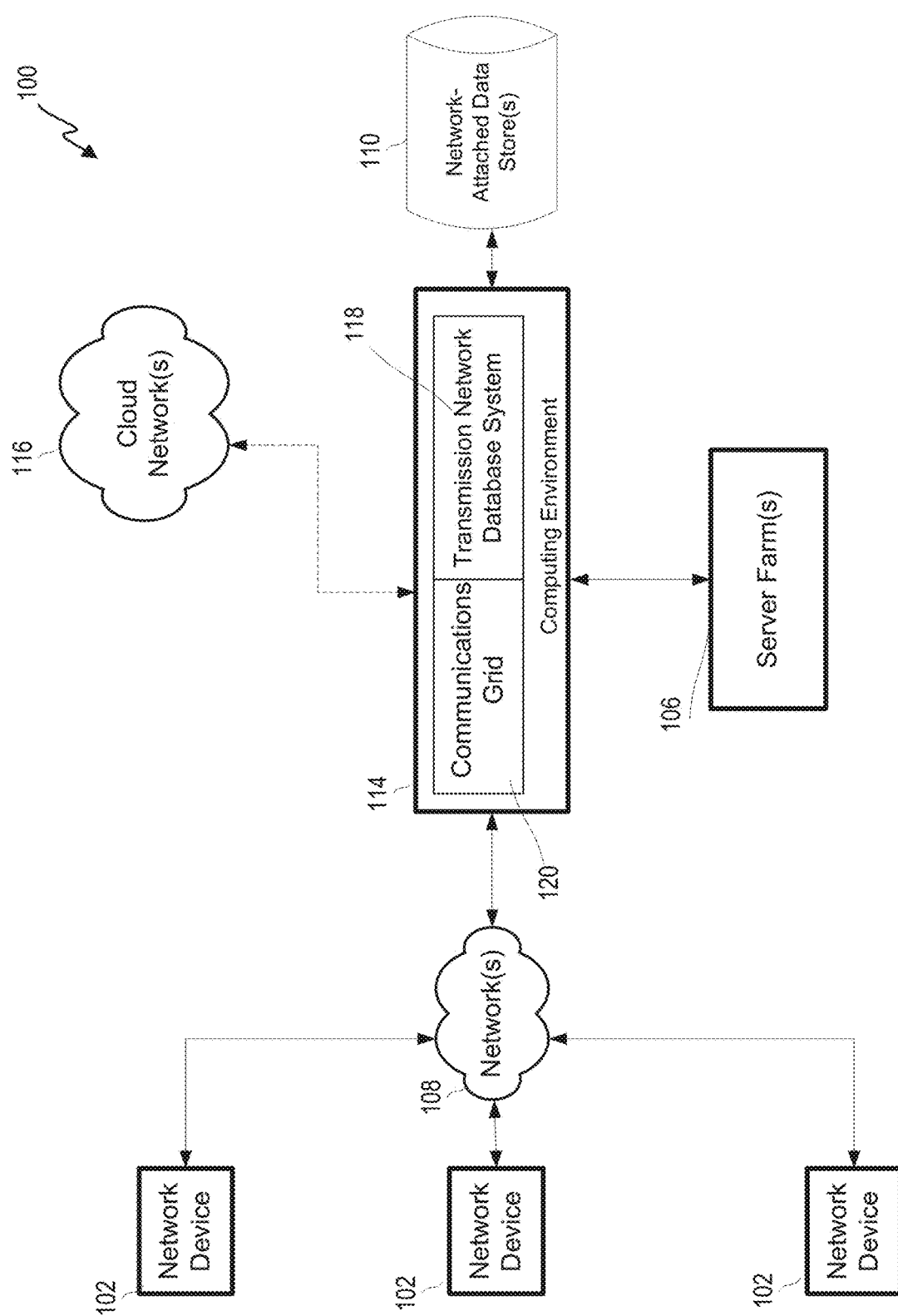
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
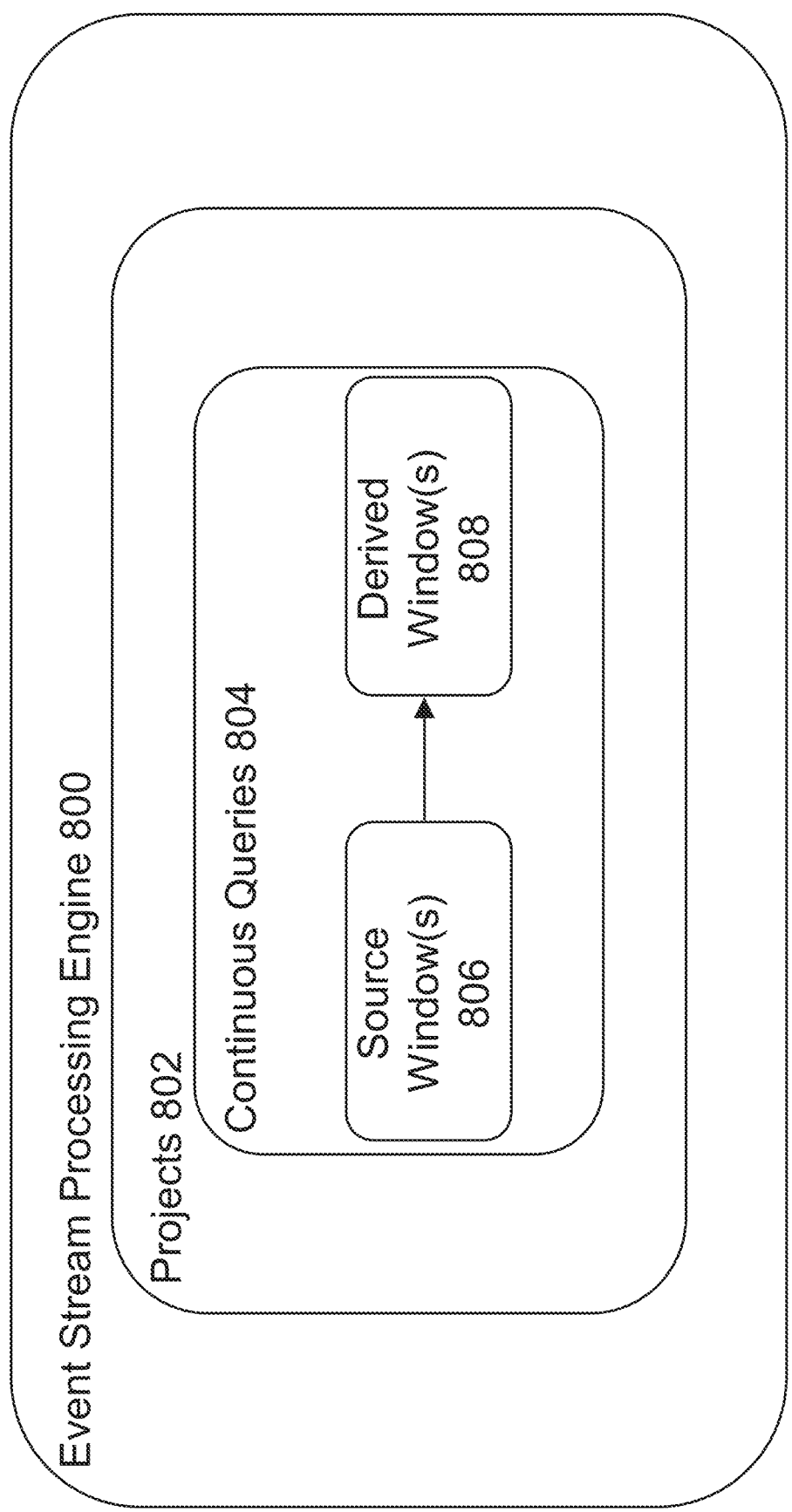
FIG. 8 illustrates a block diagram including components of an Event Stream Processing Engine (ESPE), according to at least one embodiment of the present technology.
Figure 9:
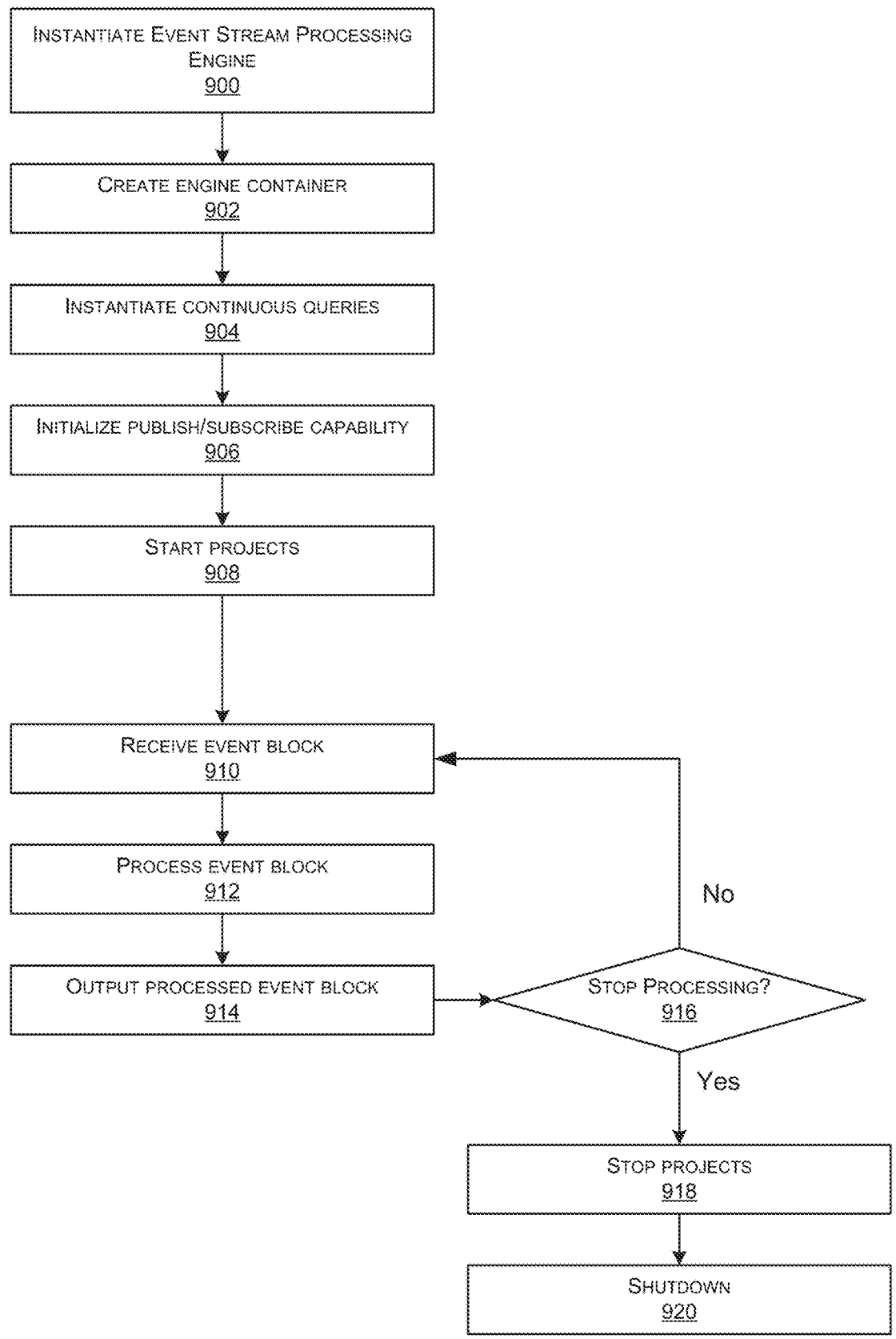
FIG. 9 illustrates a flow chart showing an example process including operations performed by an event stream processing engine, according to at least one embodiment of the present technology.
Figure 10:
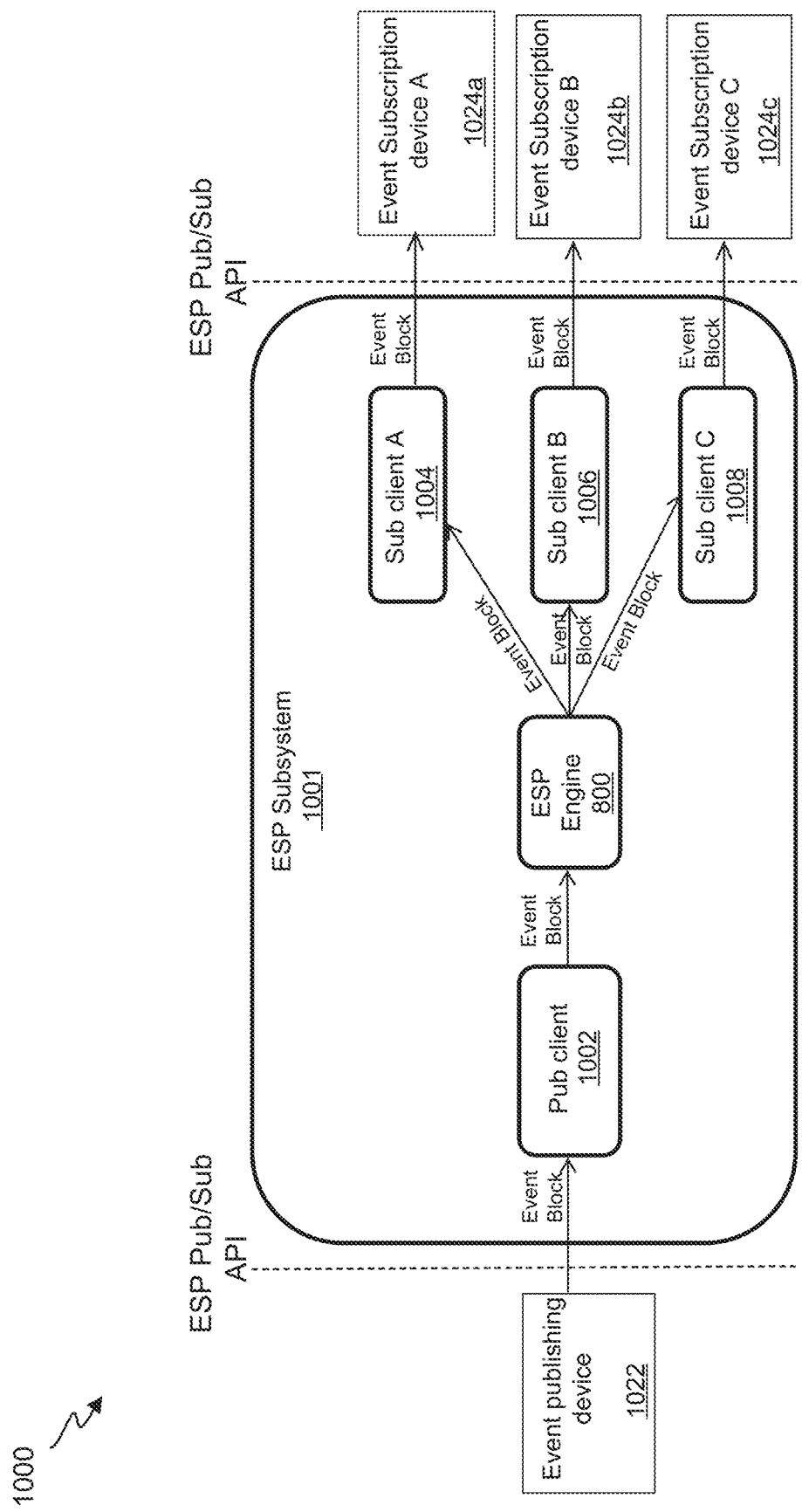
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may include automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
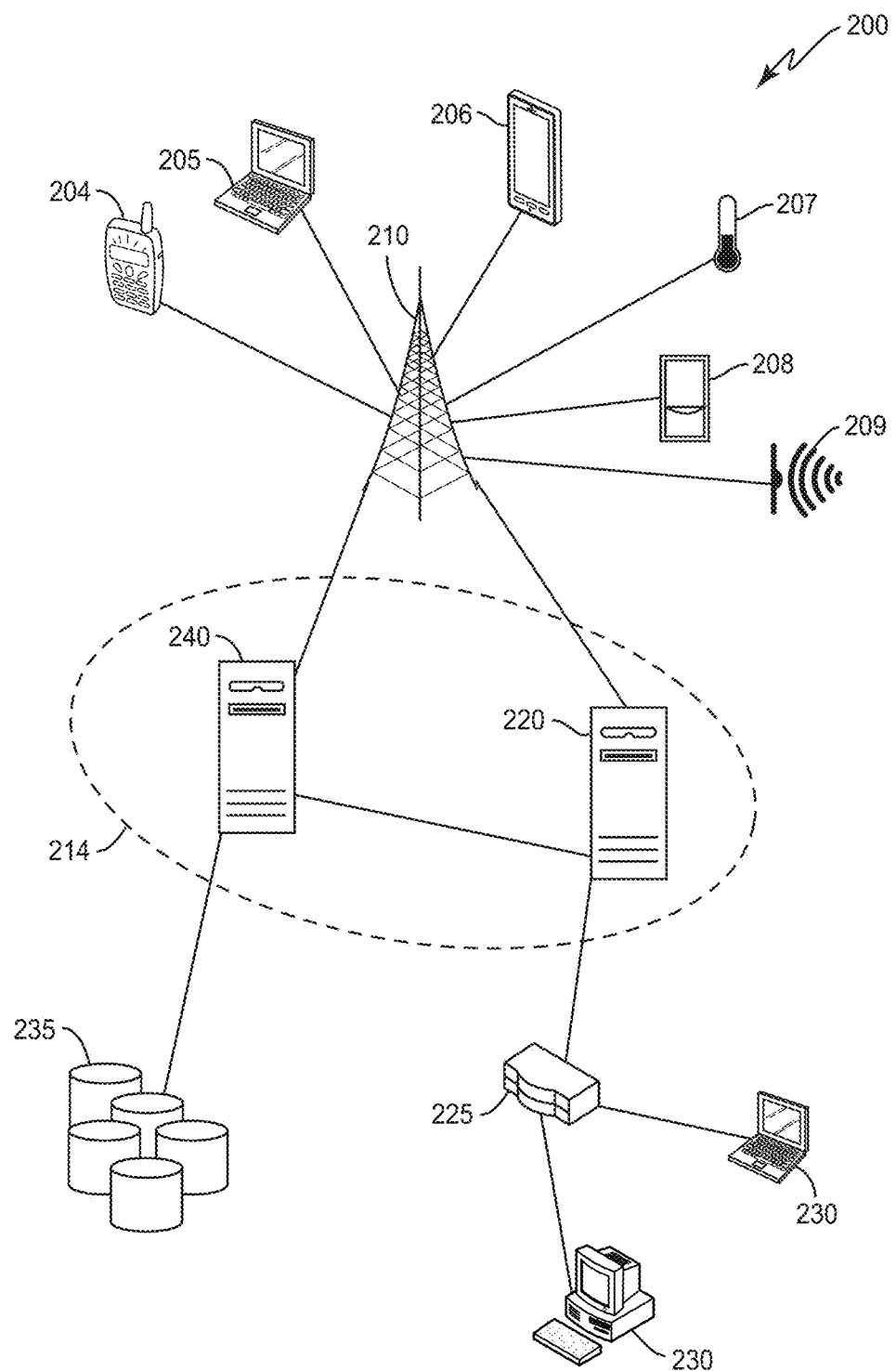
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
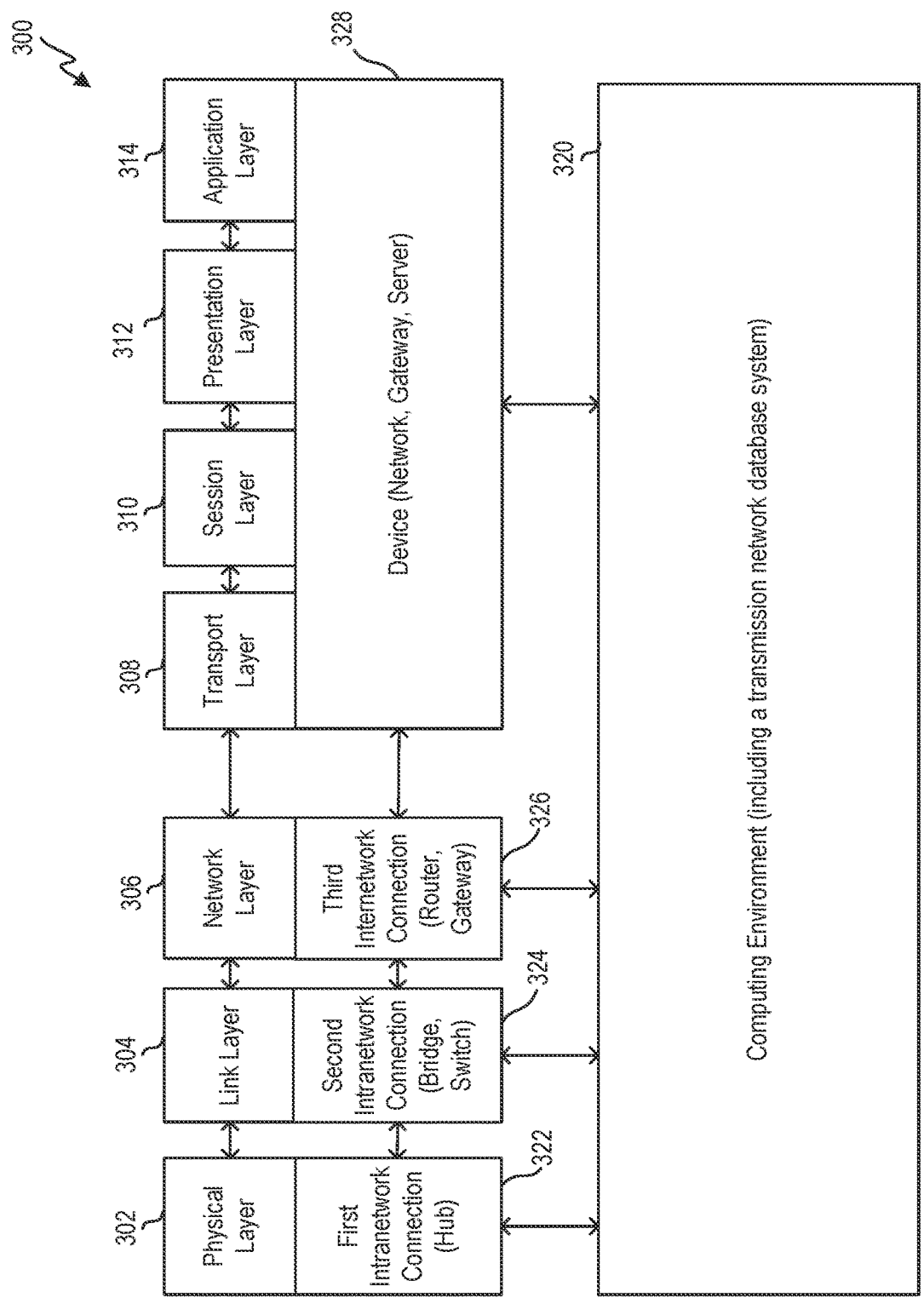
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 320 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data and is the farthest layer from the user in a communications system. On the other hand, the application layer is the highest layer because it interacts directly with a software application.

As noted, the model includes a physical layer 302. Physical layer 302 represents physical communication and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer 302 and a switch can operate in the link layer 304. Inter-network connection components 326 and 328 are shown to operate on higher levels, such as layers 306-314. For example, routers can operate in the network layer 306 and network devices can operate in the transport layer 308, session layer 310, presentation layer 312, and application layers 314.

As noted, a computing environment 320 can interact with and/or operate on, in various embodiments, one, more, all or any of the various layers. For example, computing environment 320 can interact with a hub (e.g., via the link layer) so as to adjust which devices the hub communicates with. The physical layer may be served by the link layer, so it may implement such data from the link layer. For example, the computing environment 320 may control which devices it will receive data from. For example, if the computing environment 320 knows that a certain network device has turned off, broken, or otherwise become unavailable or unreliable, the computing environment 320 may instruct the hub to prevent any data from being transmitted to the computing environment 320 from that network device. Such a process may be beneficial to avoid receiving data that is inaccurate or that has been influenced by an uncontrolled environment. As another example, computing environment 320 can communicate with a bridge, switch, router or gateway and influence which device within the system (e.g., system 200) the component selects as a destination. In some embodiments, computing environment 320 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 320 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
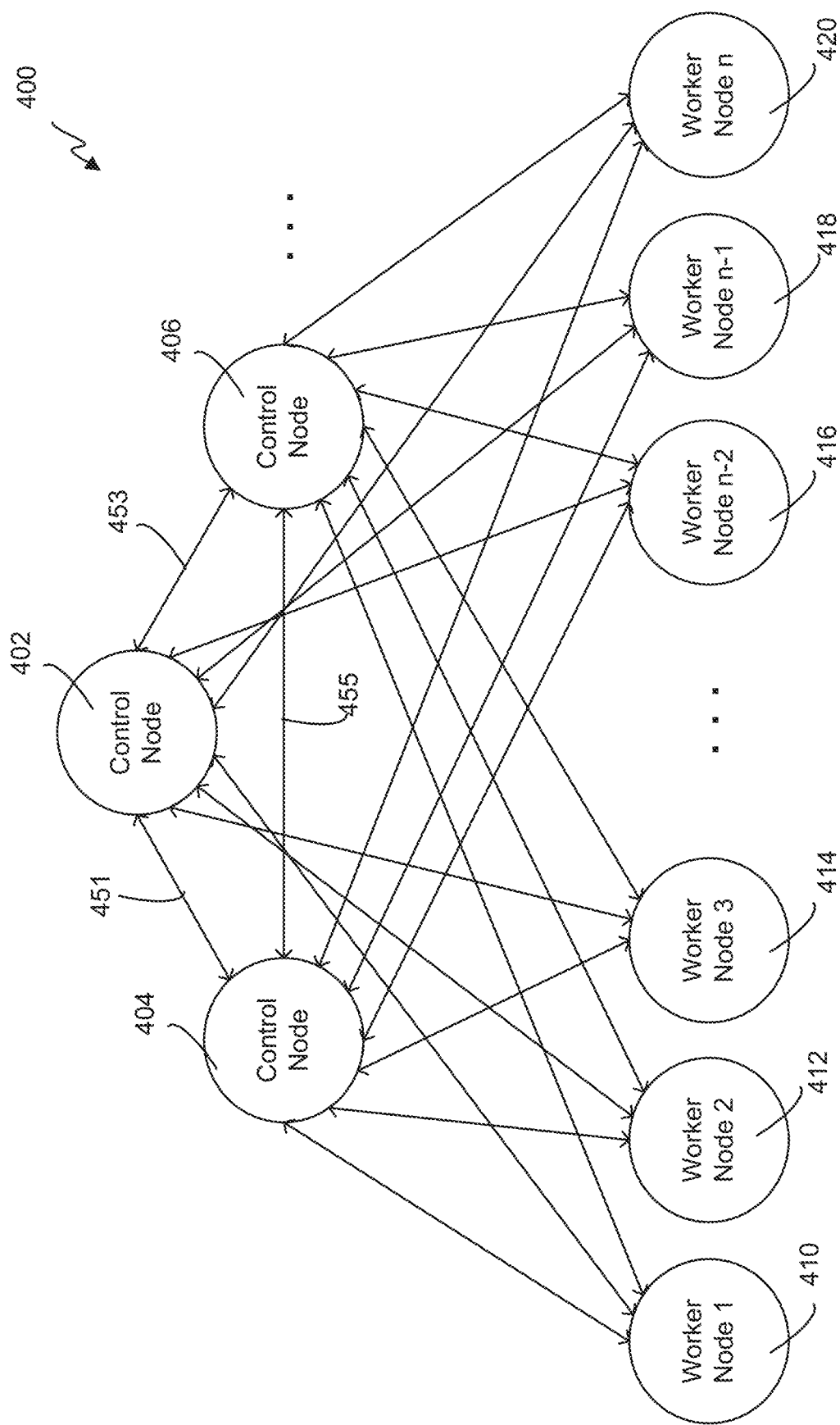
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
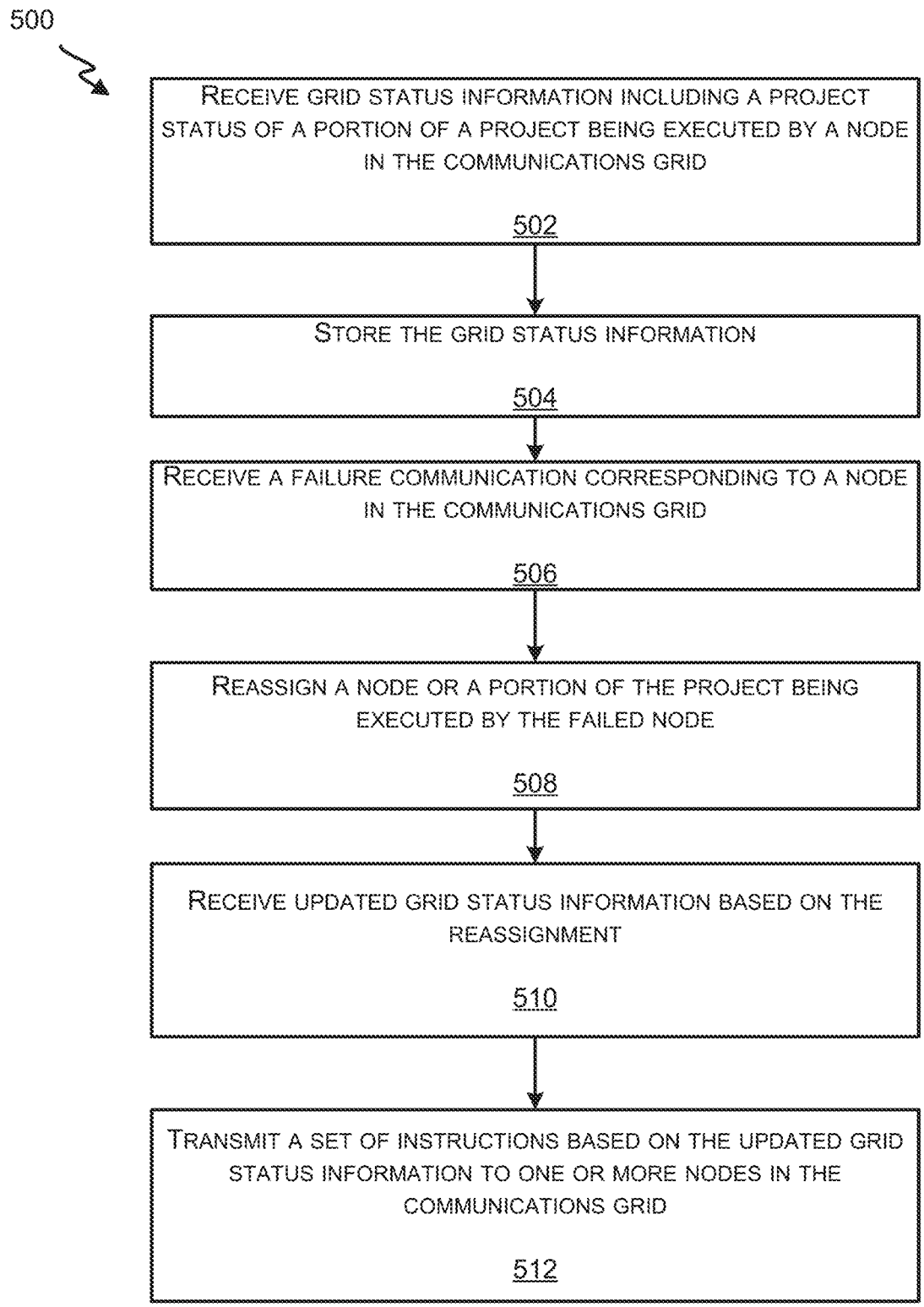
FIG. 5 illustrates a flow chart showing an example process for adjusting a communications grid or a work project in a communications grid after a failure of a node, according to at least one embodiment of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
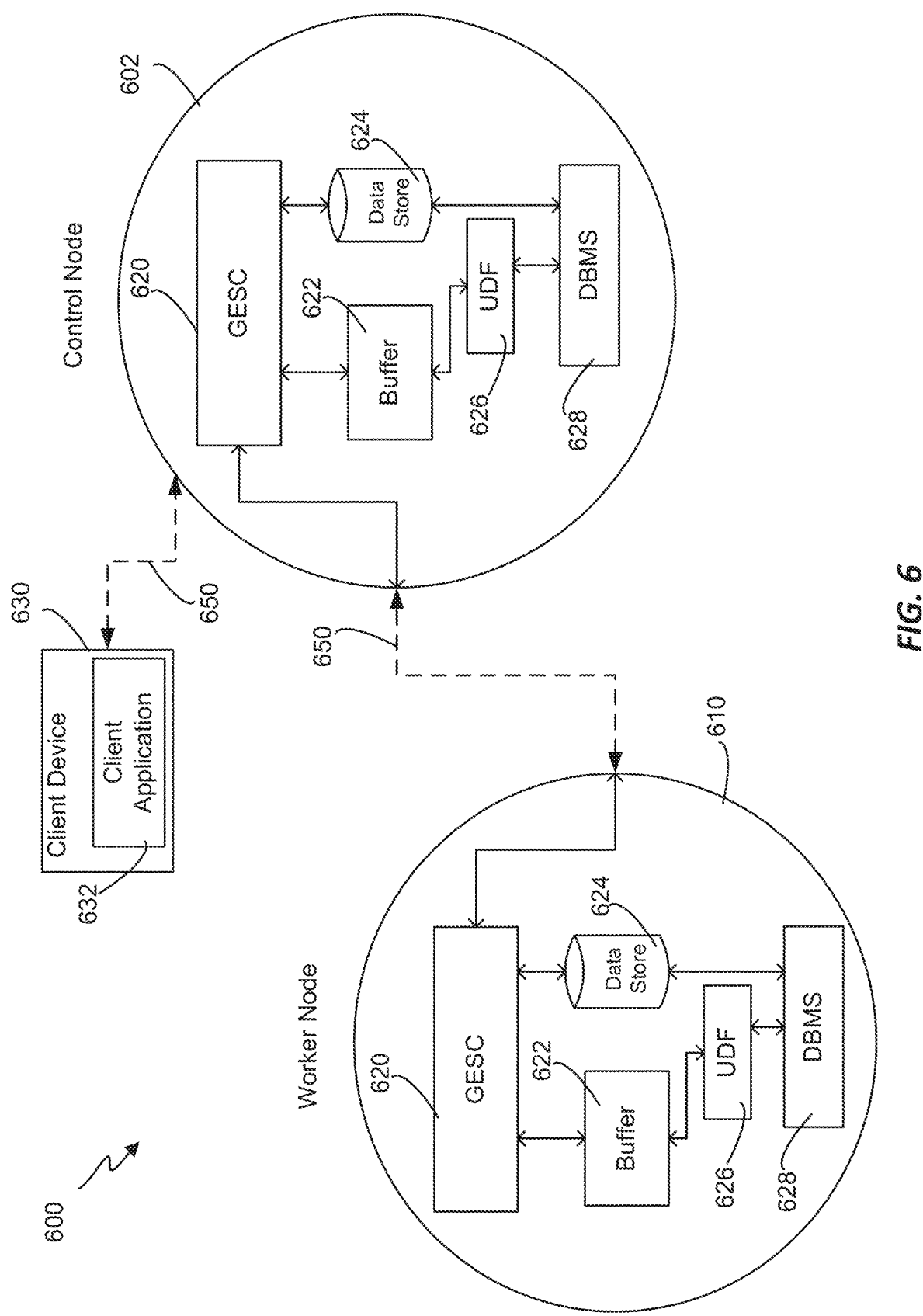
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
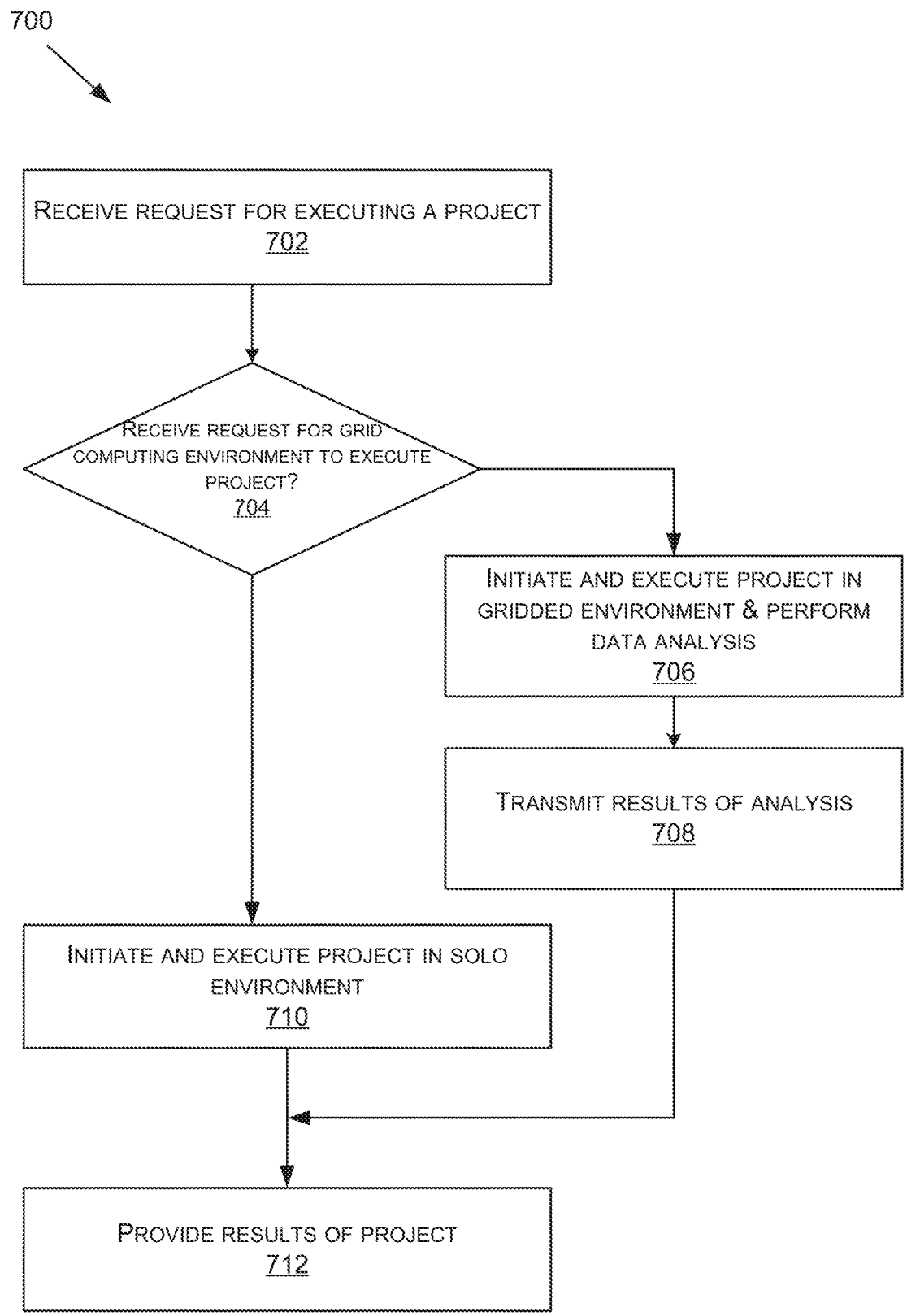
FIG. 7 illustrates a flow chart showing an example process for executing a data analysis or processing project, according to at least one embodiment of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
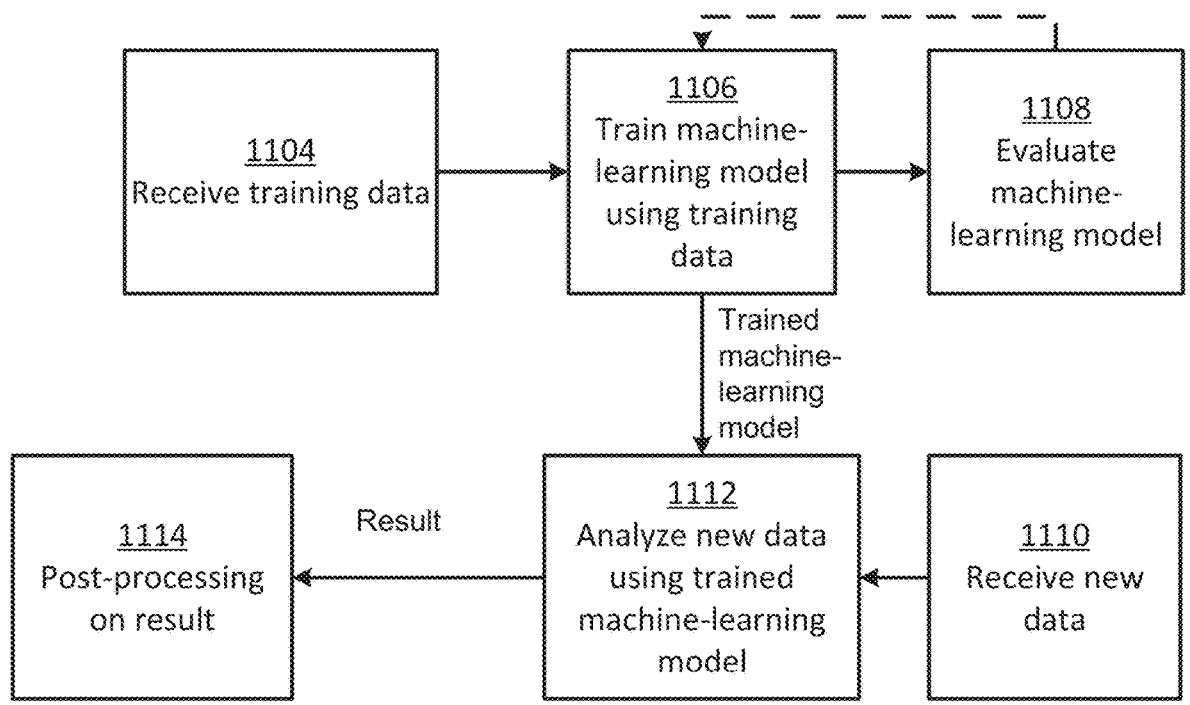
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
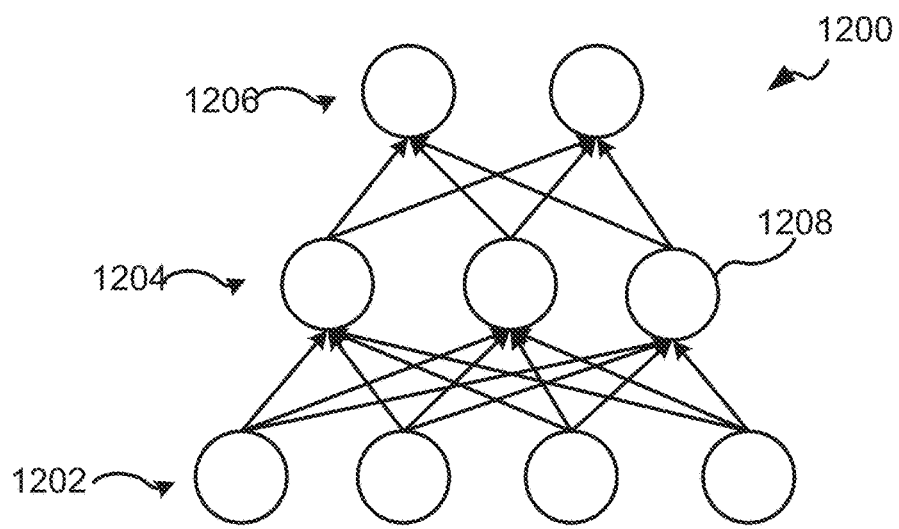
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation.

Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Investigators may use tools to visualize in a network graph the relationship between entities (e.g., for identifying criminal activity, tracking contamination, and accessing compliance with regulations). For instance, an investigator may be looking at a workspace in SAS® Visual Investigator provided by SAS Institute Inc. of Cary, N.C. and discover a set of relationships that indicates activity that is of interest. The investigator may want to look further into the pattern or determine whether this activity is more widespread than the specific found example. However, prior tools did not provide an easy way for investigators to search an identified network pattern in the initial graph in other network graphs. Investigators may want to search for an identified network pattern for a variety of applications where there are relationships between entities (e.g., customer intelligence, risk assessment, healthcare analysis, contamination tracking, criminal investigations, fraud analysis, etc.). Relationships can be formed in different ways, such as inherently (e.g., from data matching records associated with different entities), through an entity resolution process, or based on associations with events.

For an investigator, manually looking for complex relationships extending from an investigation (e.g., broadening that to look for all cases of the behaviour) is difficult and time consuming (e.g., it may require working with analysts across different platforms).

Figure 13A:
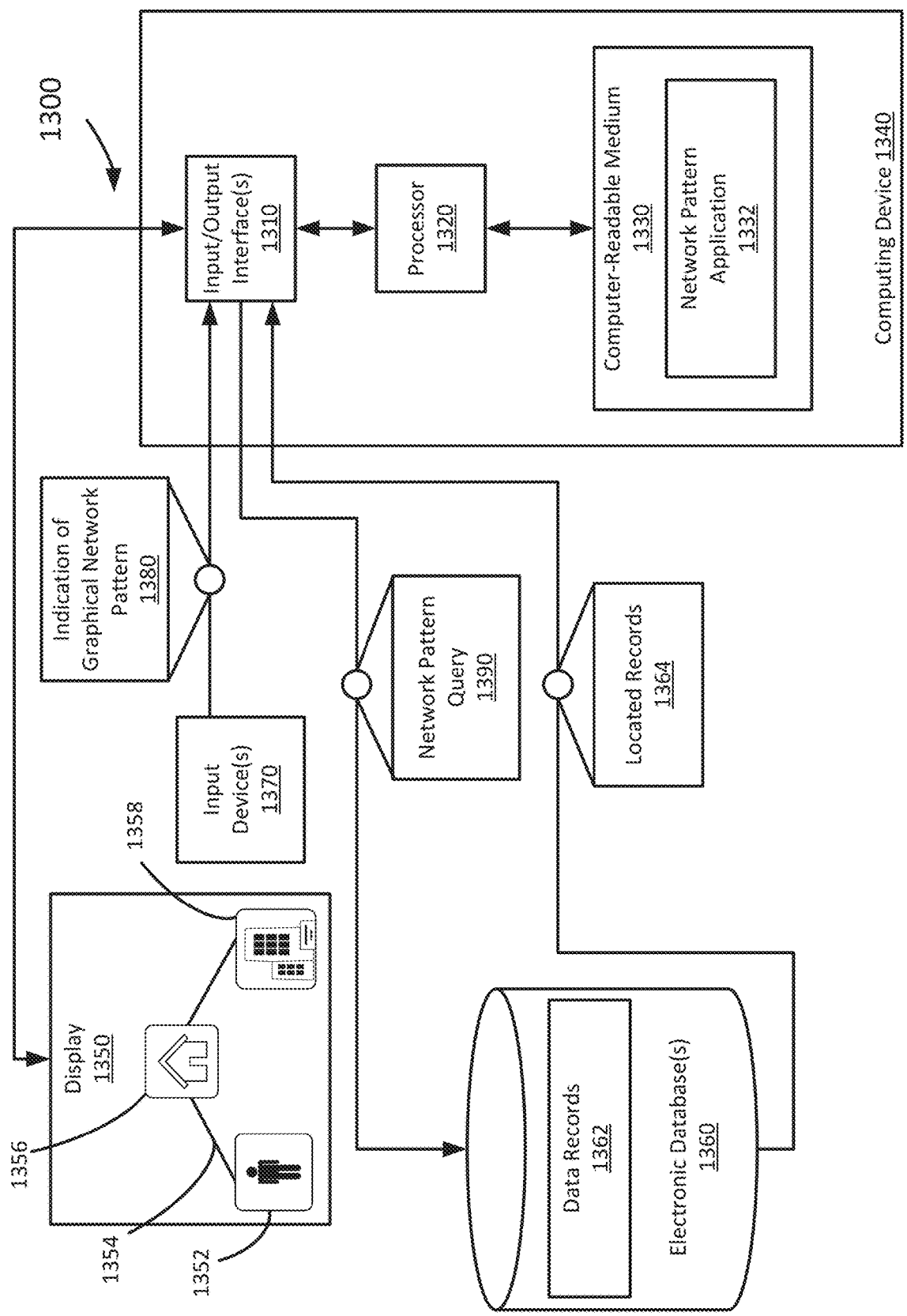
FIG. 13A illustrates an example block diagram of a system for querying a network pattern in at least one embodiment of the present technology.

FIG. 13A illustrates a block diagram of a query system 1300 for querying a network pattern. In this example, the query system 1300 comprises one or more electronic databases 1360 for storing data records 1362, a display 1350 for displaying information, a computing device 1340, and one or more input devices 1370 for inputting information into the computing device 1340.

A computer network (not shown) can connect one or more devices of query system 1300 to one or more other devices of query system 1300. The query system can comprise more or fewer components. For example, the display 1350 may itself be an input and output device (e.g., a touch screen) or there may be other output devices such as a printer or storage. Alternatively, or additionally, one or more devices in the query system 1300 are integrated together or comprise one or more components. For instance, devices could comprise one or more input and/or output interfaces for receiving and sending information, processors for processing information, and computer-readable medium for storing instructions for processing not explicitly shown.

The query system 1300 is configured to exchange information between devices in the system (e.g., via wired and/or wireless transmission). For instance, the computing device can query the electronic database for information pertaining to data records 1362 or can communicate with the display 1350 for displaying information related to the data records 1362 (e.g., a network graph).

As shown in FIG. 13A, the display 1350 displays, in a graphical user interface, a network graph with icons. For instance, the display 1350 comprises a location icon 1356 representing a location entity (e.g., a residential location, a corporate office, a restaurant), a person icon 1352 representing a person entity, and a company icon 1358 representing a company entity. More or fewer icons could be displayed in the network graph. For instance, other icon types could have been used to represent other types of entities. Each icon of the display 1350 graphically represents respective data associated with a respective entity. For instance, there may be social security, birth records, or purchase records associated with the person icon 1352. The icons are connected to one another in the graph graphically representing a relationship between icons. For instance, the icons may be connected based on one or more attributes of an entity. As an example, the person entity may have a name attribute that is the same or similar to a name on a deed record associated with a location entity. A link 1354 may be used to show a connection or relationship between person icon 1352 and location icon 1356.

Network graphs can be used to investigate relationships between entities for determining network patterns (e.g., a criminal patterns, contamination spread patterns, etc.). A graphical network pattern may comprise selected icons and/or relationships in a network graph that may be used to understand or make a determination regarding a connection in the data. The icons may represent different entities depending on the application. For example, an object of investigation could be an event (e.g., an interview, an alert, a flight occurring) or an object in a physical environment (e.g., a person, a place, a vehicle, a ticket, or a receipt) examined in a network graph.

One or more embodiments herein allow a user to interact with the display 1350 or one or more input devices 1370 to indicate a graphical network pattern (e.g., for querying on a selected network pattern). For instance, the input device could be a mouse or track pad for selecting icons on the display 1350 or a keyboard for setting filters regarding a query on that network pattern. As an example, if the user is investigating a person associated with a first icon (e.g., person icon 1352) the user may notice a pattern of connection with a second icon (e.g., location icon 1356) and select the second icon and a relationship (e.g., link 1354) defining a network pattern between the person icon 1352 and the location icon 1356. As another example, the user may select two icons (e.g., location icon 1356 and company icon 1358) and define a network pattern not even including the object of investigation (e.g., for further investigation of a different object).

In FIG. 13A, the computing device 1340 can receive information over an input/output interface 1310 (e.g., user selections indicating an indication 1380 of a graphical network pattern). In this example, the same interface supports input/output interface 1310. For example, the display may be a touch screen providing a mechanism for user input and for presentation of output to the user. Alternatively, the input/output interface 1310 has one or more input interfaces that uses the same or different interface technology. Alternatively, or additionally, the input/output interface 1310 has one or more output interfaces that uses the same or different interface technology.

The computing device 1340 comprises a computer-readable medium 1330. The computer-readable medium 1330 is one or more electronic holding places or storage for information so the information can be accessed by processor 1320. Computer-readable medium 1330 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

The computing device 1340 comprises a processor 1320. The processor 1320 executes instructions (e.g., stored at the computer-readable medium 1330). The instructions can be carried out by a special purpose computer, logic circuits, or hardware circuits. In one or more embodiments, processor 1320 is implemented in hardware and/or firmware. Processor 1320 executes an instruction, meaning it performs or controls the operations called for by that instruction. The term "execution" is the process of running an application or the carrying out of the operation called for by an instruction. The instructions can be written using one or more programming languages, scripting languages, assembly languages, etc. Processor 1320 operably couples with input/output interface 1310 and with computer-readable medium 1330 to receive, to send, and to process information. Processor 1320 in one or more embodiments can retrieve a set of instructions from a permanent memory device and copy the instructions in an executable form to a temporary memory device that is generally some form of RAM In one or more embodiments, computer-readable medium 1330 stores instructions for execution by processor 1320. For example, computer-readable medium 1330 could comprise instructions for a network pattern application 1332 for querying on network patterns. In one or more embodiments, one or more applications stored on computer-readable medium 1330 are implemented in software (e.g., computer-readable and/or computer-executable instructions) stored in computer-readable medium 1330 and accessible by processor 1320 for execution of the instructions. The applications can be integrated or connected with other analytic tools (e.g., offered by SAS Institute Inc. of Cary, N.C., USA such as SAS® Visual Investigator, SAS® Visual Graph Query Builder, SAS® Cloud Analytic Services, CAS, SAS® Visual Data Mining, and SAS® Viya). Computing device 1340 is shown as a single device as an example but could be a computing system with more or fewer components (e.g., implementing with different computing nodes for receiving a network pattern and querying electronic databases).

In one or more embodiments, computing device 1340 generates based on the indication 1380, computer instructions indicating a network pattern query 1390 for searching one or more electronic databases 1360. The searching could comprise searching the one or more data records 1362 for records corresponding to a queried network pattern based on the graphical network pattern (i.e., based on the user selected network pattern). The queried network pattern may be the same or different from a selected network pattern. For example, the user or administrator of the network pattern application 1332 may have set defaults or configured the queried network pattern to be different in attributes than a selected network pattern (e.g., locations on the same street as the location entity as opposed to the exact address and insurance claims or loan applications of similar value as opposed to the exact value).

In one or more embodiments, computing device 1340, based on the indication 1380, sends computer instructions indicating the network pattern query 1390. For example, the computer instructions are sent to the one or more electronic database 1360 or a computing device or system managing the one or more electronic databases 1360.

Responsive to sending the computer instructions, the computing device receives a dataset indicating one or more located electronic records 1364 corresponding to the queried network pattern (e.g., from the one or more electronic databases 1360). For instance, the network pattern may be found in other data records not associated with icons of display 1350. Further, the one or more electronic databases 1360 could comprise multiple distinct electronic databases, and located electronic records 1364 could comprise electronic records from at least two of the multiple distinct electronic databases. For instance, in a criminal investigation, a police officer may query records from criminal databases at the police station and externally (e.g., records from public databases). A contact tracing investigation may query records from geolocation tracking databases and from databases of collected interviews.

The computing device 1340 (e.g., using network pattern application 1332) can generate output data indicating an output graph for a graphical representation of one or more located records. For instance, the display 1350 may display a new output graph. The output graph may be a new graph in that it comprises a second object of investigation different than the first object of investigation. Alternatively, or additionally, the computing device may generate information for displaying or selecting a new output graph (e.g., setting an alert for generating a new output graph or providing a data table of possible network graphs for further investigation).

Figure 13B:
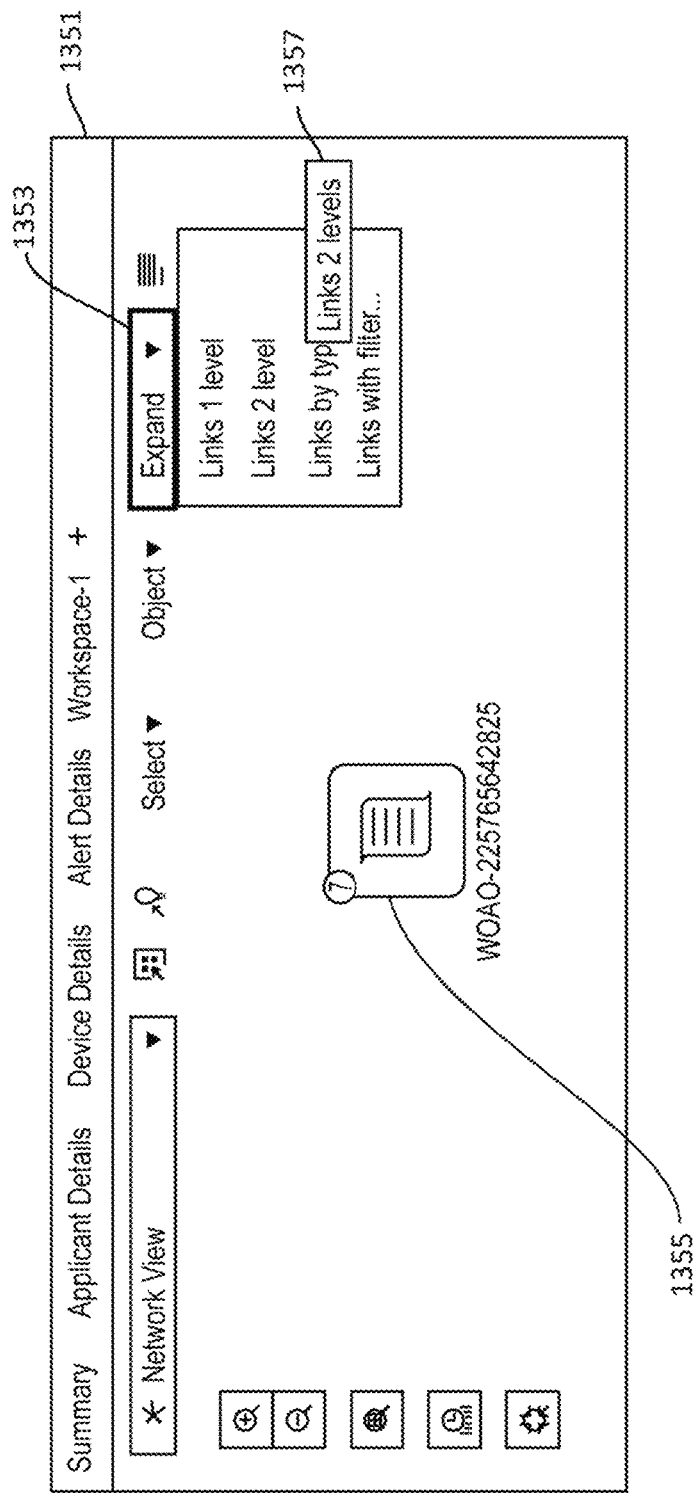
FIGS. 13B-13C illustrates an example graphical user interface for displaying a network pattern in at least one embodiment of the present technology.

In one or more embodiments, the display 1350 may display an initial network graph or an output graph in response to a detection system detecting one or more attributes for a network entity. For example, FIG. 13B displays an example Fraud & Security Intelligence (FSI) loan application icon 1355 in a graphical user interface 1351 in response to an alert of a detection system for detecting fraud. A user can expand a network graph related to the loan application icon 1355 using expand controls 1353. For instance, a computing system can receive a user selection of a distance from the first object of investigation for icon connections in a given graph of the initial graph or output graph. In this case, the user has selected Links 2 level option 1357 to display a network graph of icons that are two links away from the application icon 1355.

Figure 13C:
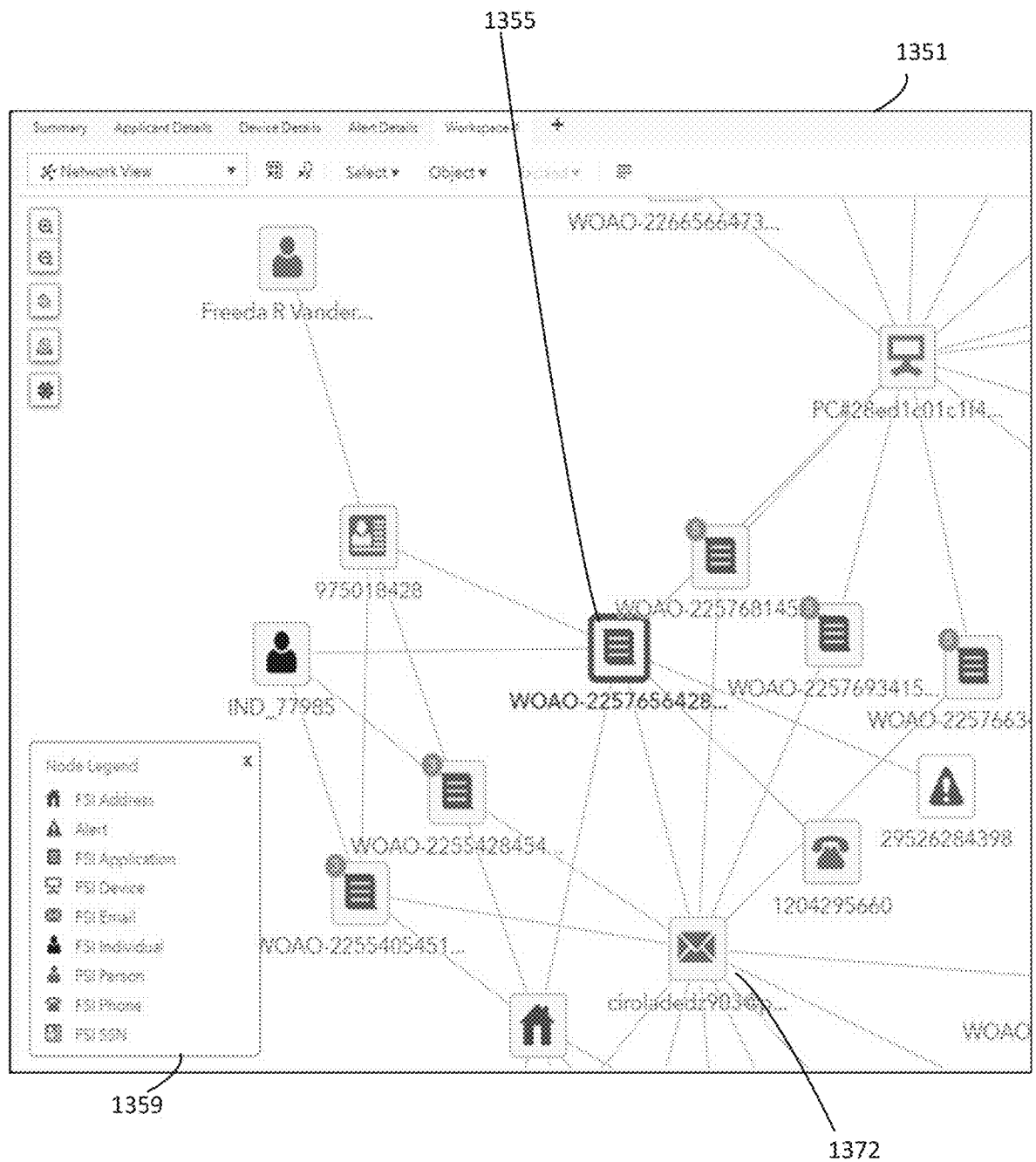

Responsive to the user selection, the computing system can display the given graph as a subgraph of a larger graph. As shown in FIG. 13C the network graph in graphical user interface 1351 has expanded to show a larger network graph with different icon types including addresses, alerts, applications, devices, emails, individuals, persons, phones, and SSNs as shown in node key 1359. The user can continue to expand the subgraph to display more associated icons of the larger graph in response to user selection of an icon of the given graph (e.g., selecting email icon 1372 will display more icons connected to this icon).

The icons could be brought together in a network graph as part of an entity resolution process. For instance, the initial graph may depict multiple icons associated with electronic records resolved to describe a same entity in some regard (e.g., a phone account is associated with an email account of a same person entity). The graphical user interface 1351 could be provided by SAS® Visual Investigator, which is a software program designed to address a wide variety of investigation management and intelligence analysis needs. SAS® Visual Investigator has multiple components that help provide investigators with additional insight such as Search and Discovery, Alert Triage, Case Management, and Social Network Analysis. Search and Discovery can be used to search across data and visualize the data in numerous different ways such as in tabular form, as a network, or in a map. Alert Triage can be used to organize and route alerts to different users for investigation and dispositioning by users. Case Management can be used to create cases containing relevant information acquired during an investigation. Social Network Analysis can be used to explore the relationships between the data to gain additional insights. The computer-readable medium 1330 of computing device 1340 in FIG. 13A could store instructions for one or more components of SAS® Visual Investigator.

Administrators of SAS® Visual Investigator can quickly define and alter how the data is modeled and visualized in SAS® Visual Investigator by defining entities, relationships between entities, and transactions. The customizable user interface in SAS® Visual Investigator can be extended with custom user interface components and widgets called Solution Extensions to provide users with additional ways to view and interact with their data. Entities relationships and transactions can have any number of attributes associated with them (e.g., a person entity might have first name, surname and date-of-birth attributes, and the relationship between the person and an insurance claim might have the person's role on that insurance claim as an attribute).

Entities, relationships, and transactions vary across different business domains. For instance, entities that may be configured for use in detecting loan application fraud at a bank include loan applications, people, addresses. The way the data is modeled and visualized can be thought of as a graph where the entities are the nodes, and the relationships and transactions are the links. SAS® Visual Investigator provides the users with a way of visualizing and traversing the graph through Network Workspaces. For example, a user of the application fraud detection system may start their investigation by analyzing a suspicious application and then decide that they wish to know more about the applicant. The user can traverse from the application through the applicant to other applications and beyond to see all related activity and entities as seen in FIG. 13C.

Being able to visually explore these relationships can be extremely valuable. However, identifying interesting activity amongst the network of related entities can often be difficult. A user exploring these relationships may ask: Do the current entities under investigation link to anything of interest or form part of an interesting set of relationships? For example, does the loan investigated connect to any previously known fraudulent loan applications? Alternatively, or additionally, a user exploring these relationships may ask: Does an observed pattern of interest occur anywhere else? For example, are there other loans in a system that link to any previously known fraudulent loan applications?

One or more embodiments use a network pattern application 1332 to find relationships between entities. For instance, the network pattern application 1332 may comprise one or more features of SAS® Cloud Analytic Services (CAS) action patternMatch which executes graph queries. Its functionality enables searching copies of a query graph within a larger graph, with the option of respecting node or link attributes (or both). One or more embodiments present a way for users of a graphical user interface (e.g., SAS® Visual Investigator users) to dynamically identify a pattern of interest within their existing investigations, and from that pattern, generate alerts for other occurrences of this activity, thereby putting the ability to answer key questions in the hands of the investigator.

The action patternMatch is in the Network action set, which is provided in, for example, SAS® Visual Data Mining SAS® Viya. The patternMatch action is one of many network analytics algorithms from the Network action set. Others include centrality, community detection, and shortest path. The Network action set provides users with a toolkit for analyzing graphs and generating insights that can be used to supplement machine learning models and drive business rules.

Graph analytics has applications in many scenarios such as modeling the flow of water through pipes, modeling protein-protein interactions in biology, modeling fraud and financial crime. For example, modeling the flow of money through parties can be used to detect money laundering, and understanding the relationships between people and their associated events can uncover organized criminal groups.

A graph in graph analytics can be defined by a set of entities and relationships. Entities can also be called nodes or vertices of the graph and can be represented by an icon in a graphical representation. Relationships can be referred to as links or edges of the graph and can be represented as a connector between icons of the graph. The entities and relationships have attributes such as node type or link date. Given a query graph on a network pattern formed from a subgraph of a larger graph, network pattern query can be used to identify subgraphs of the larger graph that are isomorphic to the query graph. A graph is said to be isomorphic to another if it has the same node and link structure (i.e., if they are topologically identical). The patternMatch action also ensures that the attributes of the query graph have corresponding, matching attributes in the returned subgraphs. In this definition of attributes for the action, attributes of the graph could refer to one or a combination of these elements: node attributes, link attributes, or a combination of node and link attributes, and graph attributes.

For instance, a computing system (e.g., query system 1300) can generate computer instructions indicating the network pattern query by generating a computer instruction for searching on a given attribute of a first entity, a given attribute of a second entity, and a given attribute of a given link in the queried network pattern. The attribute of a link, for instance, could be a weight or role according to a patternMatch action. For instance, a role could be a policy holder connecting a person entity with a claim entity. A dataset indicating one or more located electronic records 1364 comprises a node mapping identifying a node identity and one or more node attributes in a subgraph corresponding to the queried network pattern. Alternatively, or additionally, the dataset comprises a mapping identifying node end points of linked nodes and an attribute of a link connecting the node end points corresponding to the queried network pattern. A generated output graph can be based on the nodes mapping.

For instance, using an undirected graph G that one link attribute (weight) and one node attribute (color), the graph can be represented in data using the links data table, mycas. Links and nodes data table, mycas. Nodes below. Each node has a node attribute color, and each link has a link attribute weight.

```
data mycas.Links;
    input from $ to $ weight @@;
    datalines;
A B 5 A C 5 A D 5 A E 3 B C 5
B D 5 B E 5 C D 5 C E 5 D E 5
F G 4 F H 3 G H 3 E F 2 E J 2
J I 4 J K 4 J L 4 I K 4 I L 4
K L 4 I O 1 K N 1 L M 2 M N 4
M O 4 M P 4 N P 4 N O 4 P O 4
;
data mycas.Nodes;
    input node $ color $ @@;
    datalines;
A red B blue C green D red E green
F blue G red H green I purple J blue
K green L red M blue N yellow O purple
P green
;
```

The query graph Q can be represented using the nodes data table, mycas. NodesQuery, and links data table, mycas. LinksQuery, that are created by the below DATA steps. The missing link weight values in the query graph are treated in this example as wildcards. They indicate that the weight of that particular link in the pattern can be any value. The missing observations in the nodes data table for the query graph are also treated as wildcards. A wildcard indicates that the associated attribute can take any value.

```
data mycas.NodesQuery;
    input node color $;
    datalines;
1 green
2 blue
5 blue
```

-continued

```
        6 green
;
data mycas.LinksQuery;
    input from to weight;
    datalines;
1 2 .
1 3 .
2 3 .
3 4 1
4 5 .
5 6 .
4 6 .
;
```

The output data table in Table 1 now contains the mapping from nodes in the query graph to nodes in the main graph for each pattern match. The output data table in Table 2 now contains the subgraphs for each pattern match.

TABLE 1

| match | nodeQ | node | color |
|---|---|---|---|
| 1 | 1 | K | green |
| 1 | 2 | J | blue |
| 1 | 3 | I | purple |
| 1 | 4 | O | purple |
| 1 | 5 | M | blue |
| 1 | 6 | P | green |
| 2 | 1 | P | green |
| 2 | 2 | M | blue |
| 2 | 3 | O | purple |
| 2 | 4 | I | purple |
| 2 | 5 | J | blue |
| 2 | 6 | K | green |

The output data table in Table 2 now contains the subgraphs for each pattern match.

TABLE 2

| match | from | to | weight |
|---|---|---|---|
| 1 | I | K | 4 |
| 1 | I | O | 1 |
| 1 | J | I | 4 |
| 1 | J | K | 4 |
| 1 | M | O | 4 |
| 1 | M | P | 4 |
| 1 | P | O | 4 |
| 2 | I | K | 4 |
| 2 | I | O | 1 |
| 2 | J | I | 4 |
| 2 | J | K | 4 |
| 2 | M | O | 4 |
| 2 | M | P | 4 |
| 2 | P | O | 4 |

A network pattern query enables users to search for many different properties of varying complexity of a graph. A network pattern query can search on topology by specifying the links between the nodes to define the structure of the graph to query for, without specifying particular individual attributes of the nodes or links. For example, a user may want to search for the cyclical flow of money but not care much for the attributes of the entities between which the money passes.

Alternatively, or additionally, a network pattern query can query on node and link attributes by specifying attributes of the nodes and links in the query graph to perform exact matching on those attributes. For example, a user may wish to see all motor insurance claims that are marked as open and that are linked indirectly to a known fraudulent claim. A network pattern query can query on inexact match criteria for node or link attributes. For example, a user may wish to filter on motor insurance claims where the claim value is greater than $1000, or filter on people who are marked as either a known fraudster or a suspected fraudster. The functions can use true or false evaluation.

Alternatively, or additionally, a network pattern query can query on functions that act on node and link attributes. This method enables the user to specify comparative criteria between nodes and links for matching. An example of this could involve an investigator looking for events that are sequential in time. A network pattern query can query on graph attributes that act across the whole graph for specific match criteria. This feature could be used to match against aggregate attributes of a subgraph, for example, the sum of all motor insurance claim values on a subgraph. It could also be used to determine whether the average score of all scored entities on a subgraph exceeds a threshold.

There may be several factors inhibiting an investigator from using graph query tools. First, the interface to traditional network pattern queries is through computer code. Investigators may not have access to or knowledge of how to use a coding environment. Second, an investigator may not know how to use code to prepare the data for use in network pattern query. Third, the investigator may not know how to review the output and relate it to something they have observed within a graphical display (e.g., SAS® Visual Investigator). One or more embodiments integrate network pattern query capabilities with the graph-like data model found in displays such as SAS® Visual Investigator. For instance, SAS® Visual Graph Query Builder provided by SAS Institute Inc. of Cary, N.C. enables users to both perform graph searches and visualize the results in a display such as SAS® Visual Investigator.

Figure 14:
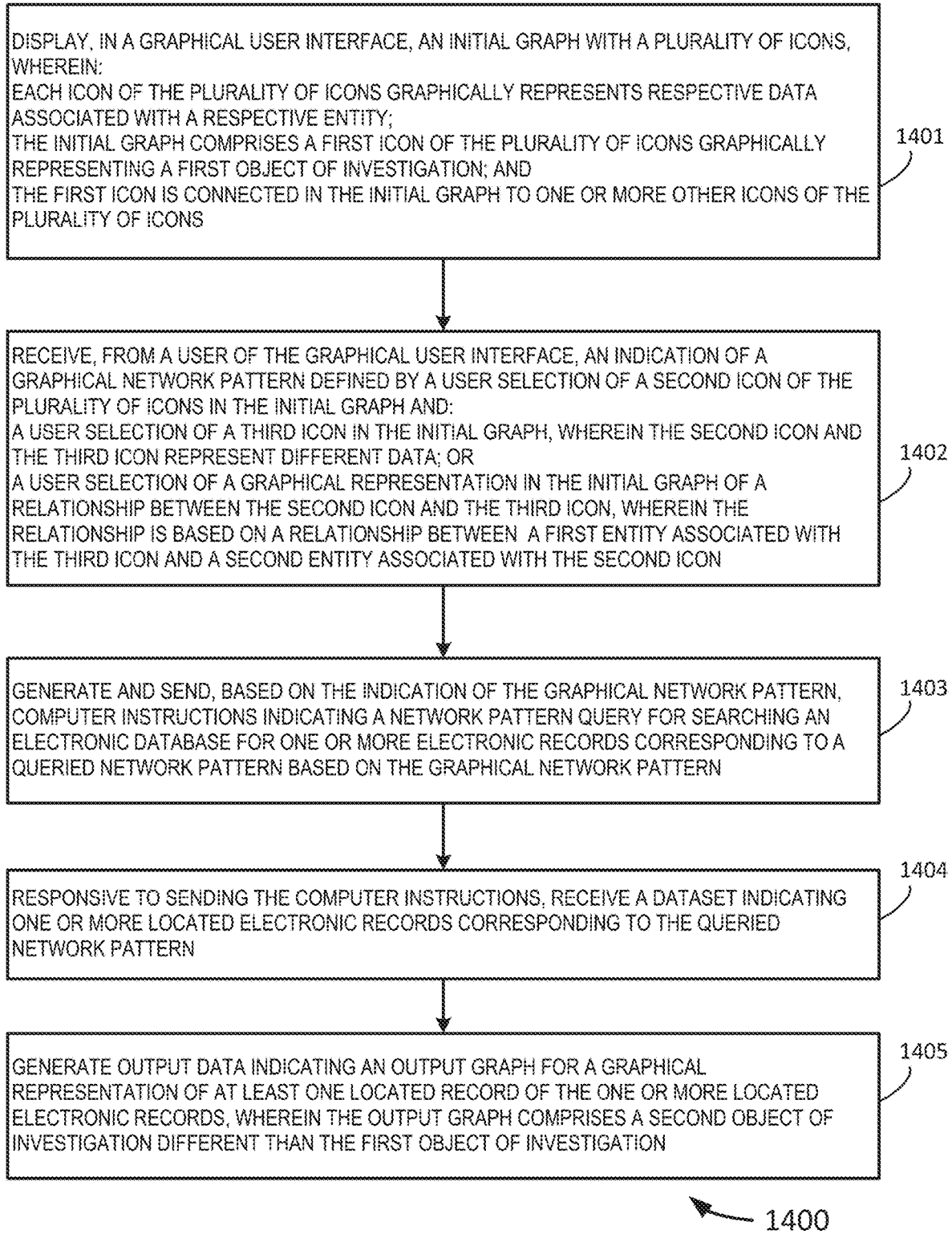
FIG. 14 illustrates an example flow diagram for querying a network pattern in at least one embodiment of the present technology.

One or more embodiments can be implemented by one or more components of query system 1300 (e.g., computing device 1340). For instance, FIG. 14 illustrates a flow diagram of a method 1400 for querying a network pattern. The method 1400 may be implemented by one or more components of query system 1300 (e.g., computing device 1340).

In an operation 1401, the method 1400 comprises displaying, in a graphical user interface, an initial graph with a plurality of icons (e.g., the display 1350 or the graphical user interface 1351). Each icon of the plurality of icons graphically represents respective data associated with a respective entity. The initial graph comprises a first icon of the plurality of icons graphically representing a first object of investigation. The first icon is connected in the initial graph to one or more other icons of the plurality of icons (e.g., based on one or more attributes of the object of investigation). For instance, in FIG. 13C, an objected associated with the loan application icon 1355 is investigated and graphical user interface 1351 shows other icons connected to the loan application icon 1355 (e.g., email icon 1372).

Figure 15A:
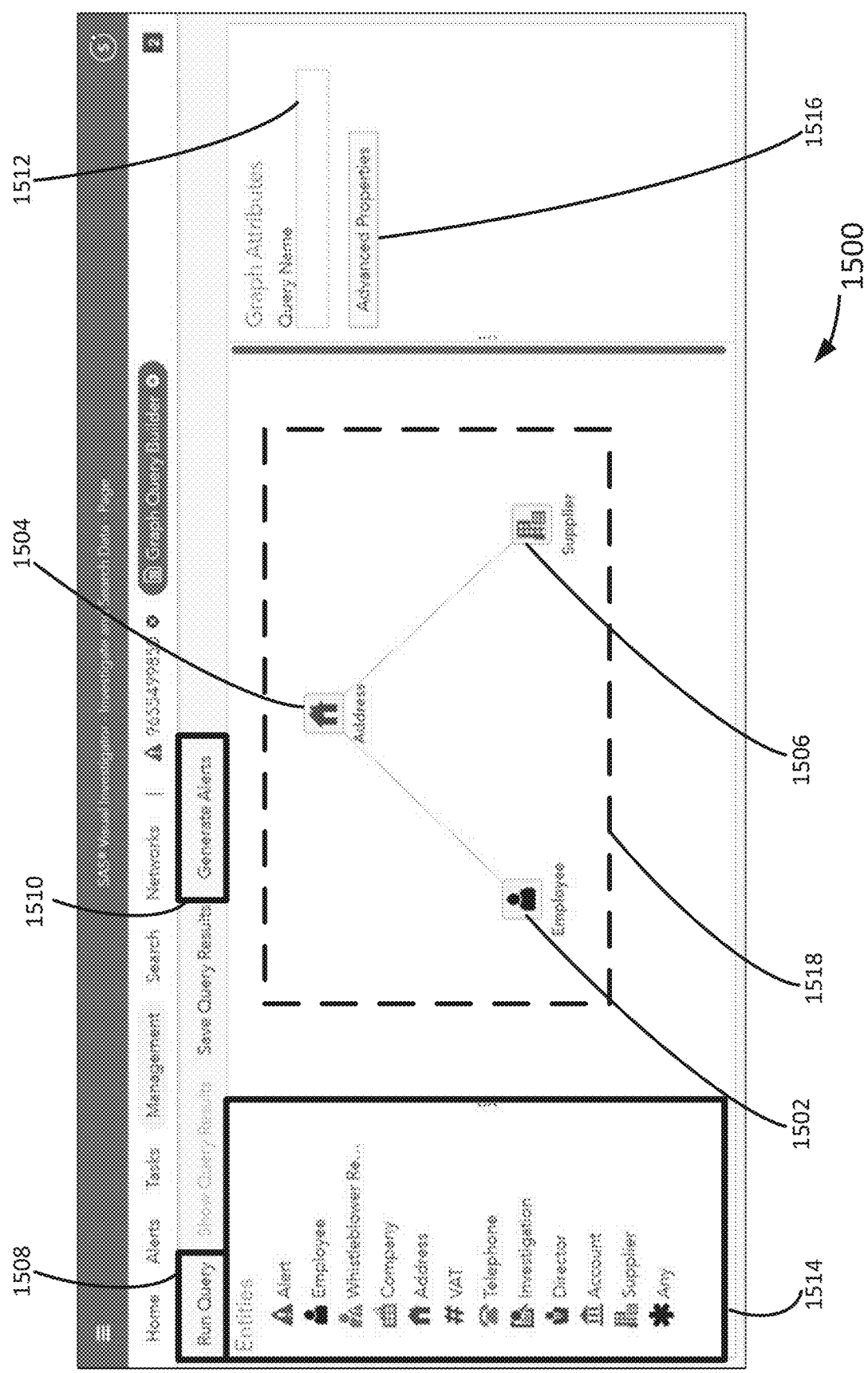
FIG. 15A illustrates an example network pattern in a graphical user interface in at least one embodiment of the present technology.

In FIG. 14, in an operation 1402, the method 1400 comprises receiving, from a user of the graphical user interface, an indication of a graphical network pattern. The graphical network pattern is defined by a user selection of a second icon of the plurality of icons in the initial graph and: a user selection of a third icon in the initial graph or a user selection of a graphical representation in the initial graph of a relationship between the second icon and the third icon. The second icon and the third icon represent different data. The relationship is based on a relationship between a first entity associated with the third icon and a second entity associated with the second icon (e.g., based on attributes of entities). For instance, as shown in FIG. 15A a graph query builder graphical user interface 1500 in SAS® Visual Investigator is used to select a network pattern comprising three icons (an employee icon 1502, an address icon 1504, and a supplier icon 1506).

In FIG. 14, in an operation 1403, the method 1400 comprises generating and sending, based on the indication of the graphical network pattern, computer instructions indicating a network pattern query for searching an electronic database for one or more electronic records corresponding to a queried network pattern based on the graphical network pattern. For instance, as shown in FIG. 15A, the user can generate the computer instructions by specifying a search of a set of entities and relationships. The user did not have to specify any particular attributes of the entities in this example where the query is looking for any suppliers that share an address with an employee. The user could simply give the query a name (in textbox 1512) to define a function that calls this query. Alternatively, the user could modify properties of the query using Advanced Properties 1516 (e.g., modifying attributes of the network pattern). Additional entities specific to the investigation could be added to the network pattern (e.g., entities shown in entities box 1514 could be drag and dropped into the workspace of the network pattern). When the user has finished defining the network query, the user could send the computer instructions for searching by using run-query control 1508 or generate an alert related to the query using generate alerts control 1510 for the computing system to send the query in response to a trigger.

In FIG. 14, in an operation 1404, the method 1400 comprises, responsive to sending computer instructions indicating the network pattern query, receiving a dataset indicating one or more located electronic records corresponding to the queried network pattern.

In an operation 1405, the method 1400 comprises generating output data indicating an output graph for a graphical representation of at least one located record of the one or more located records. The output graph comprises a second object of investigation different than the first object of investigation (e.g., a potential new fraudulent company or person to investigate).

The method 1400 may be repeated with modifications made to the network pattern (e.g., in response to output data results). FIGS. 15A-E illustrate an example of modifying a network pattern in a graphical user interface.

FIG. 15A shows a graphical network pattern 1518 indicated based on a selection or building of the pattern by the user. Responsive to the indication of the graphical network pattern, the graphical user interface displays options for modifying the graphical network pattern (e.g., entities to expand or change the pattern in entities box 1514 or options under the Advanced Properties 1516. These features provide a range of functionality that enables construction of complex queries.

Figure 15B:
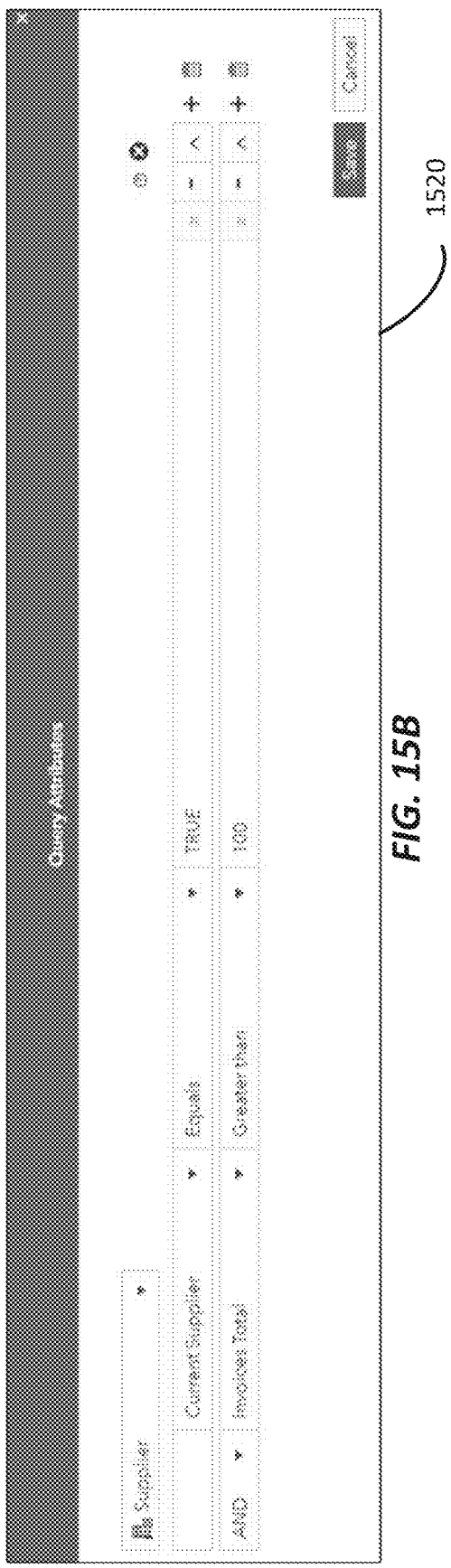
FIGS. 15B-C illustrate an example of modifying a network pattern in at least one embodiment of the present technology.

For example, on each of the entities and relationships, the user is able to specify both exact and inexact match criteria as seen in FIG. 15B, where the graphical user interface 1520 is used to modify attributes of the query pertaining to the supplier entity to look for supplier entities that have attributes indicating more than 100 previous invoices and is a current supplier. This query could also enable users to be more specific about the results they wish to return by restricting the query to a specific instance of an entity. For example, by specifying a supplier's identifier, the user can focus on a particular supplier of interest.

Figure 15C:
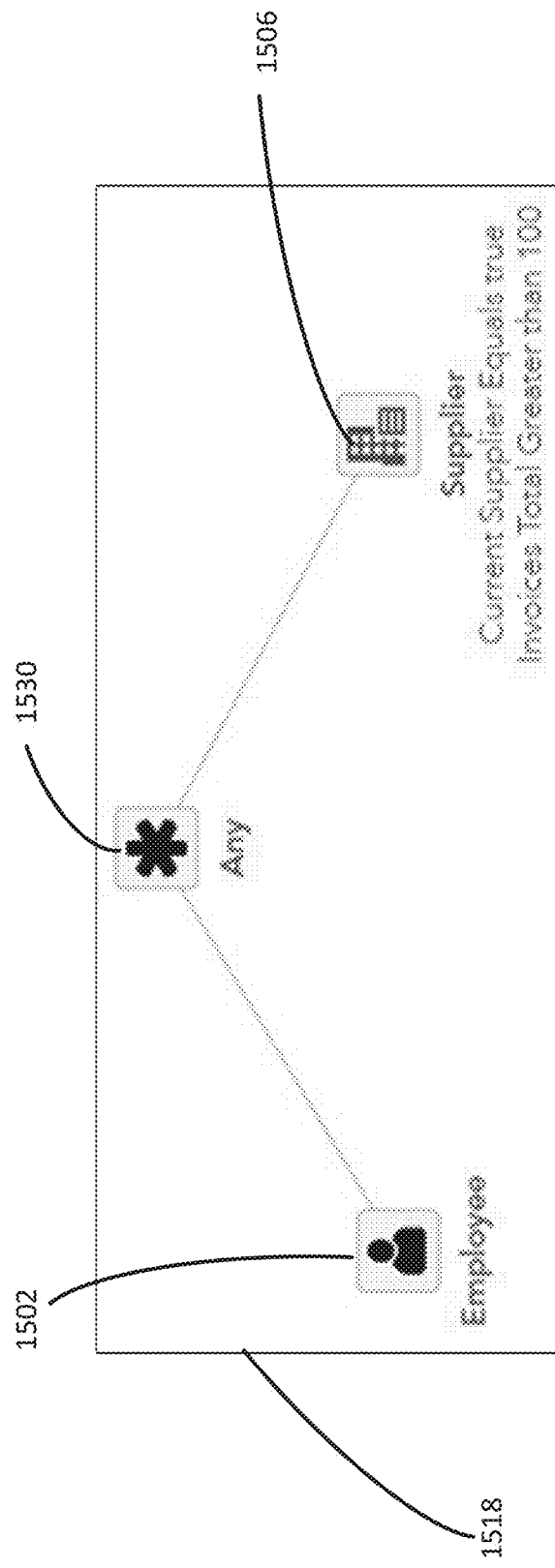

In one or more embodiments, a computing system receives, from a user of a graphical user interface, a modification of the graphical network pattern according to the user's selection of a displayed option of the display options for modifying the graphical network pattern. As another example, FIG. 15C shows where users do not want to be specific about which type of entity to include in their query. For instance, the user is looking for suppliers that are linked to employees through any entity rather than specifically an address. The user uses a wild card icon 1530, which can represent any entity, from icon types in entities box 1514 of graphical user interface 1500 of FIG. 15A.

Network pattern 1518 has been directly modified to switch out the address icon 1504 with a wild card icon 1530. For instance, a computing device receives, from a user of the graphical user interface 1500 in FIG. 15A, a manipulation of the initial graph comprising network pattern 1518 displayed in the graphical user interface 1500 removing graphical representations of a relationship between a pair of icons (i.e., graphical representations corresponding to the address icon 1504). The computing device receives from the user of the graphical user interface 1500, a manipulation of the initial graph comprising network pattern 1518 displayed in the graphical user interface 1500 by adding a graphical representation of a relationship between a pair of icons (e.g., wild card icon 1530 in FIG. 15C). The computing system can receive the indication of a graphical network pattern by receiving a user selection of an icon of the pair of icons (e.g., a selection of employee icon 1502 or supplier icon 1506) or an added graphical representation according to adding the graphical representation of the relationship between the pair of icons (e.g., corresponding to wild card icon 1530).

Figure 15D:
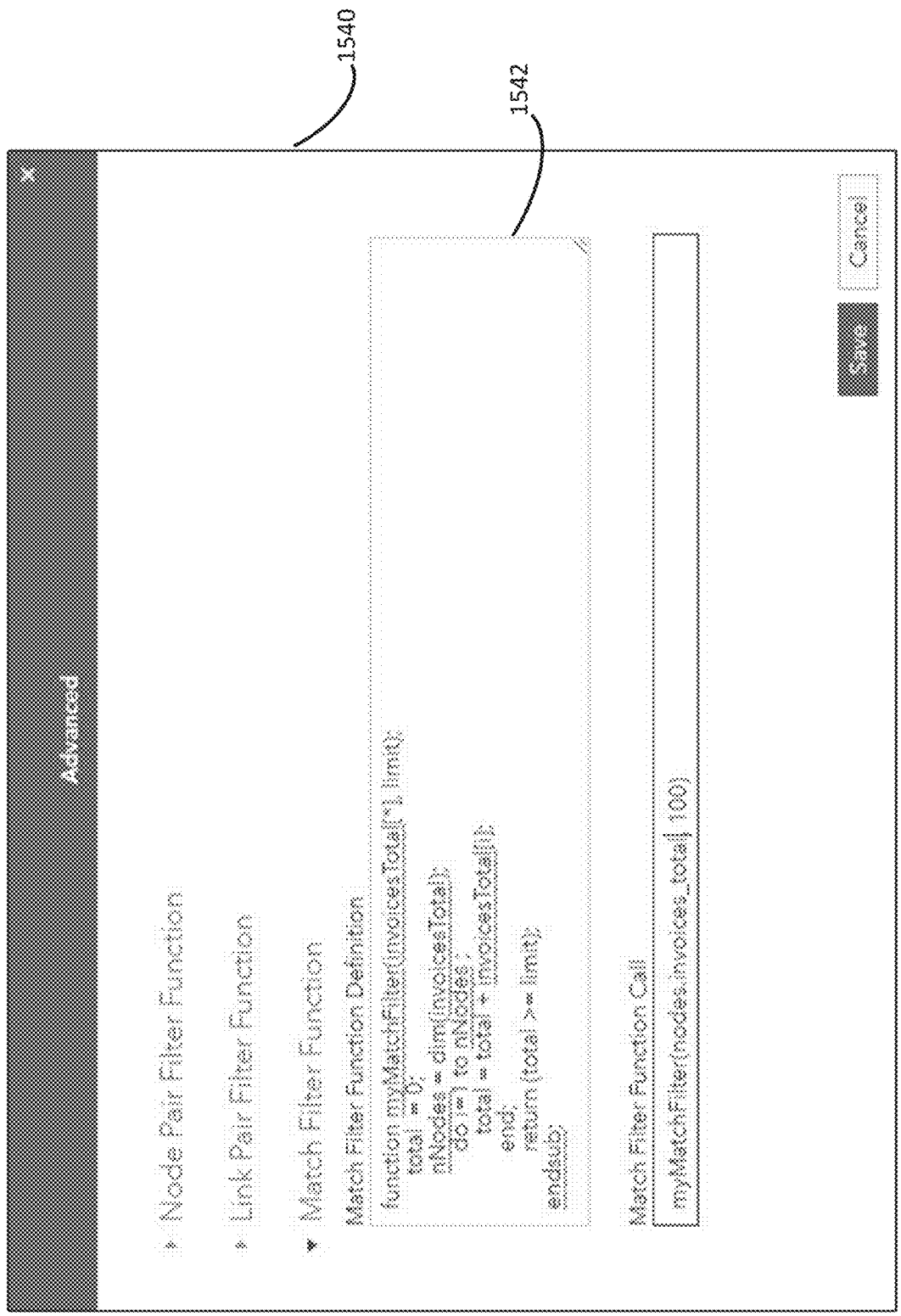
FIG. 15D illustrates an example of further filtering of a network pattern query in at least one embodiment of the present technology.

In one or more embodiments, a user modifies queries or applies a filter to a query. For instance as shown in FIG. 15D, the node pair, link pair, and match functions are added to the query and graphical user interface 1540 displays some of the filter customization made by the user (e.g., the match filter function shows modification in text box 1542 by the user to specify that the number of invoices across all suppliers in the subgraph exceeds 100). Alternatively, or additionally, a graphical user interface could receive or display more common language representing the functions or filters in dialog boxes (e.g., "total invoices greater than or equal to 100" or "time must be consecutive") to increase the ease of querying for an investigator unfamiliar with specialized computer instructions for a network pattern application.

The computing system can then generate the computer instructions indicating the network pattern query for searching the electronic database for one or more electronic records corresponding to a queried network pattern based on the graphical network pattern modified according to the modification of the graphical network pattern. For instance, the returned results may be filtered differently according to the modification and/or the query itself may be changed.

Figure 15E:
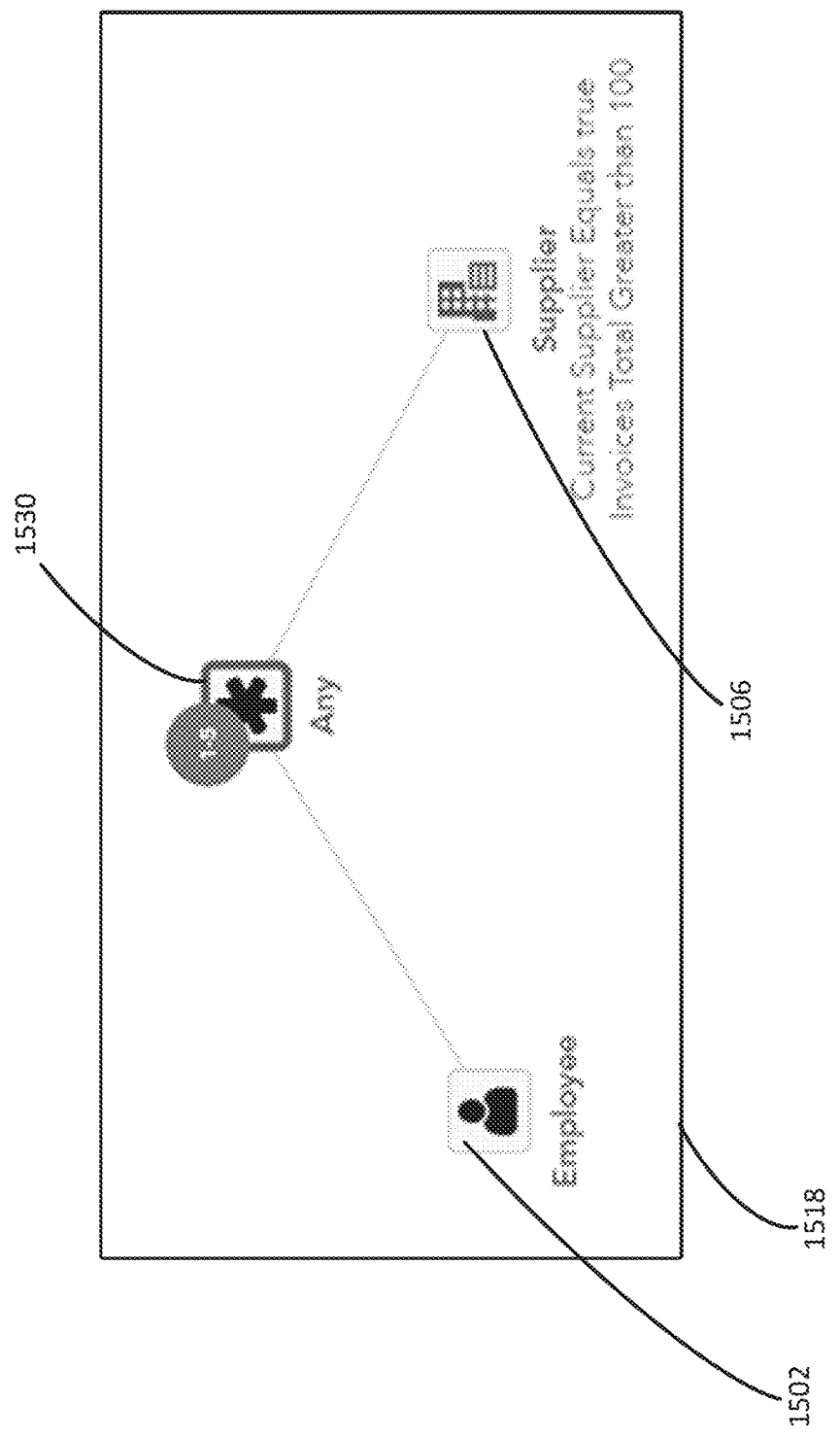
FIG. 15E illustrates an example of modifying a network pattern in a graphical user interface in at least one embodiment of the present technology.

The user can make further modifications (e.g., based on returned results). For instance, FIG. 15E illustrates an example of further filtering of a network pattern query to limit the amount of links that can connect the employee icon 1502 and supplier icon 1506 in data indicating a returned network graph. To specify a range of occurrences of an entity, the user can configure an upper (e.g., 5) and lower limit (e.g., 1) of link traversals. In the example in FIG. 15E, the user is searching for Employees that are linked to a supplier through between one and five wildcard entities.

Figure 16A:
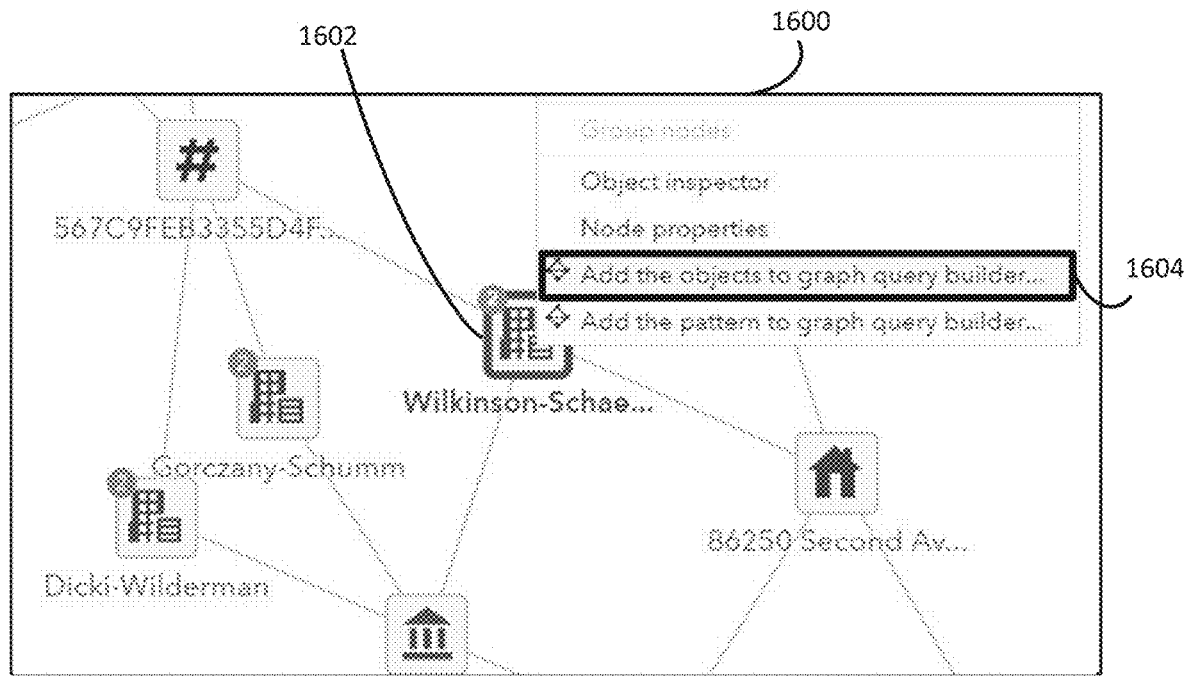
FIGS. 16A-C illustrate an example of building a network pattern from an entity icon in a graphical user interface in at least one embodiment of the present technology.
Figure 16B:
Figure 16C:
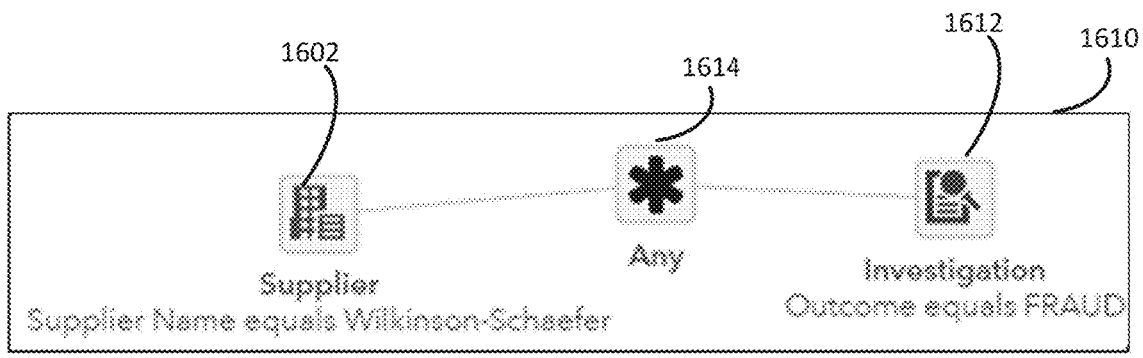

FIGS. 16A-C illustrate an example of building a network pattern from an entity icon in a graphical user interface. In this example, a query starts with the selected supplier and then looks for links to previously confirmed fraudulent suppliers. FIG. 16A shows a graphical user interface 1600 displaying a network graph. The user has selected a supplier icon 1602 and selected an option 1604 to add the object to a graph query builder (e.g., SAS® Visual Graph Query Builder). The supplier icon 1602 may represent an entity that is currently under investigation, or it may be an entity known to the investigator. An investigator (e.g., a user or computing system) may want to identify does the object under investigation link to anything suspicious or does this suspicious pattern occur anywhere else in the data?

Without the graph query builder, if the user wanted to know whether a supplier under investigation is linked to any known fraudulent suppliers, they would have to recursively expand through each node in every direction and analyze all the entities and relationships brought in with each expansion to see if the pattern of interest exists. The process of observing whether a specific pattern occurs may also involve clicking through each entity and relationship to observe each of their attribute values. In densely linked data, this quickly becomes unmanageable as with every layer of depth, the number of entities and relationships in the network workspace increases significantly.

With the graph query builder, the user can select specific instances of entities with which to seed the graph query builder, and then use a drag-and-drop interface to enhance the query.

FIG. 16B shows the selected icon moved from the network workspace to the SAS® Visual Graph Query Builder graphical user interface 1610. Relevant attributes of the selected entities are brought into the Visual Graph Query Builder and used as a starting point for the query. For instance, the supplier name, Wilkinson-Schaefer, is included in the query ("Supplier Name equals Wilkinson-Schaefer"). Alternatively, or additionally, a user can start directly from the Visual Graph Query Builder and build out the query from scratch based on an idea rather than starting the query building process from specific entities within an investigation.

FIG. 16C shows an example query built in the Visual Graph Query Builder graphical user interface 1610 with the supplier icon 1602 connected to an investigation icon 1612 with attribute "outcome equal fraud". A wild card icon 1614 connects the supplier icon 1602 and investigation icon 1612. In this way, a computing system can query and return network graphs with any number of icons connecting supplier icon 1602 and investigation icon 1612. This can help the investigator determine if a queried pattern occurs anywhere else in the data (e.g., a query on whether an object under investigation links to anything suspicious).

Figure 17A:
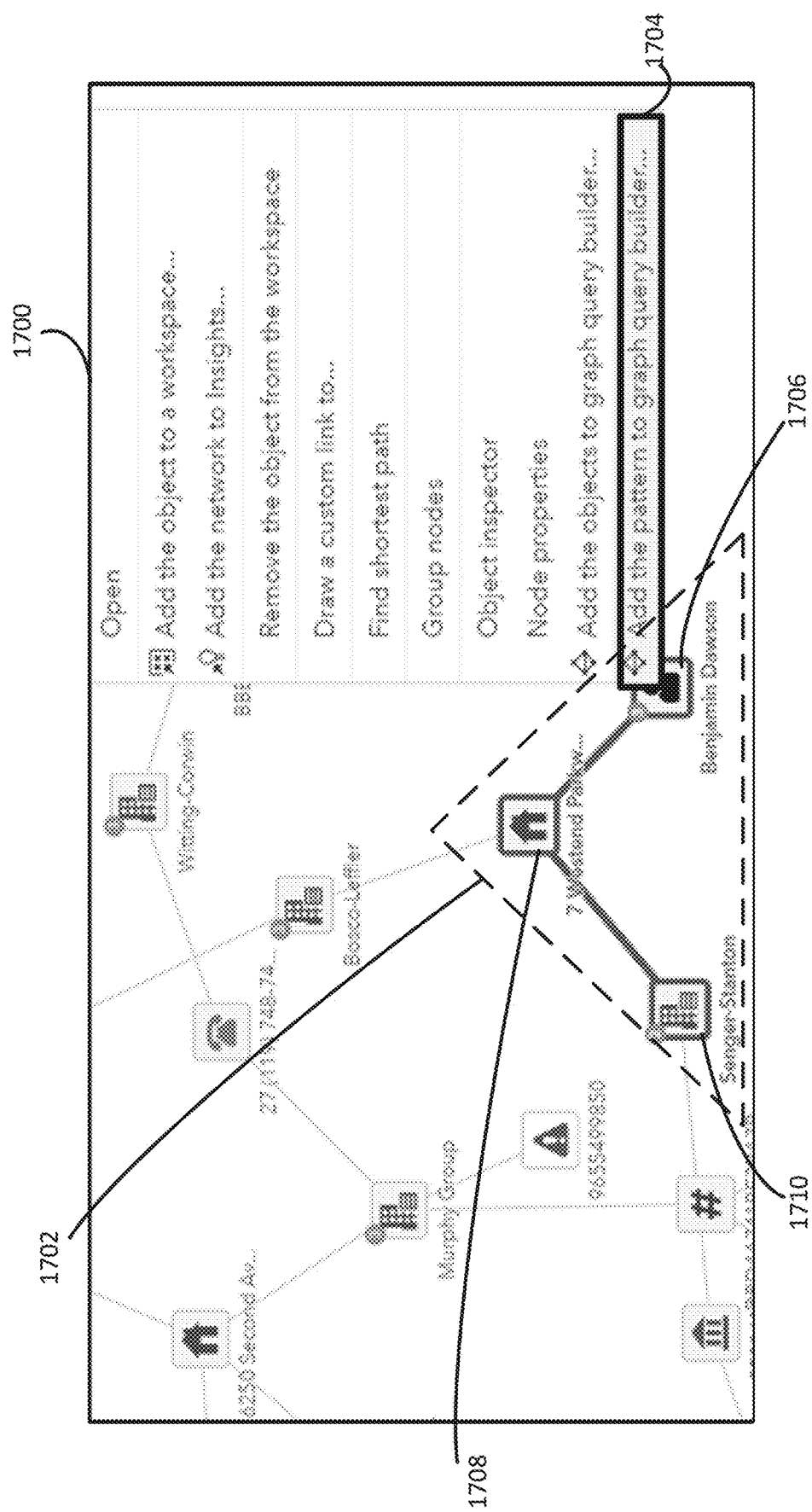
FIGS. 17A-D illustrate an example of building a first network pattern from a second network pattern in a graphical user interface in at least one embodiment of the present technology.

FIGS. 17A-D illustrate an example of building a first network pattern from a second network pattern in a graphical user interface. In FIG. 17A, an interesting network pattern 1702 has been observed while exploring the network of an alerted supplier and is used in the query builder. The network pattern 1702 comprises an employee icon 1706, an address icon 1708 and a supplier icon 1710.

Figure 17B:
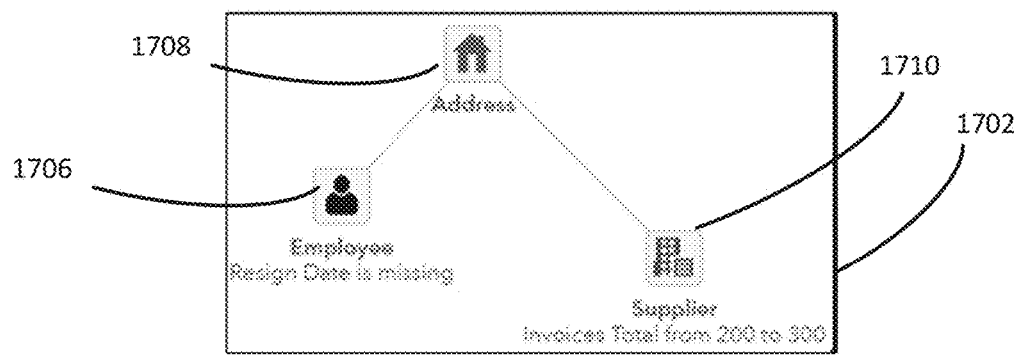

A control 1704 is used to add the network pattern 1702 to Visual Graph Query Builder. As shown in FIG. 17B the network pattern 1702 is shown in the Visual Graph Query Builder. Whether a pattern is interesting may not depend entirely on the topology, the entity and relationship attributes can also determine whether a pattern is of interest. When seeding the query builder with a set of entities and relationships from a network, relevant attributes can be brought through as a starting point for the query. In this way how relevant attributes are to a network pattern can be determined up front. In this case, the relevant attributes for the employee icon 1706 include that the resign date field in data records associated with the employee icon 1706 is missing data. Missing data in this field could indicate they are a current employee. The relevant attributes for the supplier icon 1710 include the invoices total from 200 to 300. Other data such as specific names or addresses has not been brought through as they are irrelevant to this network pattern.

Figure 17C:
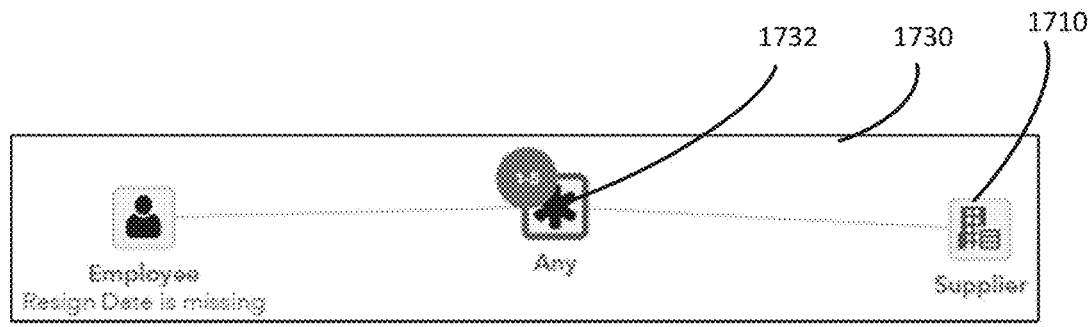
Figure 17D:
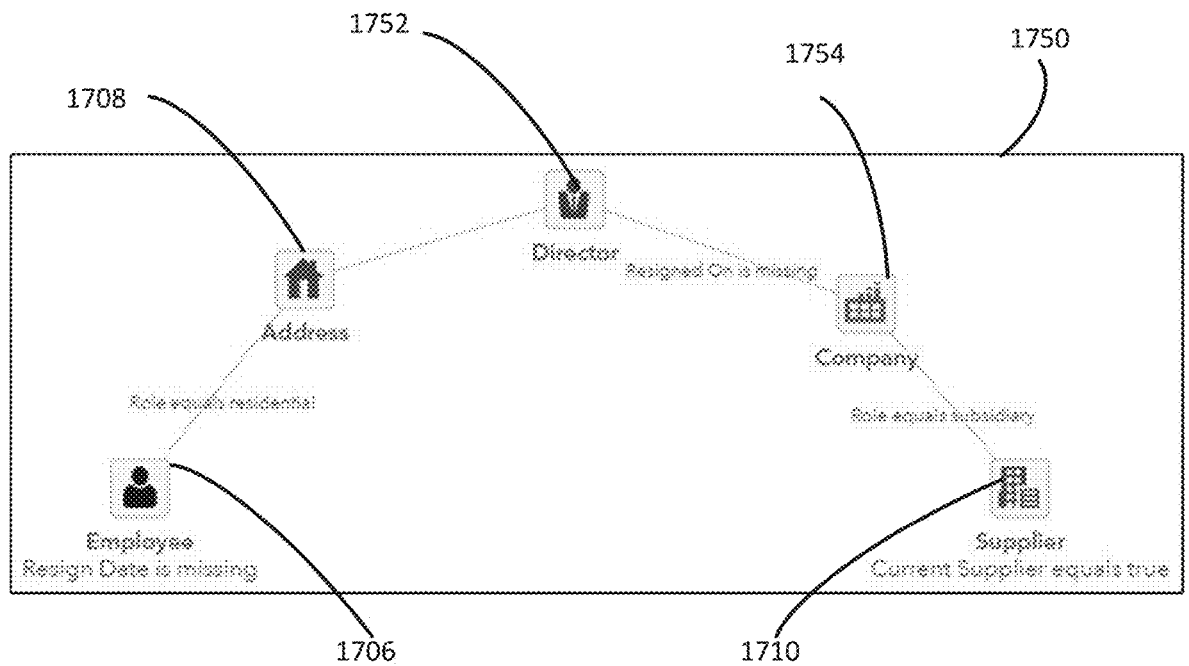

When using this approach, the initial pattern may still be quite specific. The user may then be able to abstract the question a bit more. For instance, the user may conclude that what they are interested in is any relationship between a supplier and an employee. FIG. 17C shows an updated network pattern 1730. The initial query may then be made more generic by using a less restrictive search or a more generally defined depth at which the user can expect to find the pattern. In this case, a wild card icon 1732 is used and attributes removed from the supplier icon 1710.

From the results of this less exact query, a user may, after investigation of the results, decide that there are many distinct patterns that are uncovered by the initial query. From this point, the user may decide to create a series of specific queries for each of the distinct pattern types like the specific network pattern 1750 seen in FIG. 17D. In this example, the user is looking for active suppliers that are indirectly linked to an employee through being a subsidiary of a company that has a director that shares an address with the employee. The network pattern 1750 has been expanded to specify a director icon 1752 and a company icon 1754. The supplier icon 1710 has been modified to include an attribute that the current supplier field equal true. This network pattern 1750 also specifies attributes for the relationships or links between icons. For instance, the address location associated with address icon 1708 matches data in the employee record because the role of data in respective data records is a residential address. Data records associated with the director icon 1752 have a resigned on date is missing indicating that the director is still the director of the company indicated in data records associated with company icon 1754. The supplier icon 1710 is associated with data records that indicate that the supplier is a subsidiary of the company indicated in data records associated with company icon 1754. The results of each of these distinct pattern types may be treated differently depending on the how interesting the pattern is believed to be (e.g., one or more may be used to set an alert or be categorized into different risk categories).

Those of ordinary skill in the art will appreciate many applications for embodiments described herein. Applicant presents further examples in various applications including infectious disease contact tracing, procurement fraud and tax fraud merely as non-limiting examples demonstrating uses for embodiments herein.

Figure 18B:
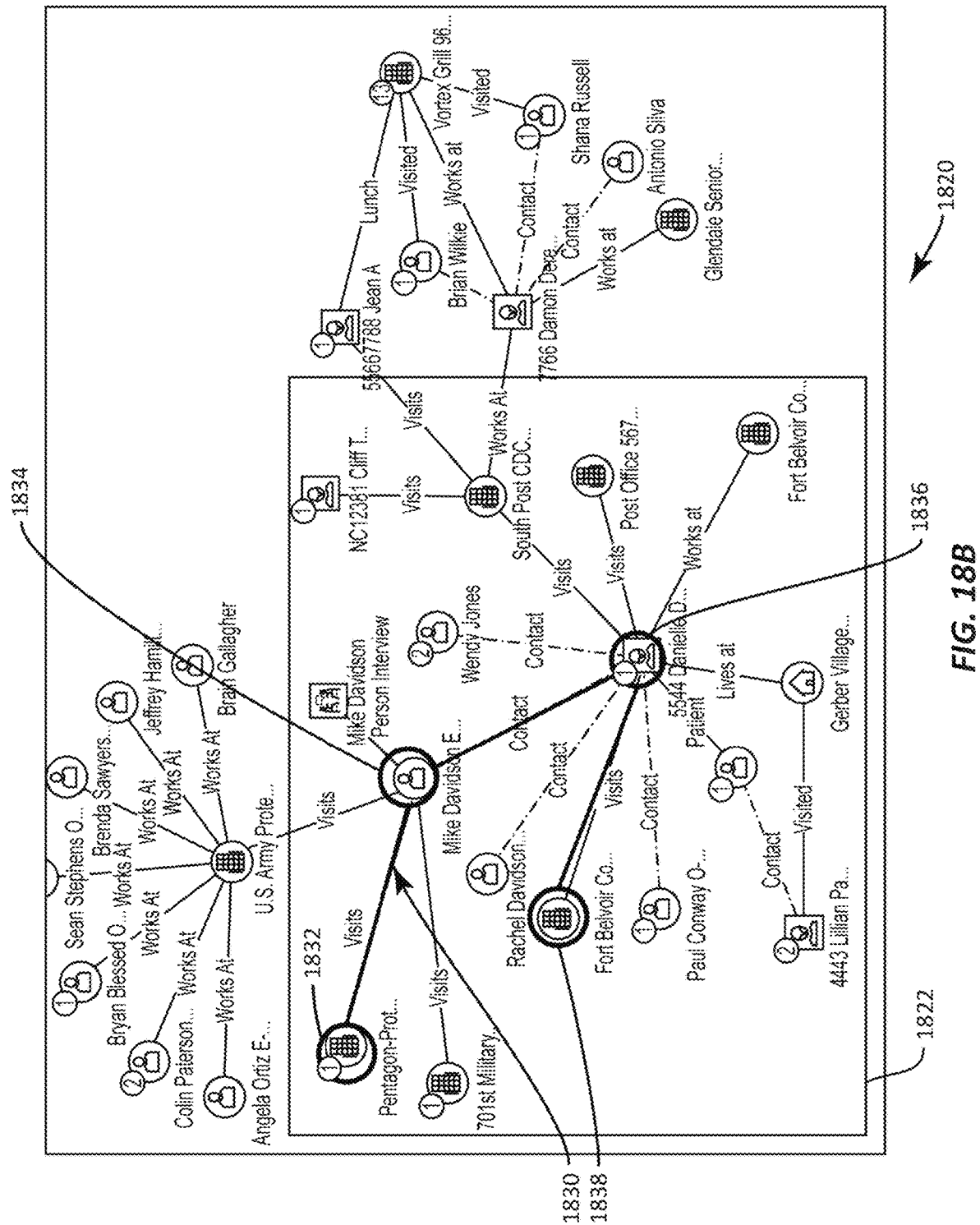

FIGS. 18A-E illustrate an example network pattern query for contact tracing. Contact tracing can be used for various real-world examples including contact tracing for infectious viral diseases. FIG. 18A shows a graphical user interface 1800 from SAS® Visual Investigator that has example information that could be gathered during a contact trace interview of a person (e.g., information about the interviewed person, who the interviewed person had come into contact with, and locations they had been). Graphical user interface 1800 shows for example fields 1810 for collecting input 1812 from an interview with a person (e.g., information collected during a contact trace interview or collection of information from device associated with an interviewed person). The graphical user interface 1800 could be used to collect and display other information (e.g., information collected during a loan interview, a police interrogation, or a purchase agreement). Graphical user interface 1800 displays other information tracking the interviewed person's movements in a movement tracking window 1814. The movement tracking window 1814 could comprise gathered information from the interview candidate or other sources such as phone records or social media check-ins.

In FIG. 18B, graphical user interface 1820 shows a network view of data collected during an interview process. A subgraph for the Danielle David Contact Trace interview is shown in area 1822 of the network graph displayed in graphical user interface 1820. In the network diagram, additional contact trace interview nodes are also shown that are indirectly linked through associated nodes (e.g. a location or person mentioned on two different contact trace interviews). The computing system is able to generate network graph to separate out icons connected by multiple links and minimize overlapping links so that the user can easily see the different icons for further exploration.

Whilst exploring the relationships within the network, the investigator notices a particular pattern of interest and wishes to know, does this pattern occur anywhere else in the data? In this example the pattern of interest the investigator is interested in is a person that has visited the Pentagon and was also in contact with someone from a contact trace interview that has visited the Fort Belvoir army garrison. The investigator selects one or more of multiple icons and links in a network pattern 1830. In other words, the investigator could have selected all four icons, where each of the set of icons is related to at least one other icon in the set of icons based on an attribute relationship between a given entity corresponding to a given icon.

The network pattern 1830 comprises a person icon 1834 corresponding to a person entity, and the network pattern comprises a record icon 1836 corresponding to an interview entity (e.g., the data records collected during the interview). In this example, the network pattern comprises a selection of an icon corresponding to an object of investigation. The record icon 1836 and the person icon 1834 are connected based on a contact relationship indicated in the interview. For example, an interview entity would have data indicating the name of the person Mike Davidson as someone having contact with Danielle David, and records indicating the person entity would also have the name Mike Davidson. Thus, the two entities have an attribute in common. The attribute match can match on similar data (e.g., the person may have an informal name "Mike" but be identified as "Michael" in the data records associated with record icon 1836.

The network pattern 1830 also comprises location icons corresponding to location entities (e.g., Pentagon location icon 1832 and Fort Belvoir location icon 1838). The Pentagon location icon 1832 is linked to the person icon 1834 based on a visited relationship. Thus, data records associated with Mike Davidson would indicate an attribute that he visited the Pentagon. Data records associated with the Pentagon entity would have a similar name. The Fort Belvoir icon location 1838 is linked to the record icon 1836 based on a visited relationship. For instance, data records associated with the interview could indicate the interviewed person visited Fort Belvoir. Data records associated with the Fort Belvoir entity could have a similar name.

Figures 18C, 18D:
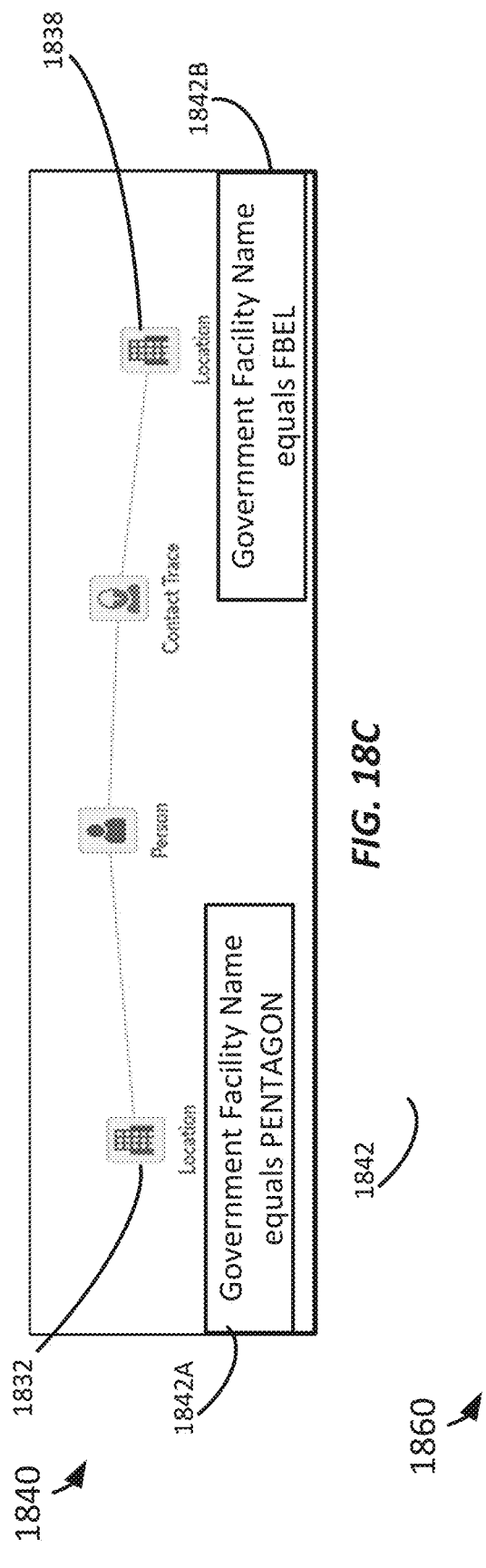

The user selects the network pattern and brings the relevant parts of that through into a graph query builder 1840 shown in FIG. 18C. For instance, a queried network pattern may specifically query on attributes of a given entity or given link of the graphical network pattern (e.g., a specific person) such that a returned output graph comprises the given entity or given link. Alternatively, or additionally, a queried network pattern may represent a generic version of aspects of an identified graphical network pattern in an initial graph including a first object of investigation such that an output graph captures a second object of investigation.

In FIG. 18B, some, but not all, attributes of the entities that are selected in FIG. 18B have been brought into the graph query builder 1840. In the example, attributes 1842 regarding the Government Facility Name of the Location has been automatically brought into the query, but information from the contact trace (e.g. patient name and patient date of birth has not been brought into the query). This is because in this use case when searching for other similar patterns the investigator is typically not interested in where the person has the same name or date of birth. Instead an investigator is typically interested in where the Government Facility Names are the same. Thus, defaults can be set on where to filter or keep attributes as a starting point for the query builder. Other defaults could be selected. The set of attributes that get automatically brought from the investigation into the query builder can be configured (e.g., by an administrator). For example, they many be manually set by a user or administrator. Alternatively, or additionally, defaults may be configured for a system or configured for a user level. Alternatively, or additionally, defaults may be automatically computed based on an analysis of the data as configured by the user or administrator. Default values could be categorical variables or continuous variables (e.g., that have been bind).

As another example, a user does not have to observe a pattern in the data to query for it. If the user has an idea for a pattern of interest they want to search for, they can build out the pattern from scratch (e.g., by selecting icon types, adding relationship types, and/or adding attribute types) without starting from a network graph (e.g., going via a Network Workspace shown in FIG. 18B).

The user is able to modify the query as described herein (e.g., by adding additional nodes, adding additional links, or adding attribute filters on the nodes or links). Once the user is satisfied with the query, they are able to run the query and visualize the results. The results of running the query are shown in FIG. 18D in graphical user interface 1860. In this case, the output data shows detection information indicating detection of the queried network pattern in several different contact traces.

The output data represents various different matching output graphs identified by match field 1862. The computing system can display a list of multiple candidate objects of investigation and generate, from the output data, the output graph that is based on a selection of one or more of the multiple candidate objects of the investigation. Additional information pertaining to the matching records can be provided for a user to select one or more matches for further investigation. For instance, the output graphs comprise person icons corresponding to the person entity listed in person field 1864, record icons corresponding to the contact trace records in contact trace field 1866, and location of the contact trace interview shown in location field 1868. More or less output information could be provided for the user to select one or more of the results to investigate further (e.g., to add to a network workspace).

By running the query, the solution extension generates a list of each of the matches. From this list, a user is able to select one or many of the matches to add to a new or existing workspace (e.g., in a graphical user interface). For instance, after inspection of the matches produced by the query, the user can go back into the query builder, refine the query, and run the new query. This process can be iterated on until the user is satisfied that they have found something of interest. At that point, they can add the pattern to an existing investigation's workspace. For instance, the investigator may want to know if particular entities are part of an interesting pattern and show and highlight the pattern in the workspace of an investigation. Alternatively, or additionally, the pattern can also be used to start a new investigation based on the occurrence of a pattern. Alternatively, or additionally, the pattern can be used in alert generation. For instance, the user can write business rules on the occurrence of a pattern or use the existence of the pattern as a feature of an entity that is used in a machine learning model. Alternatively, or additionally, the user can use the pattern as an attribute of an entity. For instance, the user can save the pattern as an attribute of an entity and allow the user to visualize the pattern(s) when looking at an entity. For example, when investigating a particular supplier, a computing system can indicate that the supplier is present on some interesting patterns and allow the user to visualize those patterns. Alternatively, or additionally, the user can save the pattern as an entity. For instance, patterns could also be modeled as entities within SAS® Visual Investigator, enabling them to be scored, alerted on, or investigated as with other entities within SAS® Visual Investigator.

Figure 18E:
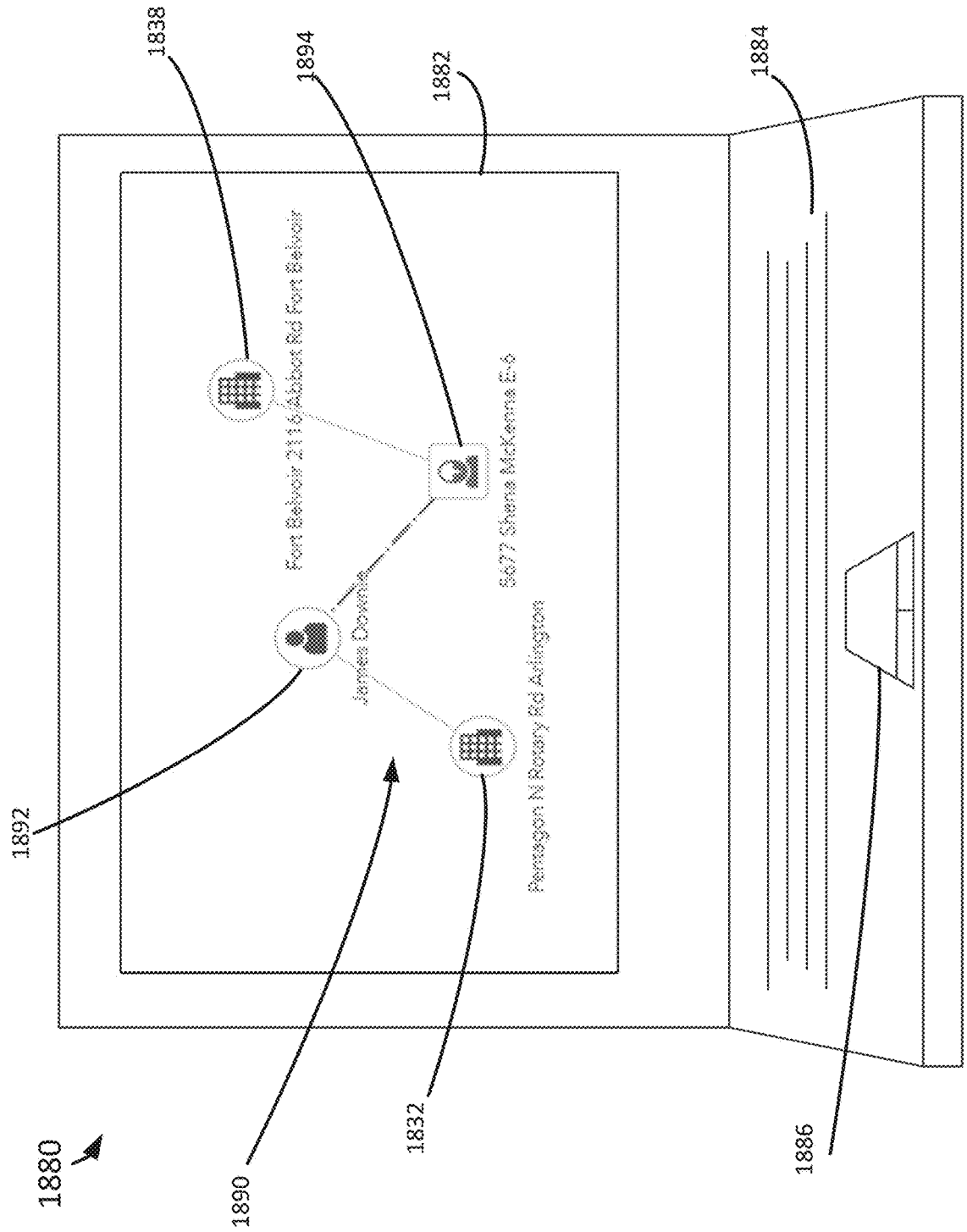

In this example, the user has selected match 1870 for further investigation. FIG. 18E shows a computing device 1880 with a graphical user interface 1882 showing a sub-graph which matches network pattern 1890. As shown the connections to the Pentagon location icon 1832 and Fort Belvoir location icon 1838 are shown. However, this network graph 1890 has a different person icon 1892 and record icon 1894 than in graphical user interface 1820 of FIG. 18B. In other words, the output graph does not comprise a given icon graphically representing the first object of investigation. The computing device has input devices (e.g., a track pad 1886 and keyboard 1884) for exploring the sub-graph (e.g., expanding the sub-graph to a larger network graph or exploring attributes of the entities shown). Multiple matches could have been selected with sub-graphs and their connections displayed on the same screen (e.g., their connection to the same Pentagon location icon 1832 and Fort Belvoir location icon 1838). As shown in FIGS. 18A-E, embodiments provide an easy transition from a visually identified pattern for one group of people to identifying a new pattern of interest in another context with a new group of people. Once an investigator has found a pattern of interest, they can seed a new query with the entities and relationships that make up the network pattern. In this way an investigator can identify new subjects of investigation directly from a graphical user interface.

Figure 19A:
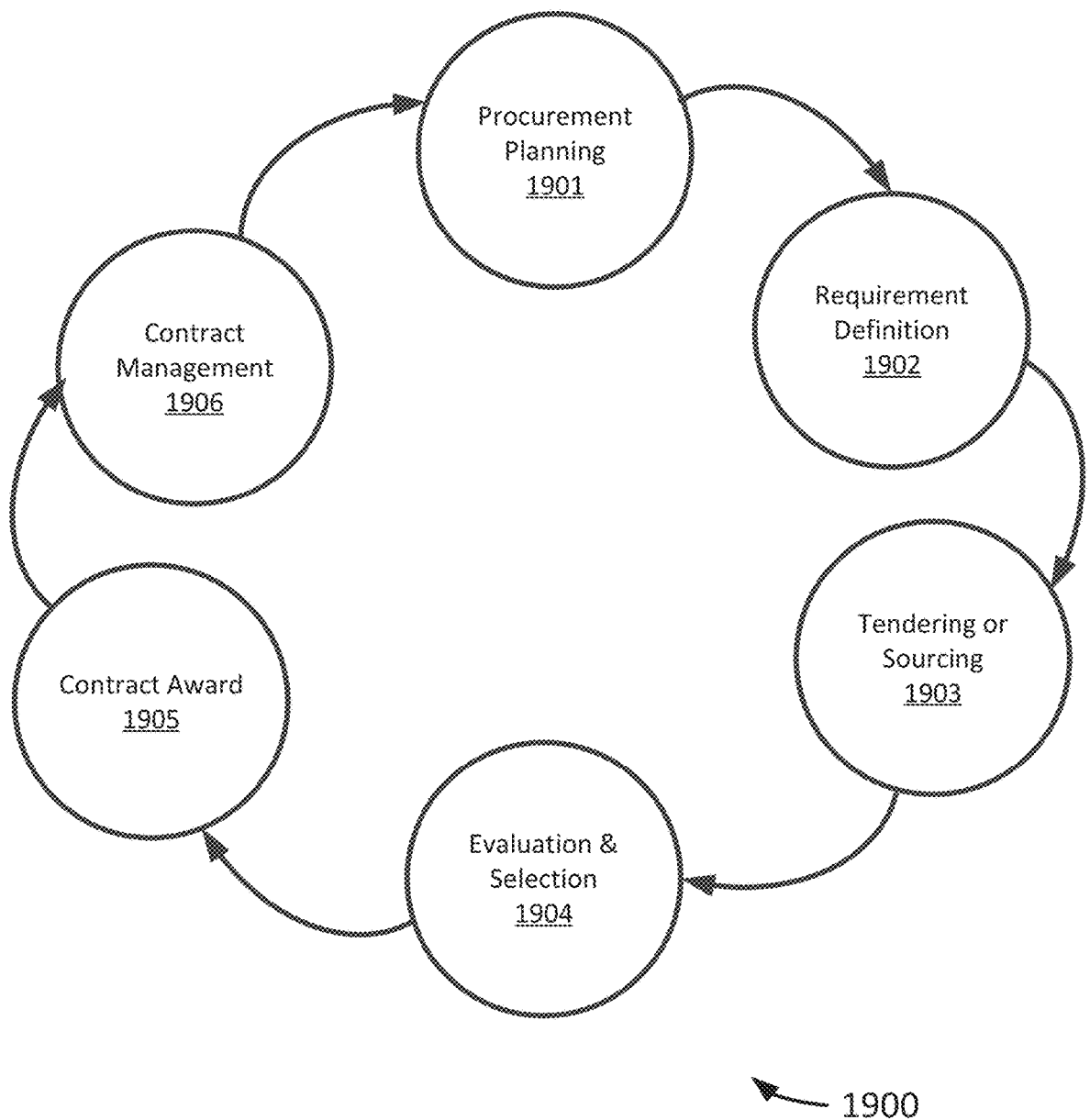
FIGS. 19A-C illustrate an example network pattern query for a procurement irregularity in at least one embodiment of the present technology.
Figure 19B:
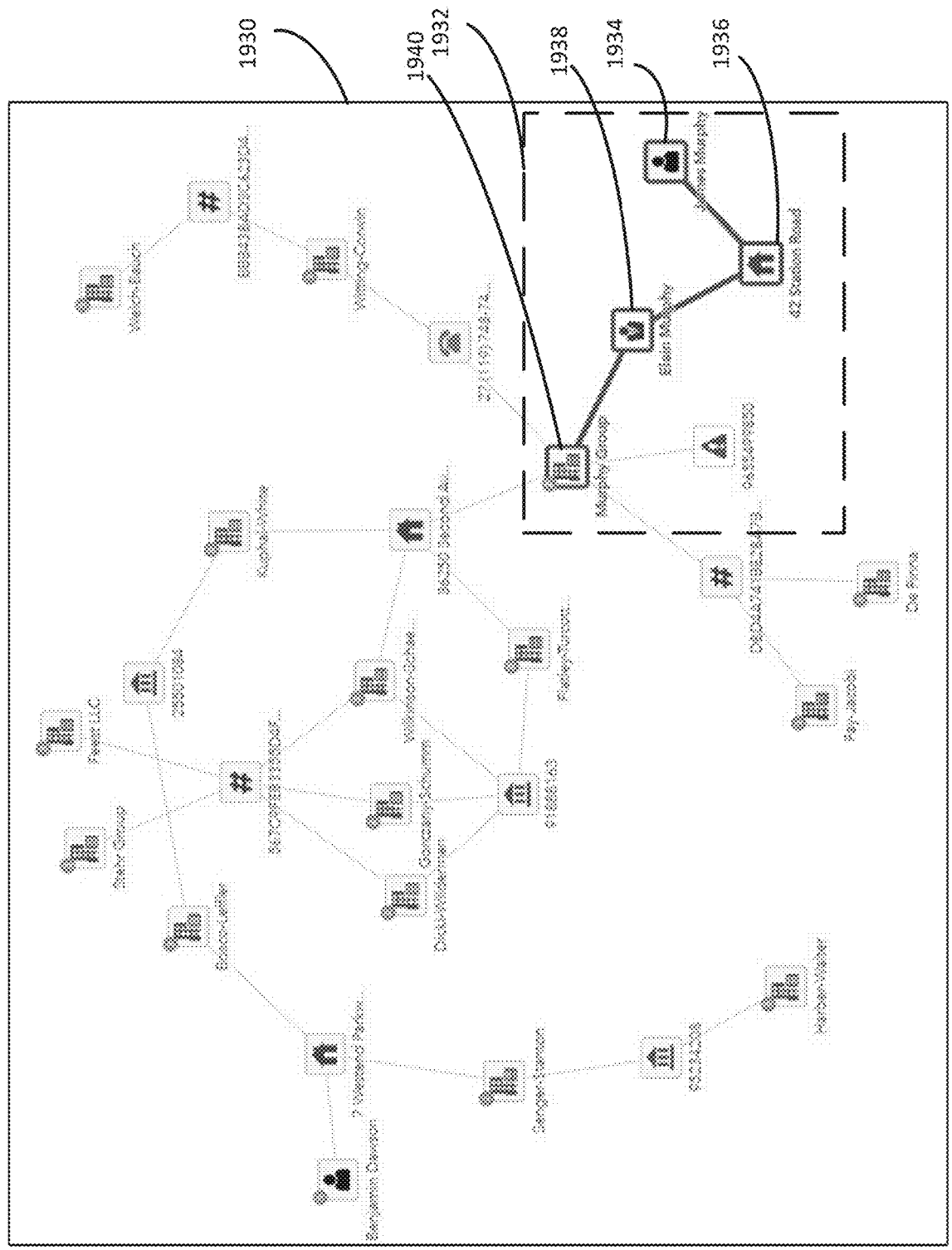
Figure 19C:
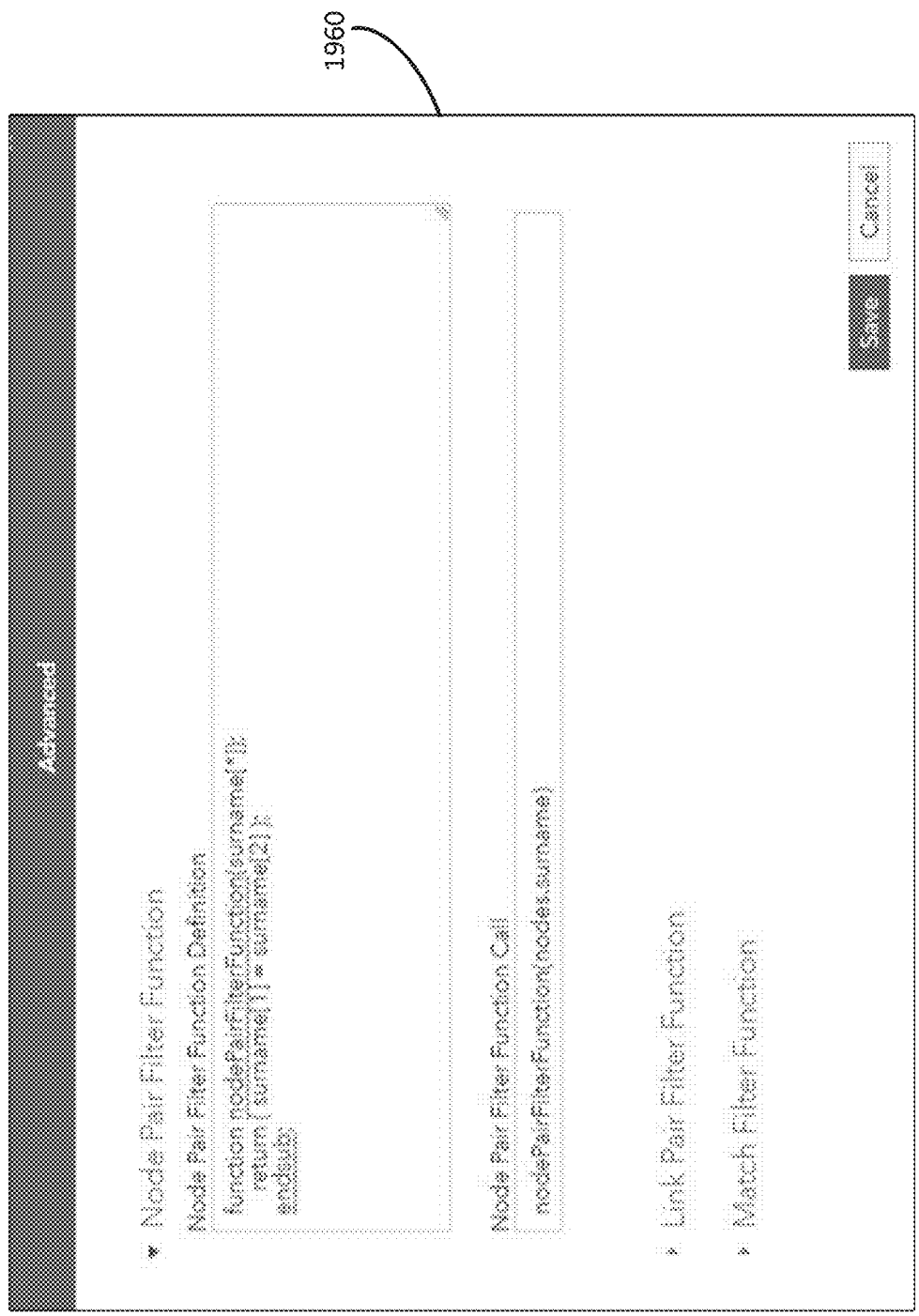

FIGS. 19A-C illustrate an example network pattern query for a procurement irregularity that may help uncover fraud. Procurement is the process of acquiring goods or services on behalf of an organization. Typically, when procuring goods or services, organizations go through a procurement cycle 1900 illustrated in FIG. 19A. The procurement cycle 1900 comprises several operations including, for instance, a procurement planning operation 1901, a requirement definition operation 1902, a tendering or source operation 1903, an evaluation and selection operation 1904, a contract award operation 1905, and a contract management operation 1906. Any attempt to influence with one of the operations in the cycle for personal financial gain is of concern to the integrity of the procurement process.

Continuous monitoring within procurement covers a wide array of different activities. One example involves kickbacks where an employee in charge of procuring a particular good or service receives some form of payment from the vendor for choosing that vendor. Another example is where a supplier may try to submit duplicate invoices in the hope they will be paid without scrutiny.

Although a lot of detection in procurement systems is done by assessing single events such as invoices and purchase orders, finding conspiring vendors and employees also plays a large part in detecting malpractice and is a good use case for embodiments described herein.

When looking for irregularity, it is often not sufficient to look at an event or individual item of data. Often the relationships between the data unveil additional information to determine if something is or is not fraudulent.

In typical procurement monitoring systems, there are rules in place that search for employees or suppliers that share addresses, telephone numbers, or bank accounts with suppliers. However, on investigation of a suspicious supplier, an investigator may discover an unfamiliar indirect link between the supplier under investigation and an employee. This indirect link may lead them to ask the question: Does this pattern occur anywhere else in the system? For example, a network graph in a graphical user interface 1930 is shown in FIG. 19B. An investigator noticed a network pattern 1932 indicating an employee (associated with employee icon 1934) sharing an address (associated with address icon 1936) and having the same surname as a director (associated with director icon 1938) of an existing supplier (associated with supplier icon 1940). This network pattern 1932 can be used as a starting point for building a query in embodiments herein. FIG. 19C shows a graphical user interface 1960 advanced filter options for a query according to the network pattern 1932. For instance, a node pair filter function is used to look for situations where the director and employee have the same surname. If these patterns are believed to be indicative of employees influencing and benefitting from the choice to procure goods from that supplier, these patterns can be added to the set of patterns used in an alert generation process.

Another problem faced when analyzing linked data is determining which of the relationships in a network graph are interesting and which are not. Network analytics provides many ways to analyze the networks formed from this linked data to determine which relationships are most important. SAS® Visual Investigator provides users with an interface for exploring relationships between data, however, in densely linked data, finding the relationships of interest can prove challenging even if an investigator knows what they are looking for. Additionally, if an investigator does find something of interest, they may want to see if that pattern exists elsewhere within the data. SAS® Visual Data Mining and Machine Learning provides the CAS action patternMatch that enables a user to search for a specified pattern across networked data. One or more embodiments, provide a network pattern application that introduces an integration between one or more features of SAS® Visual Investigator and the CAS action patternMatch in the Network action set that enables investigators to search for these relationships of interest themselves.

FIGS. 20A-E illustrate an example network pattern query for detecting tax evasion. Embodiments herein can be useful for detecting tax evasions such as a missing trader intracommunity (MTIC) or value-added tax (VAT) carousel fraud detection system. MTIC fraud occurs when organizations abuse cross-border trading laws to receive unlawful VAT repayments from governments. A simplified example that highlights the steps in MTIC fraud is given in FIG. 20A. Goods are traded from a company in one European Union country to a company in another European Union country and then back to the originating company. In this example, a Company A 2001 (e.g., a company in France) delivers goods to Company B 2002 (e.g., a company in The Netherlands). Company B 2002 sells the goods to Company C 2004. A 21% VAT is used. Company B 2002 should remit tax to Tax Authority 2003—but does not. Company C 2004 deducts VAT payment from tax returns and reports payment by Company D 2005 (e.g., a company in The Netherlands). Company D 2005 sells the goods to Company A 2001. Company D 2005 deducts VAT payment from tax returns.

Figure 20A:
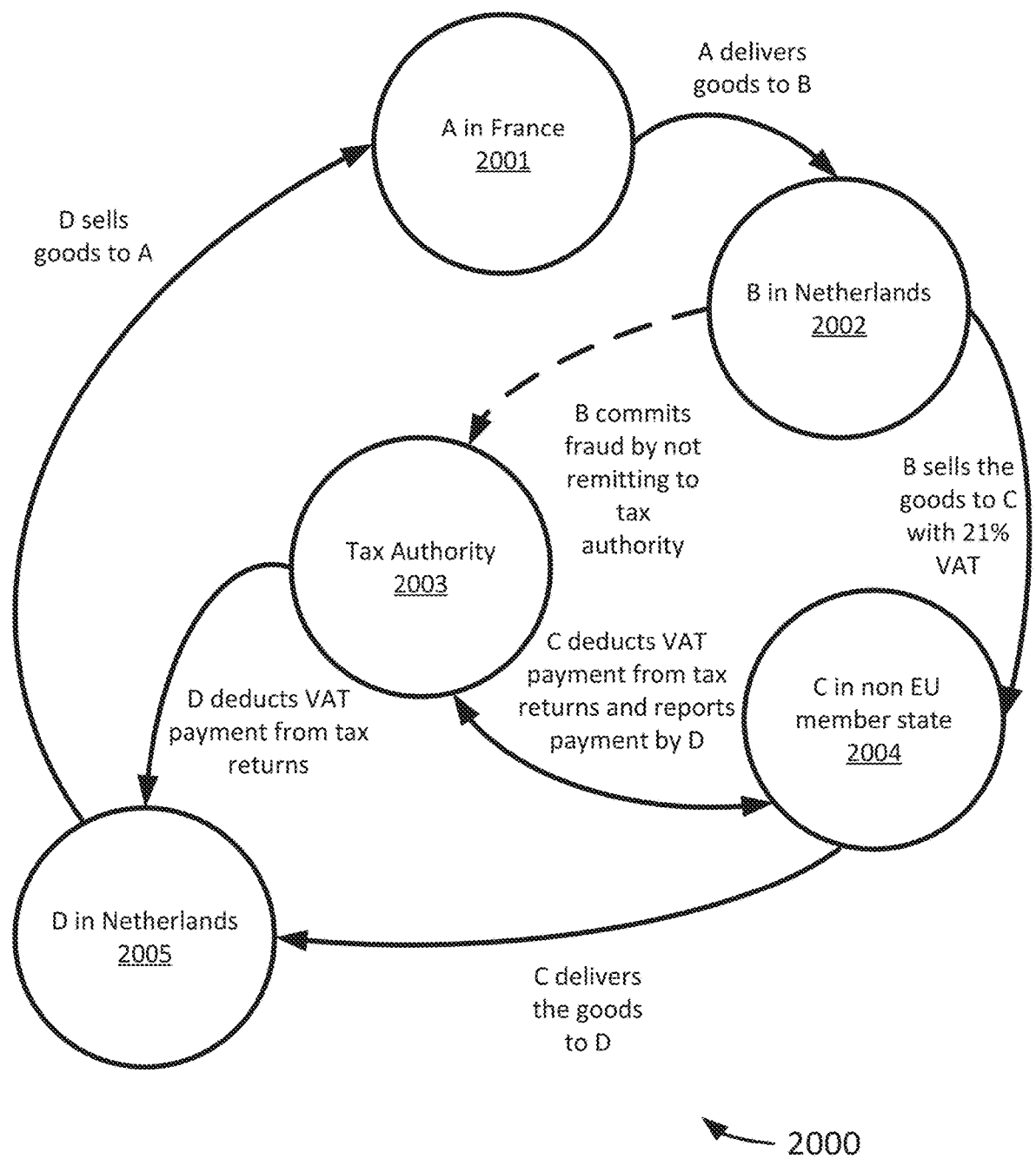
FIGS. 20A-E illustrate an example network pattern query for a tax evasion for facilitating a criminal investigation in at least one embodiment of the present technology.
Figure 20B:
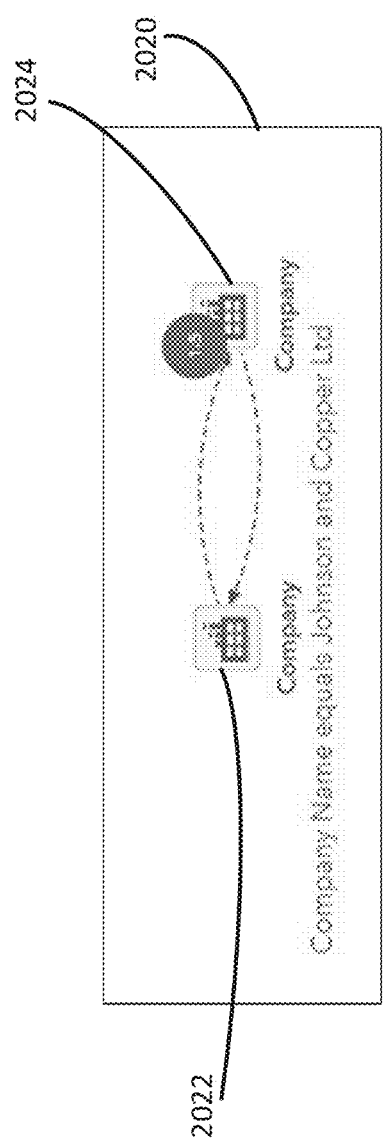

VAT Carousel and MTIC fraud are often difficult to identify in a network of many companies, each with multiple different trades between one another, especially when the companies committing such crimes are deliberately trying to obfuscate their fraudulent activity. An investigator may ask is the organization under investigation part of any pattern that may be indicative of MTIC or VAT Carousel Fraud. FIG. 20B shows a network pattern 2020 for a query for a specific company linked to between one and five other companies. A company associated with company icon 2022 who failed to remit payment (e.g., Company B 2002 Johnson and Copper Ltd.) may be investigated to see if there is a pattern of companies involved in a carousel fraud. Here the network pattern 2020 uses a repeating entity 2024 to specify that there is a range of sequentially linked entities of a given type (e.g., type company icon). The attributes of the icon can be modified to specify an upper and lower limit of potentially linked entities. In this example, the query looks at whether the company under investigation is linked to between one and five other companies with trades sequential in time.

The computing system can determine there is a relationship based on attribute data in common between data records associated with the company icons or an icon intermediate to the company icons. The computing system can generate a graphical representation of one or more links between the company icons (i.e., a fraud carousel found in the data). In this case the icons happened to be company icons, but they could be other types of icons (e.g., icons representing persons or locations). The computing system could determine there is a relationship based on other processes (e.g., an entity resolution) or receipt of other information (e.g., an investigator adding a link between entities).

Figure 20C:
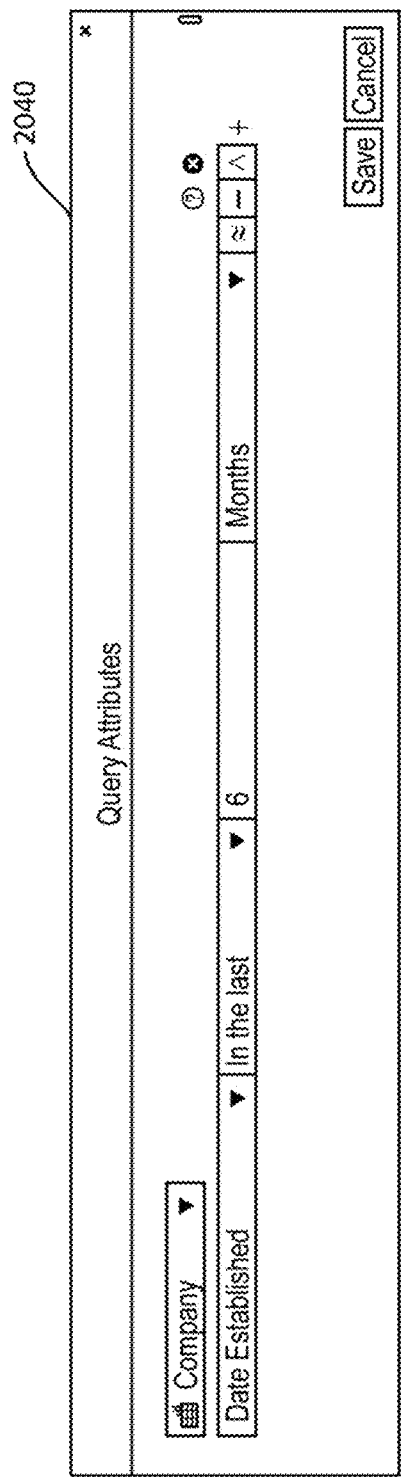

FIG. 20C shows a query attributes dialog 2040 specifying that the date established on each of the companies is within the last 6 months. FIG. 20C narrows the query attributes to companies in the cycle that are all recently established.

In one or more embodiments, a computing system uses filters to narrow results. For instance, the computing system can filter out matches in an electronic database to a queried network pattern based on filters applying to information holistically describing or comparing multiple entities of the output graph. For instance, a graph filter could filter based on a total value of all claims in a network graphed returned in response to query. As another example, a node filter could filter based on a node comparison (e.g., whether an entity corresponding to event A occurred before an entity corresponding to an event B or if the value of entity corresponding to claim A is greater than the value of an entity corresponding to claim B). Alternatively, or additionally, the computing system can filter out matches in an electronic database to a queried network pattern based on filters applying to information holistically describing or comparing multiple relationships of the output graph (e.g., attributes of links).

Figure 20D:
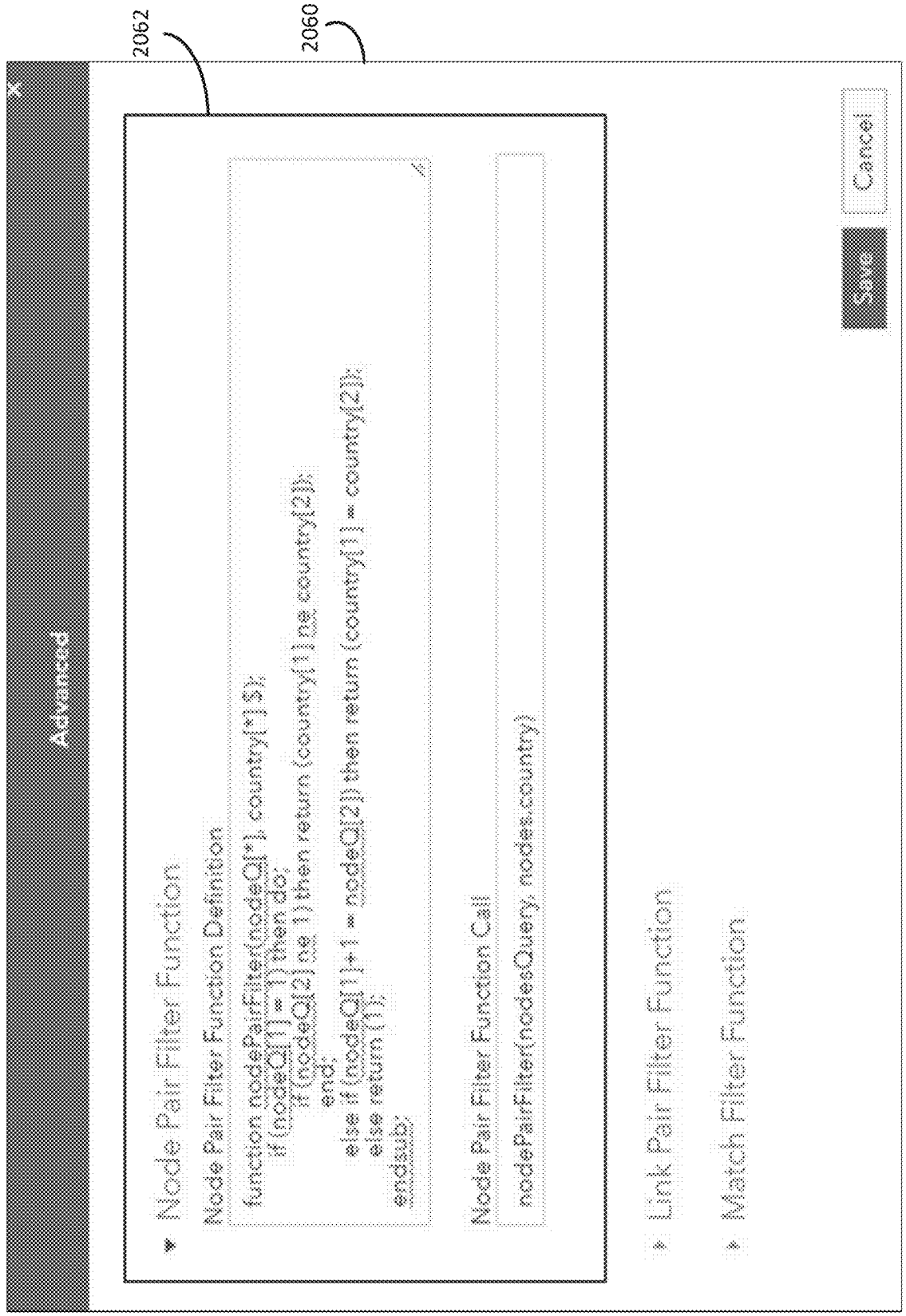
Figure 20E:
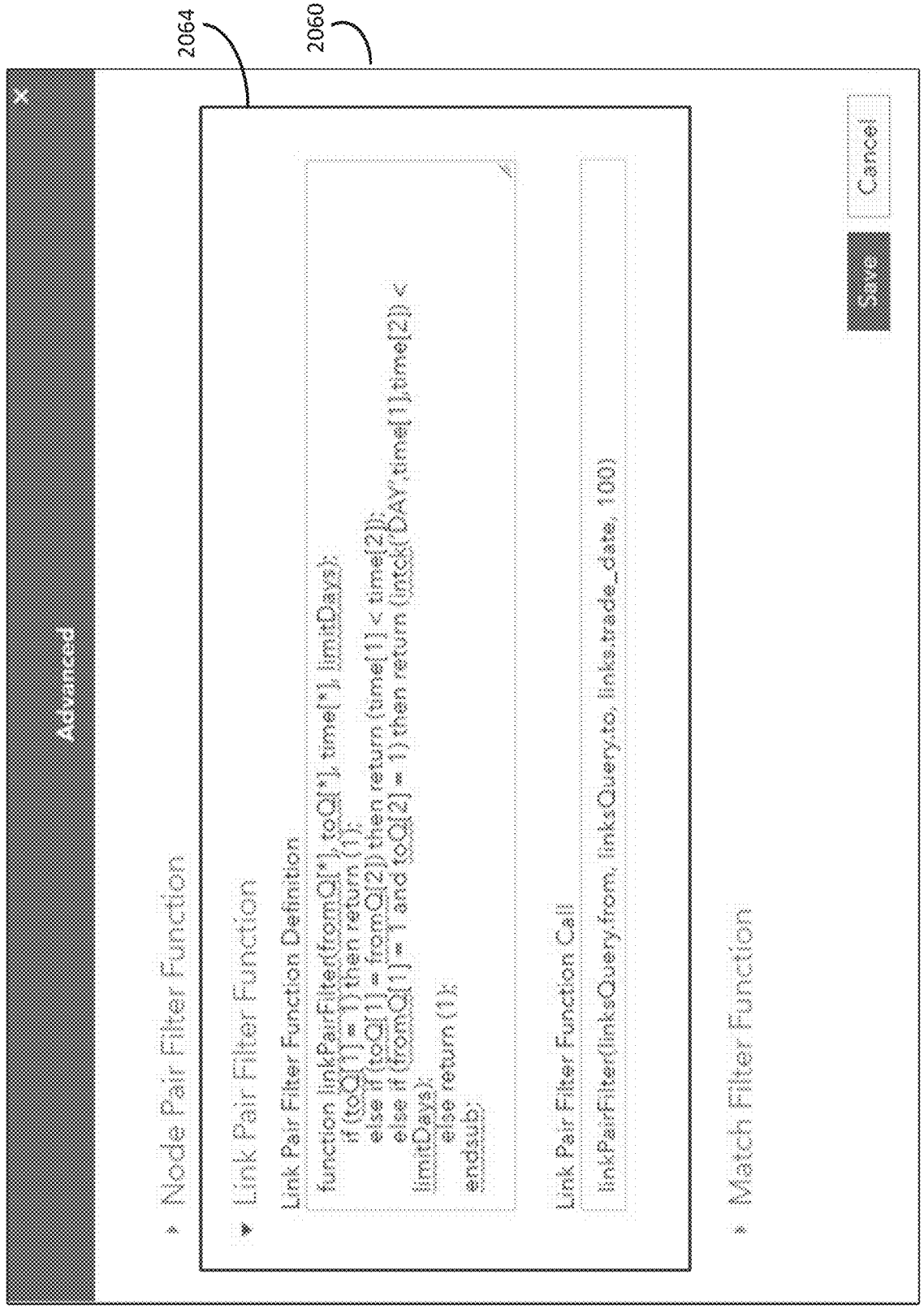

FIG. 20D shows a graphical user interface 2060 showing advanced options for the query. The node pair filter function 2062 is used to detect where the sequence of events starts and ends in the same country and all other trades occur between countries registered in a second country. FIG. 20E shows the graphical user interface 2060 also includes a link pair filter function 2064 to make sure all trades are sequential in time and that they happen within 100 days of one another.

With the results from this query, the user could add and highlight any matches to a network workspace of the investigation of Johnson and Cooper Limited, thus revealing any suspected VAT Carousel fraud rings that this company is a part of. In addition, the investigator may decide a more generic version of this query is worth including in an alert generation process. For instance, the investigator can design a query using graphical tools described herein that does not only focus on Johnson and Cooper Limited.

In one or more embodiments, a computing system receives a request to investigate a first object of investigation and displays an initial graph responsive to the request to investigate the first object of investigation. The investigator can use the initial graph to generate an output graph that indicates a second object of investigation for further investigation according to the request or alert. As shown in FIG. 20B, a complicated network pattern such as a VAT carousel fraud can be represented simply to the user and modified easily within a graphical user interface. The user does not need to be versed in the complexity of filtering interfaces or computer instructions supporting the query (e.g., the filtering shown in FIGS. 20D and 20E).

Figures 21A, 21B:
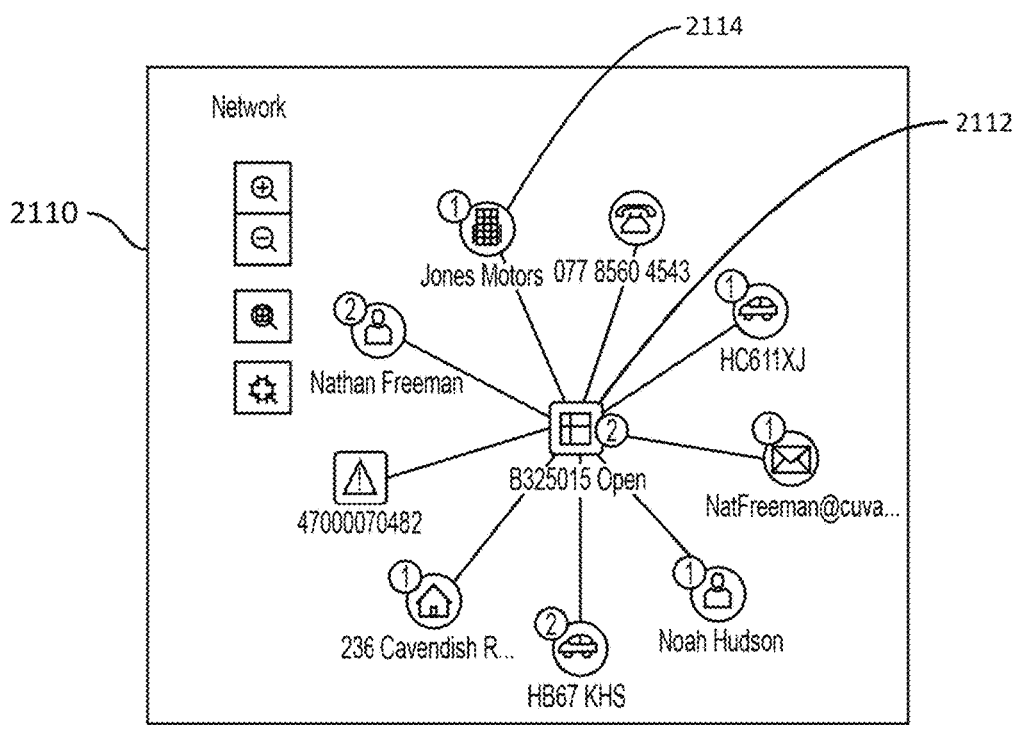

FIGS. 21A-D illustrate an example alert in a graphical user interface 2100 in an example insurance fraud alert system. In one or more embodiments, a computing system transmits to a client device an alert indicating, for investigation by a user of the graphical user interface, one or more of: an initial graph, a subset of the initial graph, and a first object of investigation. FIG. 21A shows alert details pertaining to an alert on a first object of investigation (e.g., a fraudulent insurance claim). The alert detail may have network analytic information 2102 for the investigator to consider for further investigation (e.g., the network size and number of fraudulent claims in the network). The alert details may also display a network graph or a subset of a network graph.

Figure 21C:
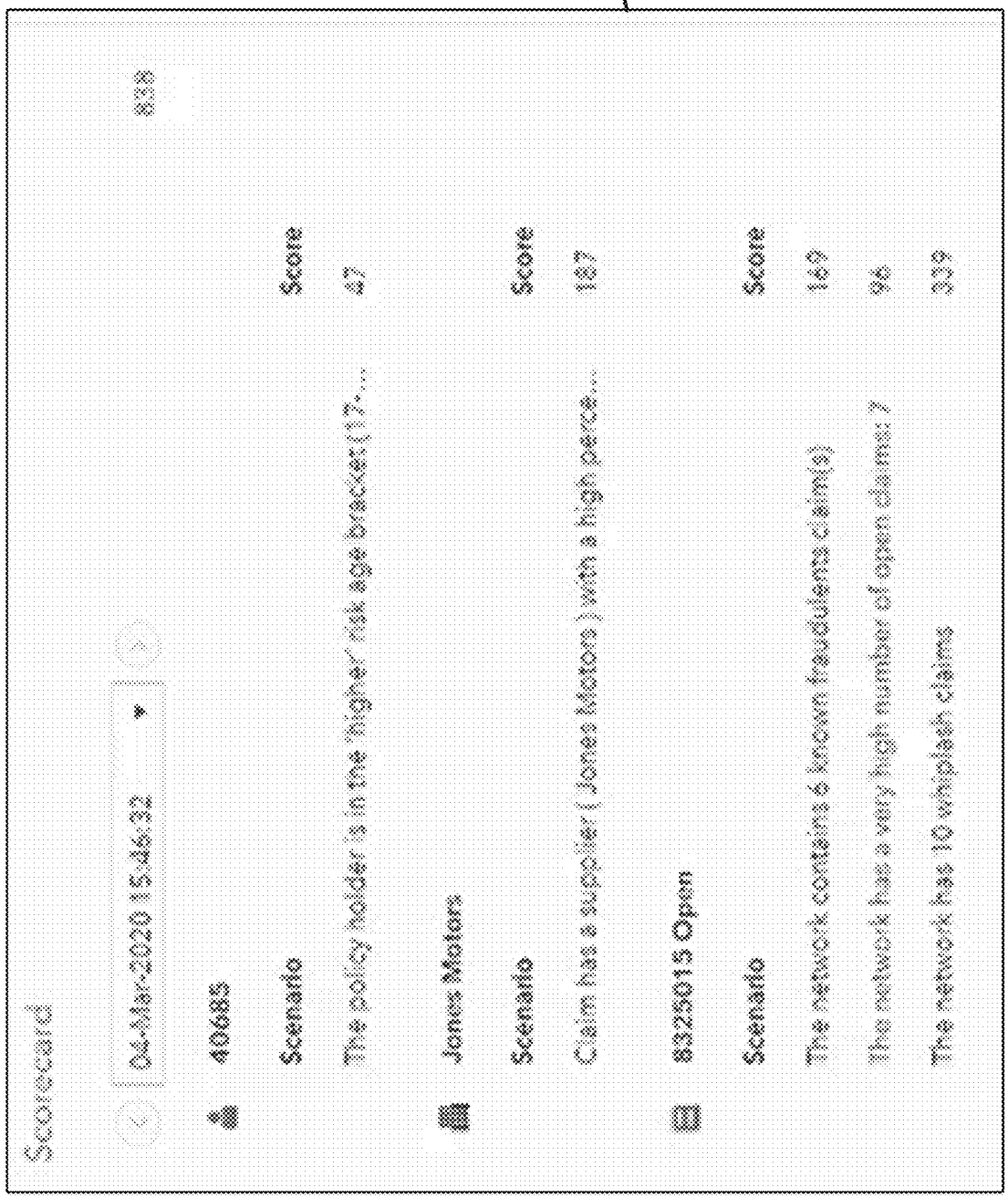

FIG. 21B shows an example network graph 2110 pertaining to a first object of investigation corresponding to open claim icon 2112. An insurance company may still be considering or processing an open claim corresponding to open claim icon 2112 (e.g., the insurance company has not paid or refused to pay the claim). The alert details may also comprise indications of a fraud scenario for the object of investigation (e.g., the policy holder is in a higher risk for fraud because of the age of the policy holder). FIG. 21C shows an example scorecard 2130 indicating a fraud scenario. The alert details may comprise attributes about the object under investigation. FIG. 21D for instance shows claim details in a graphical user interface 2140 pertaining to the fraudulent claim. Connections to the claim icon 2112 in network graph 2110 of FIG. 21B can be further explored (e.g., investigating company icon 2114).

FIGS. 22A-F illustrate example graphical user interfaces for selecting a network pattern. In this example, a network graph 2204 pertaining to claim icon 2112 is further explored.

An Object Inspector Tool is used to explore attributes of the claim icon 2112 in display 2202. Multiple node attributes of this first entity are displayed (e.g., a claim number or city of the claim).

Figure 22A:
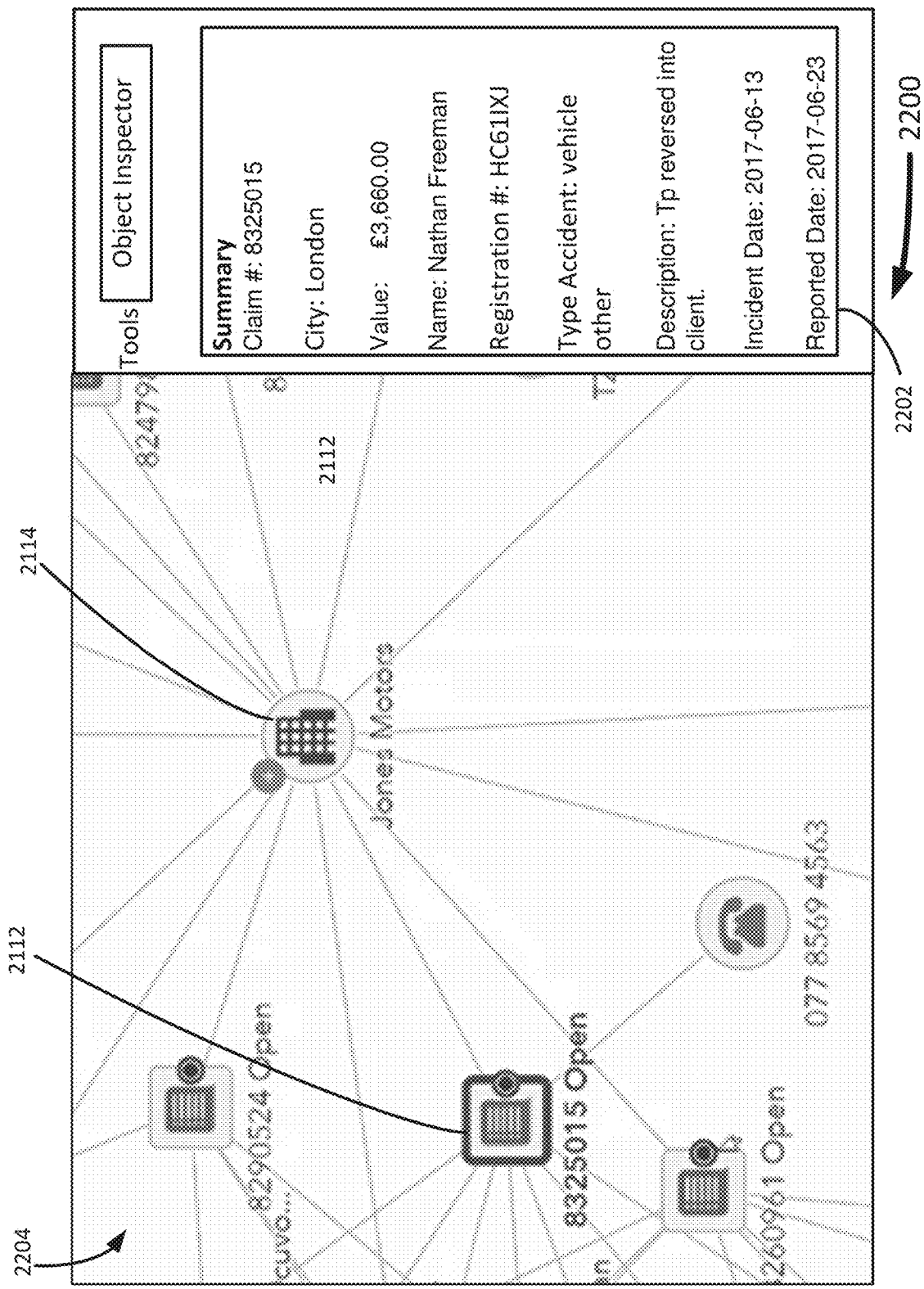
FIGS. 22A-F illustrate example graphical user interfaces for selecting a network pattern in at least one embodiment of the present technology.
Figure 22B:
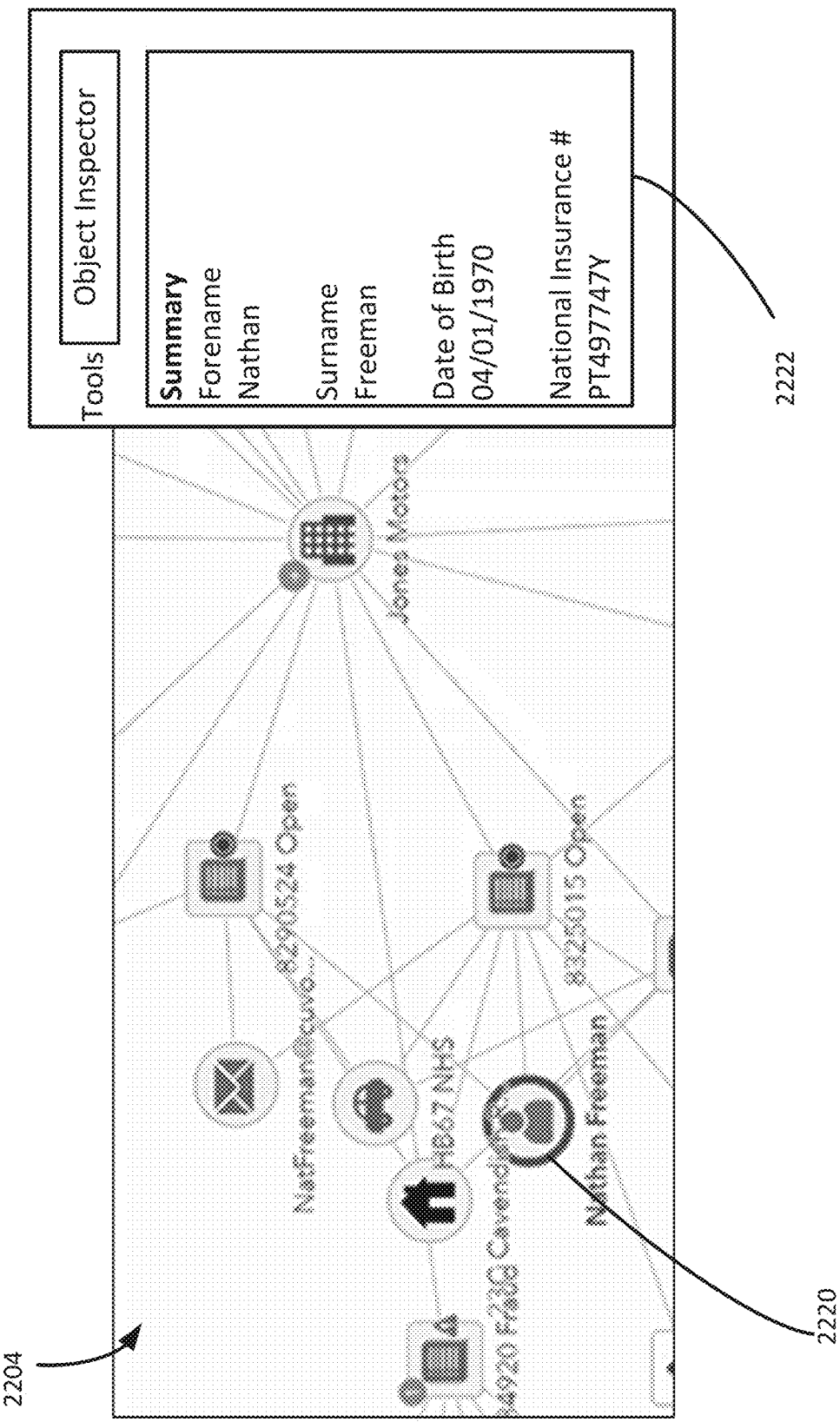
Figure 22C:
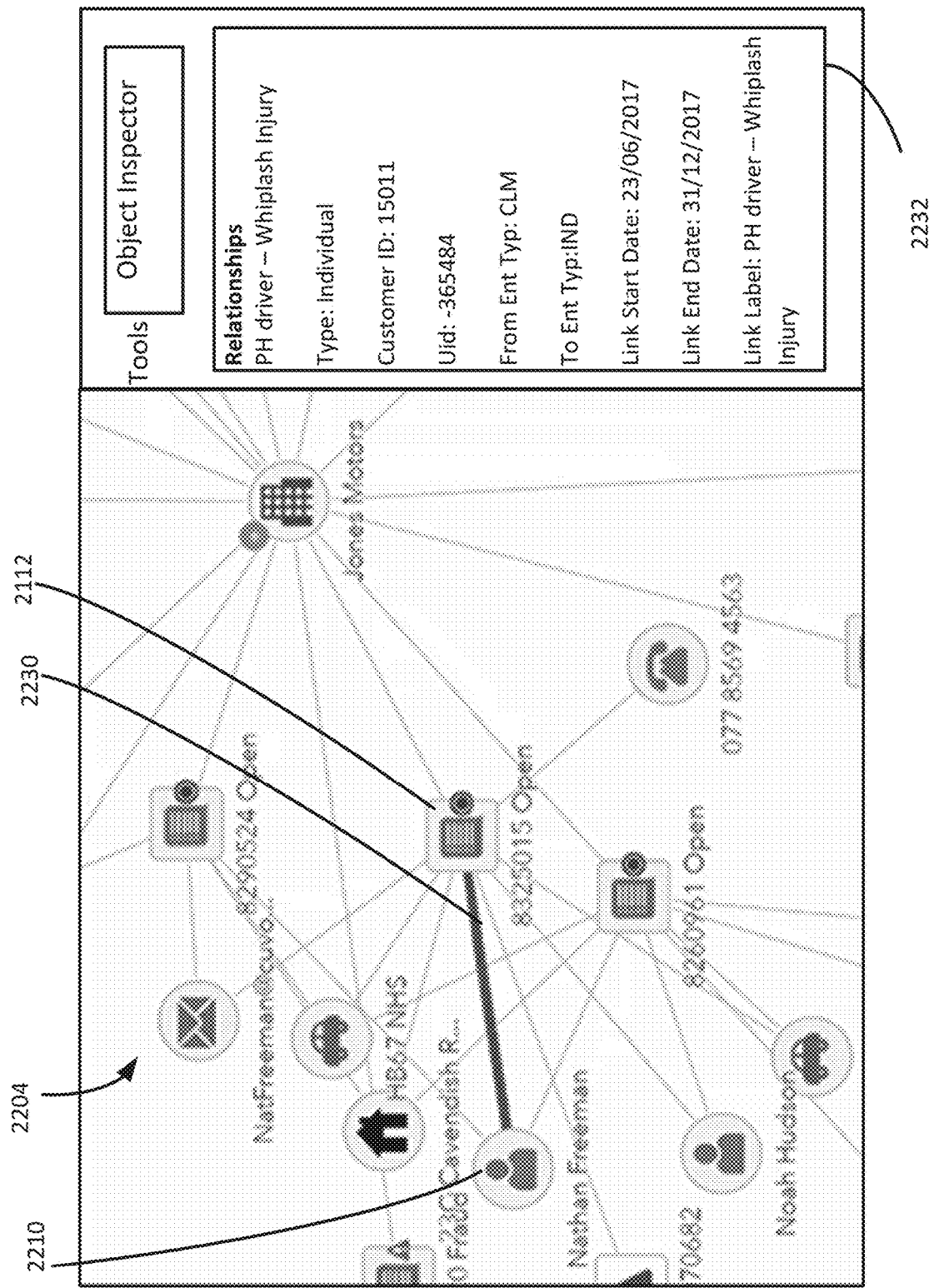

Other objects within the network graph 2204 can also be explored for selecting a network pattern. As shown in FIG. 22B, a person icon 2220 is selected. An Object Inspector Tool is used to explore attributes of the person icon 2220 in display 2222. Multiple node attributes of this second entity are displayed (e.g., forename, surname, Date of Birth, and National Insurance #). As shown in FIG. 22C, a relationship 2230 between person icon 2210 and claim icon 2112 is selected. An Object Inspector Tool is used to explore attributes of the relationship in display 2232. Multiple relationship attributes are displayed (e.g., pertaining to a driver who is a policy holder, PH, and filed a claim type "whiplash injury").

Figure 22D:
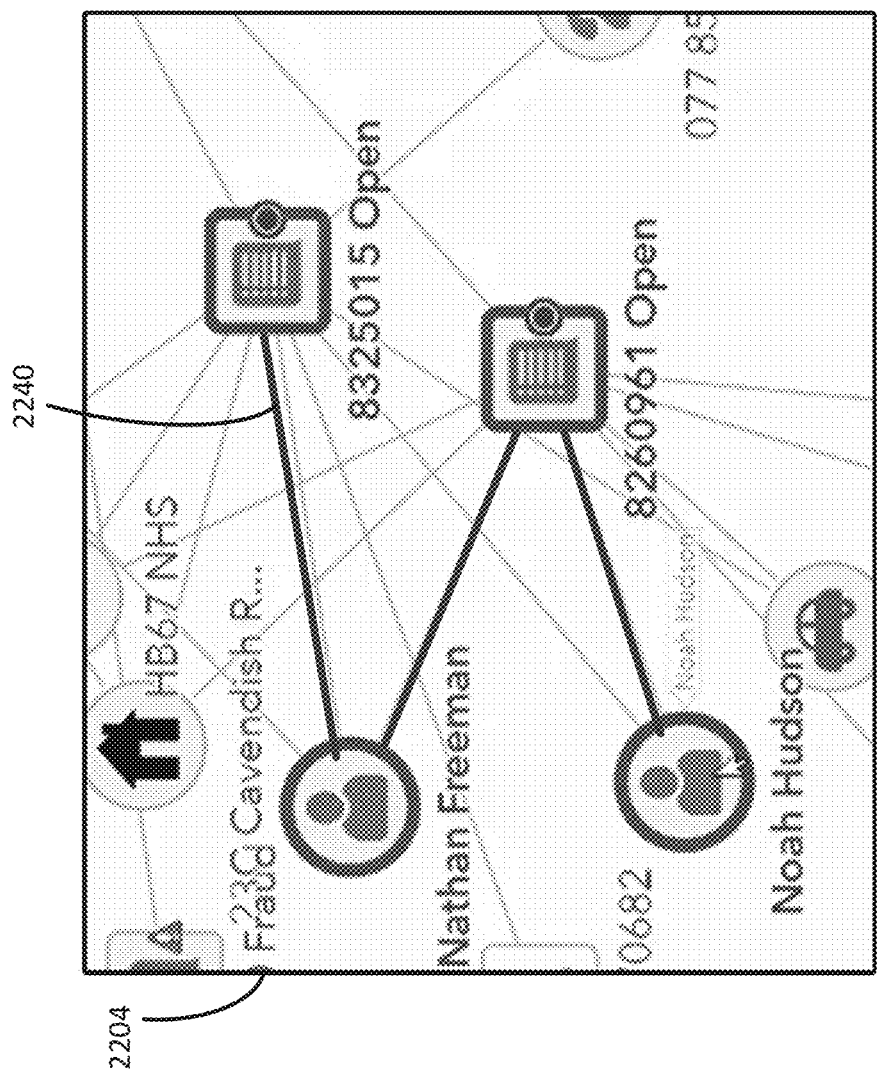

The initial network graph 2204 of FIG. 22C comprises multiple distinct graphical relationships connecting person icon 2210 and claim icon 2112. In this case there is only one direct link shown but more are possible in network graphs. In this case, the user selects a specific graphical representation from one or more of the multiple distinct graphical relationships (i.e., relationship 2230). FIG. 22D shows selection of different icons and relationships in a network pattern 2240 after exploration of the attributes and selection of icons and relationships.

Figures 22E, 22F:
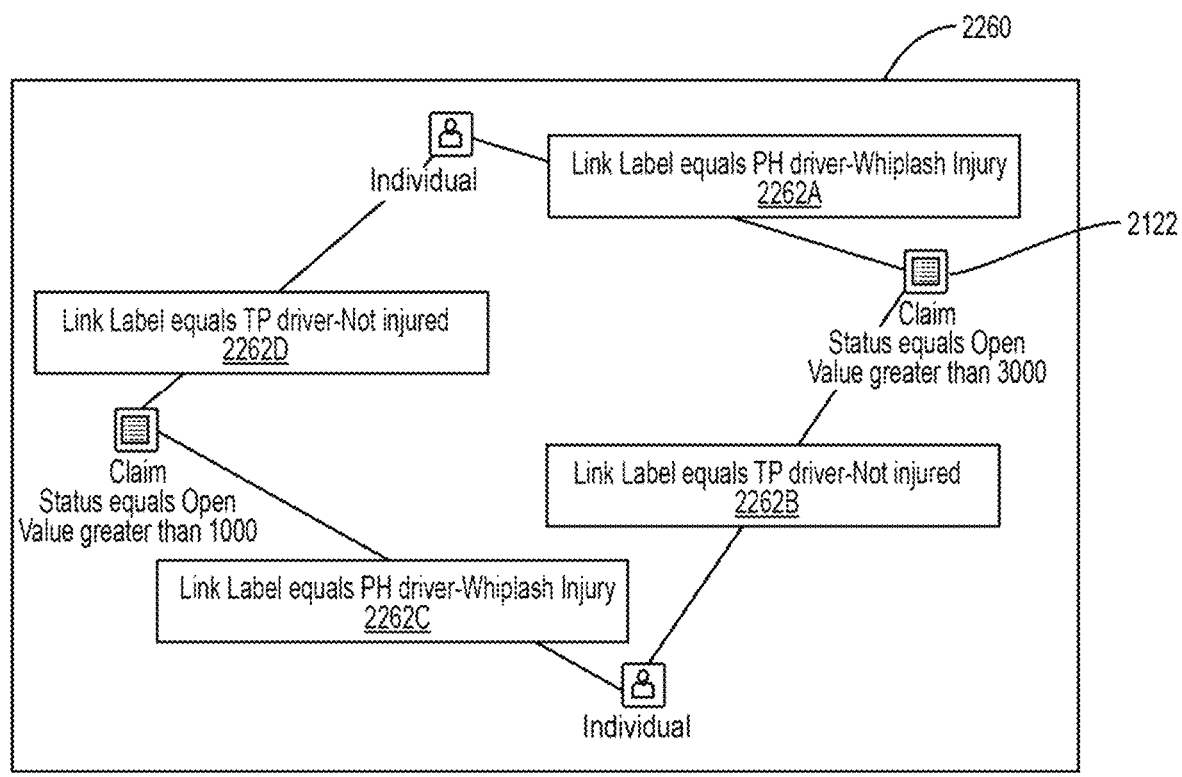

FIG. 22E shows in graphical user interface 2250 refinement of attributes (e.g., node attributes) for the query. For instance, an object of investigation (e.g., an object of interest) is associated with a claim icon 2112. The computing system receives an indication of the graphical network pattern further defined by user selection or removal of one or more displayed node attributes of the multiple attributes. For instance, node attributes stored in data corresponding to fields 2252 of data records associated with the claim icons are specified. Operators 2254 can be added or changed to specify functions or ranges for searching (e.g., operator "greater than").

As shown in FIG. 22E, the computing system receives a user selection of a range comprising a value (e.g., 3000) for a displayed node attribute of the multiple node attributes or function ("greater than") for producing a value for the displayed node attribute of the multiple node attributes. The computing system receives the indication of the graphical network pattern further defined by user selection of the range and/or the function. In this example, greater than 3000 has been automatically specified based on binning of the value that exists in the selected node in the existing investigation. These automatic bins could be based on other or additional criteria (e.g., an assessment across all of the data).

FIG. 22F shows a queried network pattern 2260 that is indicated by a network pattern query. The specified attributes are carried through in the queried network pattern 2260. As shown, the user can also make selections pertaining to relationship attributes 2262. The computing system receives a user selection of a range or function comprising a value for a displayed link attribute of the multiple link attributes. In this case the link attribute labels of relationship attributes 2262 are equal to specific values (e.g., the entity is a Third Party, TP, driver and was indicated as "Not Injured" in the claim or the entity is a PH driver who filed a claim of type "Whiplash Injury"). The computing system receives the indication of the graphical network pattern further defined by user selection of the range or function. In this example, the queried network pattern 2260 includes claim icon 2112 associated with the original object of investigation. However, the queried network pattern 2260 has been abstracted such that it can capture other objects for further investigation. Embodiments advantageously allow for selection of particular entity or relationship attributes in queries. These attributes can be further refined for additional queries.

Figures 23A, 23B:
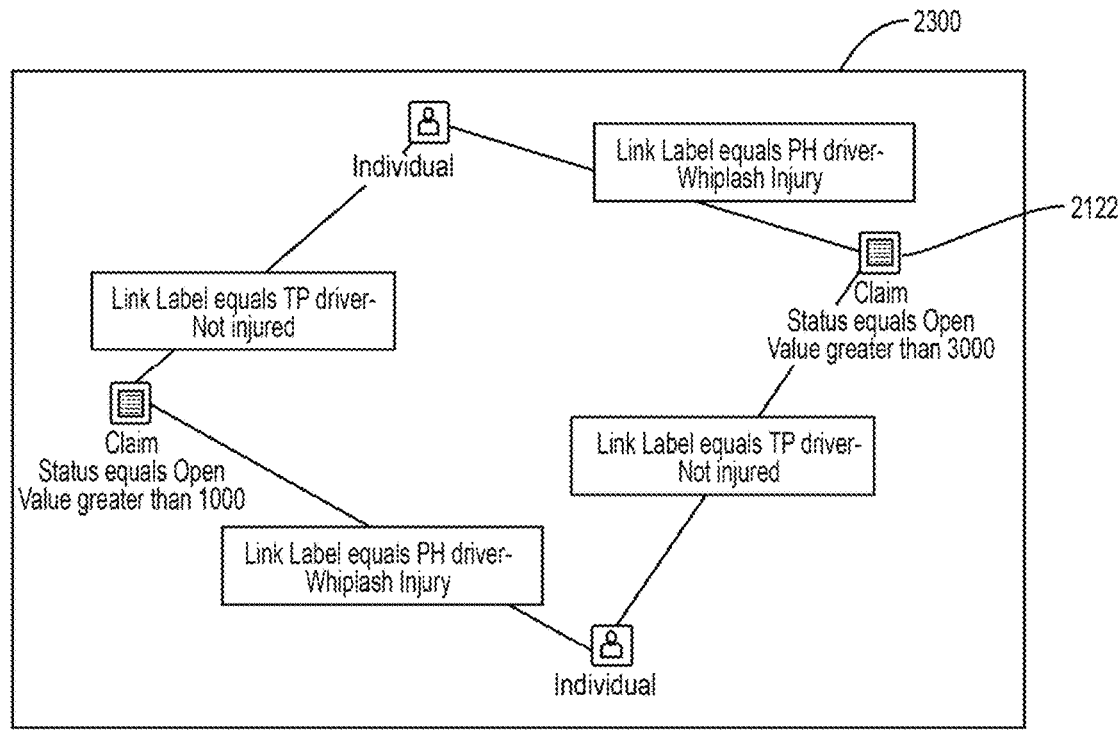

FIGS. 23A-D illustrate querying regarding a modified selected network pattern in a graphical user interface. FIG. 23A shows a modified network pattern 2300 modified from queried network pattern 2260. The attribute on claim icon 2112 has been removed by a user selection. FIG. 23B shows matches 2320 found related to the modified network pattern 2300. In this case, the computing system assigns a match identifier 2322 to each match found in the data, provides individuals 2324 in matching network patterns, and claims 2326 in matching network patterns. As the modified network pattern had two person icons and two claims icons, the matching network patterns each have two individuals and two claims.

FIG. 23C shows exploration of one of the matching network patterns, network pattern 2340. An object inspector can be used to review attribute details of an entity. For instance, graphical user interface 2360 of FIG. 23D shows attribute details pertaining to person icon 2342 of FIG. 23C. Accordingly, one or more embodiments help an investigator find similar patterns in data.

Typically, this has been a difficult question to answer. Prior to this tool, investigators had to look for characteristics of individual entities and search for those in the hope that they also display this networked behavior. This first approach, if it works at all, will find only very specific examples, and does not recognize the contribution of the organized activity that may be happening between the different parties involved. As a second approach an investigator could pass on the details of what has been found to an analyst team who have additional capability available to them, such as the SAS® Network action set. This second approach may provide the required results, but it suffers from the disconnect of the investigators and the analysts. For instance, the investigator has to understand what is the general activity of interest and what is specific to the context of the situation. As an example, an employee providing the same address as a supplier is interesting for a fraud investigation, as is the fact that they have only recently become a supplier. The fact that there has been seven invoices for a total of $150,000 is interesting, but is not essential. This must be communicated to the analysts in a way that they can interpret and understand. For instance, the investigator may need to answer for the analyst questions such as whether there is a written description, does it use an agreed-upon grammar, or is there an export of the example from the investigation tool? The analysts may be familiar with field names in the data but not the labels on items in the investigation tool, so the analyst has to interpret the request of the investigators. The analyst must then make decisions on how they can look for this across the full set of data. The analyst must be able to interpret the results to understand if the results also demonstrate valid and interesting examples. Typical coding environments are not well suited to visualizing and interrogating graph data. If the analyst has an appropriate tool available to them, they also then need to understand whether the examples they have found are of interest to the investigator. To determine this, the results must be passed back to the investigator. At this point, the investigator may choose to refine their request and iterate through the above process.

The process can be very inefficient, require multiple people, and take a significant amount of time to iterate through to a set of results that are of interest. Embodiments herein present a better solution to this problem by providing the investigator with the ability to go through this cycle themselves. With this solution extension, once an investigator has found a pattern they wish to search for, they can seed, for instance, a SAS® Visual Graph Query Builder with the entities and relationships that make up the network pattern.

By creating a solution extension that integrates the inherent graph data model within SAS® Visual Investigator, with the range of capabilities offered by network pattern query, users of SAS® Visual Investigator can quickly and easily answer important questions about their data. The Visual Graph Query Builder solution extension enables the investigator to identify more complex indicators of suspicious activity that include not only information about a single entity that could be uncovered using the SAS® Visual Investigator native search, but also attributes of linked entities and the relationships between them.

For an investigator, manually looking for complex relationships extending from an investigation is difficult and time consuming. Broadening that to look for all cases of the behaviour would be impossible for an investigator with their current capabilities. However, the Visual Graph Query Builder gives the investigator access to information that would otherwise require the investigator to work with an analyst across different platforms. The results enable investigators to both enhance their investigations and enrich an alert generation process. As shown by FIGS. 23A-D, the investigator can easily visually modify search criteria and see results directly from network graphs.

What is claimed is:

1. A computer-program product tangibly embodied in a non-transitory machine-readable storage medium, the computer-program product including system instructions operable to cause a computing system to:
receive a request to investigate a first object of investigation;
responsive to the request to investigate the first object of investigation, display, in a graphical user interface, an initial graph with a plurality of icons, wherein:
each icon of the plurality of icons graphically represents respective data associated with a respective entity;
the initial graph comprises a first icon of the plurality of icons graphically representing the first object of investigation; and
the first icon is connected in the initial graph to one or more other icons of the plurality of icons;
receive, from a user of the graphical user interface, an indication of a graphical network pattern, wherein the graphical network pattern is defined by a user selection of a second icon of the plurality of icons in the initial graph and:
a user selection of a third icon in the initial graph, wherein the second icon and the third icon represent different data; or
a user selection of a graphical representation in the initial graph of a relationship between the second icon and the third icon, wherein the relationship is based on a relationship between a first entity associated with the third icon and a second entity associated with the second icon;
generate and send, based on the indication of the graphical network pattern, computer-generated instructions that are generated as defined by the user selection, wherein the computer-generated instructions indicate a network pattern query for searching an electronic database for one or more electronic records corresponding to a queried network pattern based on the graphical network pattern;
responsive to sending the computer-generated instructions, receive a dataset indicating one or more located electronic records corresponding to the queried network pattern and an indication that the one or more located electronic records match the queried network pattern; and
generate output data indicating an output graph for a graphical representation of at least one located record of the one or more located electronic records;
wherein the output graph comprises a second object of investigation different than the first object of investigation;
wherein the output graph is a different network graph than the initial graph such that it does not comprise the first object of investigation and indicates the second object of investigation for further investigation according to the request; and
wherein the second object of investigation is not comprised in the initial graph and is indicated by the at least one located record of the one or more located records.

2. The computer-program product of claim 1, wherein the system instructions are operable to cause the computing system to:
responsive to the indication of the graphical network pattern, display options for modifying the graphical network pattern;
receive, from the user of the graphical user interface, a modification of the graphical network pattern according to a selection by the user of a displayed option of the display options for modifying the graphical network pattern; and
generate the computer-generated instructions indicating the network pattern query for searching the electronic database for one or more electronic records corresponding to a queried network pattern based on the graphical network pattern modified according to the modification of the graphical network pattern.

3. The computer-program product of claim 1, wherein the system instructions are operable to cause the computing system to:
display, in the graphical user interface, multiple attributes related to the first entity or the second entity in the graphical user interface; and
receive the indication of the graphical network pattern defined by user selection or removal of one or more displayed attributes of the multiple attributes.

4. The computer-program product of claim 3, wherein the system instructions are operable to cause the computing system to:
receive a user selection of:
a range comprising a value for a displayed attribute of the multiple attributes; or
a function for producing a value for the displayed attribute of the multiple attributes; and
receive the indication of the graphical network pattern defined by user selection of the range or the function.

5. The computer-program product of claim 1, wherein the system instructions are operable to cause the computing system to filter out matches in the electronic database to the queried network pattern based on one or more of:

filters applying to information holistically describing or comparing multiple entities of the output graph; and filters applying to information holistically describing or comparing multiple relationships of the output graph.

6. The computer-program product of claim 1,
wherein the initial graph comprises a representation of multiple distinct graphical relationships between the second icon and the third icon; and
wherein the system instructions are operable to cause the computing system to receive the user selection of the graphical representation from one or more of the multiple distinct graphical relationships.

7. The computer-program product of claim 1, wherein the system instructions are operable to cause the computing system to transmit to a client device an alert indicating, for investigation by the user of the graphical user interface, one or more of: the initial graph, a subset of the initial graph, and the first object of investigation.

8. The computer-program product of claim 1,
wherein the system instructions are operable to cause the computing system to generate the initial graph based on an entity resolution process, wherein the initial graph depicts multiple icons, of the plurality of icons, associated with electronic records resolved to describe a same entity;
wherein the network pattern query for searching an electronic database comprises searching multiple distinct electronic databases; and
wherein the dataset indicating one or more located electronic records comprises electronic records from at least two of the multiple distinct electronic databases.

9. The computer-program product of claim 1, wherein the system instructions are operable to cause the computing system to:
responsive to sending the computer-generated instructions, display a list of multiple candidate objects of investigation that comprises the second object of investigation; and
generate, from the output data, the output graph that is based on a selection of one or more of the multiple candidate objects of the investigation.

10. The computer-program product of claim 1,
wherein the first entity and the second entity are each one of an object or event in a physical environment; and
wherein the output data comprises detection information indicating detection of the queried network pattern.

11. The computer-program product of claim 1, wherein the system instructions are operable to cause the computing system to display the initial graph by:
determining that there is a relationship based on data in common between data records associated with the second icon and:
the third icon or
an icon intermediate to the second icon and the third icon; and
generating a graphical representation of one or more links between the second icon and the third icon.

12. The computer-program product of claim 1, wherein the system instructions are operable to cause the computing system to:
receive, from the user of the graphical user interface, a manipulation of the initial graph displayed in the graphical user interface by adding or removing a graphical representation of a relationship between a pair of icons; and
receive the indication of the graphical network pattern by receiving a user selection of an icon of the pair of icons or an added graphical representation according to the adding the graphical representation of the relationship between the pair of icons.

13. The computer-program product of claim 1, wherein the system instructions are operable to cause the computing system to:
receive the indication of the graphical network pattern defined by a user selection of a set of icons comprising the second icon in the graph, the third icon in the graph, and a fourth icon in the graph, wherein each of the set of icons is related to at least one other icon in the set of icons based on an attribute in common between a given entity corresponding to a given icon.

14. The computer-program product of claim 1, wherein the system instructions are operable to cause the computing system to receive the indication of the graphical network pattern, wherein the graphical network pattern is defined by:
a user selection of the second icon in the graph; and
a user selection of the graphical representation in the initial graph of a relationship between the second icon and another icon of the plurality of icons different than the third icon.

15. The computer-program product of claim 1,
wherein the first icon is a same icon as the second icon or the third icon;
wherein the queried network pattern represents a generic version of the graphical network pattern that captures the second object of investigation; and
wherein the output graph does not comprise a given icon graphically representing the first object of investigation.

16. The computer-program product of claim 1, wherein the queried network pattern specifically queries on attributes of a given entity or given link of the graphical network pattern such that the output graph comprises the given entity or given link.

17. The computer-program product of claim 1, wherein the system instructions are operable to cause the computing system to:
generate the computer-generated instructions indicating the network pattern query by generating a computer instruction for searching on a given attribute of the first entity, a given attribute of the second entity, and a given attribute of a given link in the queried network pattern,
wherein the dataset indicating one or more located electronic records comprises a nodes mapping identifying:
a node identity and one or more node attributes in a subgraph corresponding to the queried network pattern; and
node end points of linked nodes and a respective attribute of a link connecting the node end points corresponding to the queried network pattern; and
generate the output graph from the output data and based on the nodes mapping.

18. The computer-program product of claim 1,
wherein the initial graph comprises a representation of multiple distinct graphical relationships between the second icon and the third icon; and
wherein the system instructions are operable to cause the computing system to:
display the initial graph by:
determining that there is a relationship based on data in common between data records associated with the second icon and:
the third icon or
an icon intermediate to the second icon and the third icon;

generating a graphical representation of one or more links between the second icon and the third icon; and displaying, in the initial graph, multiple attributes related to the first entity or the second entity in the graphical user interface; and receive the indication of the graphical network pattern by receiving a user selection of:
a range or function; and
selection of the graphical representation from one or more of the multiple distinct graphical relationships;

wherein the range comprises a value for a displayed attribute of the multiple attributes; and wherein the function is for producing a value for the displayed attribute of the multiple attributes.

19. A computer-implemented method comprising:
receiving a request to investigate a first object of investigation;
responsive to the request to investigate the first object of investigation, displaying, in a graphical user interface, an initial graph with a plurality of icons, wherein:
each icon of the plurality of icons graphically represents respective data associated with a respective entity;
the initial graph comprises a first icon of the plurality of icons graphically representing the first object of investigation; and
the first icon is connected in the initial graph to one or more other icons of the plurality of icons;
receiving, from a user of the graphical user interface, an indication of a graphical network pattern, wherein the graphical network pattern is defined by a user selection of a second icon of the plurality of icons in the initial graph and:
a user selection of a third icon in the initial graph, wherein the second icon and the third icon represent different data; or
a user selection of a graphical representation in the initial graph of a relationship between the second icon and the third icon, wherein the relationship is based on a relationship between a first entity associated with the third icon and a second entity associated with the second icon;
generating and sending, based on the indication of the graphical network pattern, computer-generated instructions that are generated as defined by the user selection, wherein the computer-generated instructions indicate a network pattern query for searching an electronic database for one or more electronic records corresponding to a queried network pattern based on the graphical network pattern;
responsive to the sending the computer-generated instructions, receiving a dataset indicating one or more located electronic records corresponding to the queried network pattern and an indication that the one or more located electronic records match the queried network pattern; and
generating output data indicating an output graph for a graphical representation of at least one located record of the one or more located electronic records;
wherein the output graph comprises a second object of investigation different than the first object of investigation;
wherein the output graph is a different network graph than the initial graph such that it does not comprise the first object of investigation and indicates the second object of investigation for further investigation according to the request; and
wherein the second object of investigation is not comprised in the initial graph and is indicated by the at least one located record of the one or more located records.

20. The computer-implemented method of claim 19, wherein the computer-implemented method comprises:
responsive to the indication of the graphical network pattern, displaying options for modifying the graphical network pattern;
receiving, from the user of the graphical user interface, a modification of the graphical network pattern according to a selection by the user of a displayed option of the display options for modifying the graphical network pattern; and
wherein the generating the computer-generated instructions comprises generating based on the graphical network pattern modified according to the modification of the graphical network pattern.

21. The computer-implemented method of claim 19, wherein the computer-implemented method comprises displaying, in the graphical user interface, multiple attributes related to the first entity or the second entity in the graphical user interface; and
wherein the indication of the graphical network pattern is defined by user selection or removal of one or more displayed attributes of the multiple attributes.

22. The computer-implemented method of claim 19, further comprising filtering out matches in the electronic database to the queried network pattern based on one or more of:
filters applying to information holistically describing or comparing multiple entities of the output graph; and
filters applying to information holistically describing or comparing multiple relationships of the output graph.

23. The computer-implemented method of claim 19, wherein the initial graph comprises a representation of multiple distinct graphical relationships between the second icon and the third icon; and
wherein the receiving the indication of a graphical network pattern comprises receiving the user selection of the graphical representation from one or more of the multiple distinct graphical relationships.

24. The computer-implemented method of claim 19, wherein the computer-implemented method comprises transmitting to a client device an alert indicating, for investigation by the user of the graphical user interface, one or more of: the initial graph, a subset of the initial graph, and the first object of investigation.

25. The computer-implemented method of claim 19, wherein the computer-implemented method comprises generating the initial graph based on an entity resolution process, wherein the initial graph depicts multiple icons, of the plurality of icons, associated with electronic records resolved to describe a same entity;
wherein the network pattern query for searching an electronic database comprises searching multiple distinct electronic databases; and
wherein the dataset indicating one or more located electronic records comprises electronic records from at least two of the multiple distinct electronic databases.

26. The computer-implemented method of claim 19, wherein the computer-implemented method comprises:
responsive to sending the computer-generated instructions, displaying a list of multiple candidate objects of investigation that comprises the second object of investigation; and generating, from the output data, the output graph that is based on a selection of one or more of the multiple candidate objects of the investigation.

27. The computer-implemented method of claim 19, wherein the computer-implemented method comprises receiving, from a user of the graphical user interface, a manipulation of the initial graph displayed in the graphical user interface by adding or removing a graphical representation of a relationship between a pair of icons; and wherein the receiving the indication of a graphical network pattern comprises receiving a user selection of an icon of the pair of icons or an added graphical representation according to the adding the graphical representation of the relationship between the pair of icons.

28. The computer-implemented method of claim 19, wherein the displaying the initial graph comprises:
   determining that there is a relationship based on data in common between data records associated with the second icon and:
   the third icon or
   an icon intermediate to the second icon and the third icon; and
   generating a graphical representation of one or more links between the second icon and the third icon.

29. The computer-implemented method of claim 19, wherein the graphical network pattern is defined by:
   a user selection of the second icon in the graph; and
   a user selection of the graphical representation in the initial graph of a relationship between the second icon and another icon of the plurality of icons different than the third icon.

30. A computing device comprising processor and memory, the memory containing instructions executable by the processor wherein the computing device is configured to:
   receive a request to investigate a first object of investigation;
   responsive to the request to investigate the first object of investigation, display, in a graphical user interface, an initial graph with a plurality of icons, wherein:
   each icon of the plurality of icons graphically represents respective data associated with a respective entity;
   the initial graph comprises a first icon of the plurality of icons graphically representing the first object of investigation; and
   the first icon is connected in the initial graph to one or more other icons of the plurality of icons based on one or more attributes of the object of investigation;
   receive, from a user of the graphical user interface, an indication of a graphical network pattern, wherein the graphical network pattern is defined by a user selection of a second icon of the plurality of icons in the initial graph and:
   a user selection of a third icon in the initial graph, wherein the second icon and the third icon represent different data; or
   a user selection of a graphical representation in the initial graph of a relationship between the second icon and the third icon, wherein the relationship is based on a relationship between a first attribute of a first entity associated with the third icon and a second attribute of a second entity associated with the second icon;
   generate and send, based on the indication of the graphical network pattern, computer-generated instructions that are generated as defined by the user selection, wherein the computer-generated instructions indicate a network pattern query for searching an electronic database for one or more electronic records corresponding to a queried network pattern based on the graphical network pattern;
   responsive to sending the computer-generated instructions, receive a dataset indicating one or more located electronic records corresponding to the queried network pattern and an indication that the one or more located electronic records match the queried network pattern; and
   generate output data indicating an output graph for a graphical representation of at least one located record of the one or more located electronic records;
   wherein the output graph comprises a second object of investigation different than the first object of investigation;
   wherein the output graph is a different network graph than the initial graph such that it does not comprise the first object of investigation and indicates the second object of investigation for further investigation according to the request; and
   wherein the second object of investigation is not comprised in the initial graph and is indicated by the at least one located record of the one or more located records.

\* \* \* \* \*